US009115264B2

(12) United States Patent
Mizrahi et al.

(10) Patent No.: US 9,115,264 B2
(45) Date of Patent: Aug. 25, 2015

(54) DELAMINATION RESISTANT, WELDABLE AND FORMABLE LIGHT WEIGHT COMPOSITES

(75) Inventors: Shimon Mizrahi, Haifa (IL); Moshe Narkis, Haifa (IL)

(73) Assignee: PRODUCTIVE RESEARCH LLC, West Bloomfield, MI (US)

( * ) Notice: Subject to any disclaimer, the term of this patent is extended or adjusted under 35 U.S.C. 154(b) by 28 days.

(21) Appl. No.: 13/814,352

(22) PCT Filed: Aug. 5, 2011

(86) PCT No.: PCT/US2011/046778
§ 371 (c)(1),
(2), (4) Date: Feb. 5, 2013

(87) PCT Pub. No.: WO2012/019115
PCT Pub. Date: Feb. 9, 2012

(65) Prior Publication Data
US 2013/0136944 A1 May 30, 2013

Related U.S. Application Data

(63) Continuation-in-part of application No. 13/027,423, filed on Feb. 15, 2011.

(60) Provisional application No. 61/304,640, filed on Feb. 15, 2010, provisional application No. 61/371,360, filed on Aug. 6, 2010, provisional application No. 61/377,599, filed on Aug. 27, 2010, provisional application No. 61/387,164, filed on Sep. 28, 2010.

(51) Int. Cl.
| | |
|---|---|
| B32B 27/32 | (2006.01) |
| B32B 27/34 | (2006.01) |
| B32B 27/20 | (2006.01) |
| B32B 15/18 | (2006.01) |
| C08K 7/06 | (2006.01) |
| B32B 15/02 | (2006.01) |
| B32B 15/08 | (2006.01) |
| C08J 5/04 | (2006.01) |
| C08J 5/10 | (2006.01) |

(52) U.S. Cl.
CPC . *C08K 7/06* (2013.01); *B32B 15/02* (2013.01); *B32B 15/08* (2013.01); *B32B 15/18* (2013.01); *B32B 27/20* (2013.01); *B32B 27/32* (2013.01); *B32B 27/34* (2013.01); *C08J 5/041* (2013.01); *C08J 5/10* (2013.01); *Y10T 428/12444* (2015.01); *Y10T 428/249951* (2015.04); *Y10T 428/256* (2015.01); *Y10T 428/31507* (2015.04); *Y10T 428/31605* (2015.04); *Y10T 428/31678* (2015.04); *Y10T 428/31681* (2015.04); *Y10T 428/31692* (2015.04); *Y10T 428/31696* (2015.04)

(58) Field of Classification Search
None
See application file for complete search history.

(56) References Cited

U.S. PATENT DOCUMENTS

| | | | |
|---|---|---|---|
| 213,015 A | 3/1879 | Wahl et al. | |
| 777,656 A | 12/1904 | Banning | |
| 1,972,835 A | 9/1934 | Tainton | |
| 2,286,980 A | 6/1942 | Schanz | |
| 3,086,899 A | 4/1963 | Smith et al. | |
| 3,112,213 A | 11/1963 | Lusa | |
| 3,205,337 A | 9/1965 | Hiemenz | |
| 3,527,667 A | 9/1970 | Larsen et al. | |
| 3,764,277 A | 10/1973 | Hollis | |
| 3,832,433 A | 8/1974 | Schaffer et al. | |
| 3,900,651 A | 8/1975 | Hoppe et al. | |
| 3,969,868 A | 7/1976 | Bainter et al. | |
| 4,037,073 A | 7/1977 | Becker | |
| 4,048,355 A | 9/1977 | Sakayori et al. | |
| 4,110,117 A | 8/1978 | McLeod | |
| 4,110,505 A | 8/1978 | Prewo | |
| 4,171,394 A | 10/1979 | Patil et al. | |
| 4,229,504 A | 10/1980 | Brachman | |
| 4,255,482 A | 3/1981 | Udagawa | |
| 4,267,679 A | 5/1981 | Thompson | |
| 4,313,996 A * | 2/1982 | Newman et al. | 428/215 |
| 4,329,561 A | 5/1982 | Schafer et al. | |
| 4,330,587 A | 5/1982 | Woodbrey | |

(Continued)

FOREIGN PATENT DOCUMENTS

| | | |
|---|---|---|
| CA | 2700549 A1 | 4/2009 |
| CH | 284305 | 7/1952 |

(Continued)

OTHER PUBLICATIONS

"The Effect of Electrical Resistance on Nugget Formation During Spot Welding", J.G. Kaiser, G.J. Dunn, and T.W. Eagar, Welding Research Supplement, Jun. 1982, pp. 167-s to 174-s.

Abstract for: Dunnand, M., et al., "USILIGHT: A cost effective solution to lighten cars", SAE Technical Paper Series, Apr. 3-6, 2006, pp. 1-10.

Abstract for: Guttman, H., et al. "Galfan—A new Coating for Automotive Tubing", SAE Technical Paper 860274, 1986.

Abstract for: Herrschaft, D. et al., "Galfan—A New Zinc-Alloy Coated Steel for Automotive Body Use", SAE Technical Paper 830517, 1983.

(Continued)

*Primary Examiner* — Sheeba Ahmed
(74) *Attorney, Agent, or Firm* — The Dobrusin Law Firm, P.C.

(57) ABSTRACT

The present invention relates to filled polymeric materials 16 including a thermoplastic polymer 18 and a metallic fiber 20 and to light weight composite materials 10, 12 which comprise a metallic layer 14 and a polymeric layer, the polymeric layer containing the filled polymeric material 16. The composite materials of the present invention may be formed using conventional stamping equipment at ambient temperatures. Composite materials of the present invention may also be capable of being welded to other metal materials using conventional welding techniques. The composites exhibit resistance to delamination.

29 Claims, 9 Drawing Sheets

(56) References Cited

U.S. PATENT DOCUMENTS

| | | |
|---|---|---|
| 4,353,951 A | 10/1982 | Yukitoshi et al. |
| 4,369,222 A | 1/1983 | Hedrick et al. |
| 4,383,942 A | 5/1983 | Davenport |
| 4,421,892 A | 12/1983 | Kasahara et al. |
| 4,424,254 A | 1/1984 | Hedrick et al. |
| 4,429,076 A | 1/1984 | Saito et al. |
| 4,461,665 A | 7/1984 | Schertler |
| 4,474,685 A | 10/1984 | Annis |
| 4,482,600 A | 11/1984 | Matsumoto et al. |
| 4,513,033 A | 4/1985 | Patil et al. |
| 4,522,875 A | 6/1985 | Still, Jr. et al. |
| 4,601,941 A | 7/1986 | Lutz et al. |
| 4,617,231 A | 10/1986 | Hamada et al. |
| 4,650,723 A | 3/1987 | Furuya |
| 4,650,951 A | 3/1987 | Koga et al. |
| 4,668,545 A | 5/1987 | Lowe |
| 4,678,699 A | 7/1987 | Kritchevsky et al. |
| 4,678,707 A | 7/1987 | Shinozaki et al. |
| 4,690,856 A | 9/1987 | Ito et al. |
| 4,749,623 A | 6/1988 | Endo et al. |
| 4,753,850 A | 6/1988 | Ibe et al. |
| 4,758,627 A | 7/1988 | Wilkus et al. |
| 4,759,972 A | 7/1988 | Yoshiga et al. |
| 4,759,994 A | 7/1988 | Lesourd |
| 4,788,099 A | 11/1988 | Fukushima et al. |
| 4,792,499 A | 12/1988 | Shindou et al. |
| 4,794,050 A | 12/1988 | Campbell et al. |
| 4,857,377 A | 8/1989 | Daimon et al. |
| 4,873,149 A | 10/1989 | Shinoda et al. |
| 4,888,247 A | 12/1989 | Zweben et al. |
| 4,937,125 A | 6/1990 | Lepoetre et al. |
| 4,942,193 A | 7/1990 | Van Buskirk et al. |
| 4,978,582 A | 12/1990 | Stamm et al. |
| 5,030,488 A | 7/1991 | Sobolev |
| 5,030,816 A | 7/1991 | Strecker |
| 5,047,479 A | 9/1991 | Ohmae et al. |
| 5,061,778 A | 10/1991 | Uchida et al. |
| 5,063,098 A | 11/1991 | Niwa et al. |
| 5,084,357 A | 1/1992 | Imai et al. |
| 5,093,204 A | 3/1992 | Watanabe et al. |
| 5,100,737 A | 3/1992 | Colombier et al. |
| 5,216,075 A | 6/1993 | Papazoglou |
| 5,219,629 A | 6/1993 | Sobolev |
| 5,227,216 A | 7/1993 | Pettit |
| 5,278,231 A | 1/1994 | Chundury |
| 5,347,099 A | 9/1994 | Gissinger et al. |
| 5,354,607 A | 10/1994 | Swift et al. |
| 5,410,133 A | 4/1995 | Matsen et al. |
| 5,418,073 A | 5/1995 | Loth et al. |
| 5,489,180 A | 2/1996 | Ichihara et al. |
| 5,518,836 A | 5/1996 | McCullough |
| 5,548,027 A | 8/1996 | Heucher et al. |
| 5,578,384 A | 11/1996 | Kingston |
| 5,604,033 A | 2/1997 | Arthurs et al. |
| 5,658,264 A | 8/1997 | Samson |
| 5,679,441 A | 10/1997 | Saelens et al. |
| 5,691,037 A | 11/1997 | McCutcheon et al. |
| 5,753,885 A | 5/1998 | Iwasa et al. |
| 5,778,813 A | 7/1998 | Kennedy |
| 5,846,461 A | 12/1998 | Collins et al. |
| 5,866,215 A | 2/1999 | Karbhari |
| 5,866,868 A | 2/1999 | Hirane |
| 5,894,045 A | 4/1999 | Desrondiers |
| 5,916,469 A | 6/1999 | Scoles et al. |
| 5,939,213 A | 8/1999 | Bowden et al. |
| 5,939,512 A | 8/1999 | Gervasi et al. |
| 5,951,800 A | 9/1999 | Pettit |
| 6,004,650 A | 12/1999 | Schweizer |
| 6,012,493 A | 1/2000 | Remke et al. |
| 6,050,208 A | 4/2000 | Kennedy |
| 6,090,465 A | 7/2000 | Steele et al. |
| 6,099,055 A | 8/2000 | Hirota et al. |
| 6,126,865 A | 10/2000 | Haak et al. |
| 6,138,435 A | 10/2000 | Kocher et al. |
| 6,146,488 A | 11/2000 | Okada et al. |
| 6,177,173 B1 | 1/2001 | Nelson |
| 6,202,462 B1 | 3/2001 | Hansen et al. |
| 6,268,408 B1 | 7/2001 | Dispenza |
| 6,294,257 B1 | 9/2001 | Tsukakoshi et al. |
| 6,346,292 B1 | 2/2002 | Grubb et al. |
| 6,346,491 B1 | 2/2002 | DeAngelis et al. |
| 6,387,535 B1 | 5/2002 | Mantel |
| 6,428,905 B1 | 8/2002 | Behr et al. |
| 6,455,148 B1 | 9/2002 | Spears et al. |
| 6,465,110 B1 | 10/2002 | Boss et al. |
| 6,534,194 B2 | 3/2003 | Weihs et al. |
| 6,592,968 B1 | 7/2003 | Schmit et al. |
| 6,592,979 B1 | 7/2003 | DeTeresa |
| 6,659,518 B2 | 12/2003 | Ponsonnaille et al. |
| 6,673,468 B1 | 1/2004 | Behr et al. |
| 6,741,221 B2 | 5/2004 | Aisenbrey |
| 6,764,772 B2 | 7/2004 | Clyne et al. |
| 6,841,212 B2 | 1/2005 | Bicakci-Jenkins et al. |
| 6,841,252 B2 | 1/2005 | Kroes et al. |
| 6,861,156 B2 | 3/2005 | Palm |
| 6,865,805 B2 | 3/2005 | Dispenza et al. |
| 6,870,516 B2 | 3/2005 | Aisenbrey |
| 7,157,140 B1 | 1/2007 | Hoppe et al. |
| 7,261,932 B2 | 8/2007 | Kennedy |
| 7,316,838 B2 | 1/2008 | Aisenbrey |
| 7,390,564 B2 | 6/2008 | Yuasa et al. |
| 7,459,115 B2 | 12/2008 | Stadler et al. |
| 7,553,553 B2 | 6/2009 | Palumbo |
| 7,569,624 B2 | 8/2009 | Kolbe et al. |
| 7,592,388 B2 | 9/2009 | Wick et al. |
| 7,648,058 B2 | 1/2010 | Straza |
| 7,748,184 B1 | 7/2010 | Wheeler et al. |
| 7,833,630 B2 | 11/2010 | Sigler |
| 7,879,454 B2 | 2/2011 | Manicke |
| 7,927,708 B2 | 4/2011 | Mizrahi |
| 7,959,058 B1 | 6/2011 | Crane |
| 7,981,501 B2 | 7/2011 | Kwag et al. |
| 8,034,428 B2 | 10/2011 | Verhaeghe |
| 8,071,205 B2 | 12/2011 | Tsuchiya |
| 8,186,566 B2 | 5/2012 | Abramovici et al. |
| 8,216,658 B2 | 7/2012 | Rajabali |
| 8,308,225 B2 | 11/2012 | Owen et al. |
| 8,309,004 B2 | 11/2012 | Pinard |
| 8,328,971 B2 | 12/2012 | Kia et al. |
| 8,344,070 B2 | 1/2013 | Squire et al. |
| 8,397,976 B2 | 3/2013 | Abramovici et al. |
| 8,404,352 B2 | 3/2013 | Schwab et al. |
| 8,475,930 B2 | 7/2013 | Shoji et al. |
| 8,518,521 B2 | 8/2013 | Aso et al. |
| 8,573,357 B1 | 11/2013 | Hibbs |
| 8,852,733 B2 | 10/2014 | Kwag et al. |
| 8,888,169 B2 | 11/2014 | Howe et al. |
| 8,889,263 B2 | 11/2014 | Rice |
| 2002/0108678 A1 | 8/2002 | Montano et al. |
| 2002/0160180 A1 | 10/2002 | Yamato et al. |
| 2003/0064241 A1 | 4/2003 | Suzuki et al. |
| 2003/0082335 A1 | 5/2003 | Clyne et al. |
| 2003/0099857 A1 | 5/2003 | Nomura et al. |
| 2003/0162049 A1 | 8/2003 | De Kuijnck |
| 2004/0116602 A1 | 6/2004 | Botros |
| 2004/0222863 A1 | 11/2004 | Aisenbrey |
| 2004/0227688 A1 | 11/2004 | Aisenbrey |
| 2004/0233112 A1 | 11/2004 | Aisenbrey |
| 2004/0239578 A1 | 12/2004 | Aisenbrey |
| 2004/0244789 A1 | 12/2004 | Jentgens |
| 2004/0247927 A1 | 12/2004 | Kurz |
| 2005/0000947 A1 | 1/2005 | Sigler et al. |
| 2005/0001780 A1 | 1/2005 | Aisenbrey |
| 2005/0133575 A1 | 6/2005 | Gayden et al. |
| 2005/0140042 A1 | 6/2005 | Aisenbrey |
| 2005/0166956 A1 | 8/2005 | Aisenbrey |
| 2005/0181203 A1 | 8/2005 | Rawlings et al. |
| 2005/0204544 A1 | 9/2005 | Aisenbrey |
| 2005/0205712 A1 | 9/2005 | Aisenbrey |
| 2005/0206270 A1 | 9/2005 | Aisenbrey |
| 2005/0206289 A1 | 9/2005 | Aisenbrey |
| 2005/0206491 A1 | 9/2005 | Aisenbrey |
| 2005/0208251 A1 | 9/2005 | Aisenbrey |
| 2005/0208862 A1 | 9/2005 | Aisenbrey |

(56) References Cited

U.S. PATENT DOCUMENTS

| | | |
|---|---|---|
| 2005/0212161 A1 | 9/2005 | Aisenbrey |
| 2005/0212162 A1 | 9/2005 | Aisenbrey |
| 2005/0214553 A1 | 9/2005 | Yannetti et al. |
| 2005/0224280 A1 | 10/2005 | Aisenbrey |
| 2005/0271859 A1 | 12/2005 | Tuss et al. |
| 2006/0003667 A1 | 1/2006 | Aisenbrey |
| 2006/0010807 A1 | 1/2006 | Whitley |
| 2006/0060296 A1 | 3/2006 | Sigler et al. |
| 2006/0060690 A1 | 3/2006 | Aisenbrey |
| 2006/0062977 A1 | 3/2006 | Sigler et al. |
| 2006/0071862 A1 | 4/2006 | Aisenbrey |
| 2006/0091887 A1 | 5/2006 | Aisenbrey |
| 2006/0134395 A1 | 6/2006 | Sigler et al. |
| 2006/0134449 A1 | 6/2006 | Sigler et al. |
| 2006/0134450 A1 | 6/2006 | Sigler et al. |
| 2006/0222869 A1 | 10/2006 | Cai et al. |
| 2006/0269701 A1 | 11/2006 | Gauriat et al. |
| 2006/0269738 A1 | 11/2006 | Kimberly |
| 2006/0286333 A1 | 12/2006 | Wang et al. |
| 2007/0062758 A1 | 3/2007 | Jensen et al. |
| 2007/0104966 A1 | 5/2007 | Calvez et al. |
| 2007/0186614 A1 | 8/2007 | Pinard |
| 2007/0187469 A1 | 8/2007 | Chen et al. |
| 2007/0196637 A1 | 8/2007 | Good et al. |
| 2007/0295704 A1 | 12/2007 | Sigler et al. |
| 2008/0012389 A1 | 1/2008 | Mittermeier et al. |
| 2008/0032094 A1 | 2/2008 | Raghavendran |
| 2008/0036241 A1 | 2/2008 | Aisenbrey |
| 2008/0036251 A1 | 2/2008 | Endo et al. |
| 2008/0081149 A1 | 4/2008 | Fuerst et al. |
| 2008/0254310 A1 | 10/2008 | Palumbo et al. |
| 2008/0311363 A1 | 12/2008 | Haskett et al. |
| 2009/0020187 A1 | 1/2009 | Russell et al. |
| 2009/0142538 A1 | 6/2009 | Sigler et al. |
| 2009/0226755 A1 | 9/2009 | Sigler et al. |
| 2009/0280348 A1 | 11/2009 | Patberg et al. |
| 2010/0035080 A1 | 2/2010 | Sigler et al. |
| 2010/0040902 A1* | 2/2010 | Mizrahi ........................ 428/600 |
| 2010/0084380 A1 | 4/2010 | Tetzlaff et al. |
| 2010/0098929 A1 | 4/2010 | Dispenza |
| 2010/0196736 A1 | 8/2010 | Boger et al. |
| 2010/0233505 A1 | 9/2010 | Boger et al. |
| 2011/0049913 A1 | 3/2011 | Bernt et al. |
| 2011/0052910 A1 | 3/2011 | Gunnink |
| 2012/0115872 A1 | 5/2012 | Mizrahi et al. |
| 2012/0196138 A1 | 8/2012 | Botros et al. |
| 2013/0281576 A1 | 10/2013 | Kobayashi et al. |
| 2014/0162086 A1 | 6/2014 | Mizrahi |

FOREIGN PATENT DOCUMENTS

| | | |
|---|---|---|
| CH | 287794 | 12/1952 |
| CH | 406580 | 1/1966 |
| CN | 1649724 A | 8/2005 |
| DE | 877057 | 5/1953 |
| DE | 1912948 | 10/1970 |
| DE | 1729057 | 6/1971 |
| DE | 3622781 A1 | 1/1988 |
| DE | 4019202 A1 | 12/1991 |
| DE | 4141343 A1 | 5/1993 |
| DE | 4307563 A1 | 9/1993 |
| DE | 4300283 A1 | 7/1994 |
| DE | 19633306 A1 | 10/1997 |
| DE | 19724361 A1 | 1/1998 |
| DE | 19740844 A1 | 3/1999 |
| DE | 19810706 A1 | 9/1999 |
| DE | 19919783 | 11/2000 |
| DE | 19926379 A1 | 12/2000 |
| DE | 10011589 A1 | 9/2001 |
| DE | 10240384 A1 | 3/2004 |
| DE | 102004022677 A1 | 5/2004 |
| DE | 202004015784 | 4/2005 |
| DE | 102006013529 A1 | 10/2006 |
| DE | 102006049014 A1 | 4/2008 |
| DE | 102006049015 A1 | 4/2008 |
| DE | 102012103793 A | 10/2013 |
| EP | 0019835 A1 | 12/1980 |
| EP | 0069401 | 1/1983 |
| EP | 0032355 B1 | 5/1984 |
| EP | 0208443 | 6/1986 |
| EP | 0249442 A2 | 3/1987 |
| EP | 0311722 A1 | 7/1989 |
| EP | 0322947 B1 | 7/1989 |
| EP | 0335642 A2 | 10/1989 |
| EP | 0354521 A2 | 2/1990 |
| EP | 0356837 B1 | 3/1990 |
| EP | 0642920 A2 | 3/1995 |
| EP | 0888880 A1 | 1/1999 |
| EP | 1034920 | 9/2000 |
| EP | 1044796 A2 | 10/2000 |
| EP | 1095718 A1 | 5/2001 |
| EP | 1197323 A1 | 4/2002 |
| EP | 1491328 A1 | 12/2004 |
| EP | 1504892 A1 | 2/2005 |
| FR | 1245009 | 11/1960 |
| GB | 2062057 A | 5/1981 |
| GB | 2332875 A | 7/1999 |
| JP | 54-52182 A | 4/1979 |
| JP | 56132709 A | 10/1981 |
| JP | S57-34949 A | 2/1982 |
| JP | 58-142844 A | 8/1983 |
| JP | S58-142845 A | 8/1983 |
| JP | 58/180037 A | 10/1983 |
| JP | S58-180037 U | 12/1983 |
| JP | 60-201296 A | 10/1985 |
| JP | S61010445 A | 1/1986 |
| JP | 61029262 U | 7/1986 |
| JP | 61-290044 A | 12/1986 |
| JP | 62-151332 A | 7/1987 |
| JP | S62-187022 A | 8/1987 |
| JP | 63-027248 A | 2/1988 |
| JP | S63-193831 A | 8/1988 |
| JP | S63-242536 A | 10/1988 |
| JP | H01-108207 A | 4/1989 |
| JP | 01154876 A | 6/1989 |
| JP | 01-263043 A | 10/1989 |
| JP | 2050827 A | 2/1990 |
| JP | H02-297432 A | 7/1990 |
| JP | 02-231134 A | 9/1990 |
| JP | 03-193443 A | 8/1991 |
| JP | 04-077245 A | 3/1992 |
| JP | 04-094928 A | 3/1992 |
| JP | 04-127972 A | 4/1992 |
| JP | 04-282239 A | 7/1992 |
| JP | 05-039560 A | 2/1993 |
| JP | 05-039561 A | 2/1993 |
| JP | 5050553 A | 3/1993 |
| JP | 05-138802 A | 6/1993 |
| JP | 5-162237 A | 6/1993 |
| JP | 05-229054 A | 9/1993 |
| JP | 05-229055 A | 9/1993 |
| JP | 06-071806 A | 3/1994 |
| JP | 06198802 A | 7/1994 |
| JP | 07-068701 A | 3/1995 |
| JP | 07-276557 A | 10/1995 |
| JP | 08-224827 A | 9/1996 |
| JP | 09-087528 A | 3/1997 |
| JP | 63-158242 A | 7/1998 |
| JP | H11-123790 A | 5/1999 |
| JP | 2000-263697 A | 9/2000 |
| JP | 2001-059187 A | 3/2001 |
| JP | 2001-192792 A | 7/2001 |
| JP | 2013-515613 A | 5/2013 |
| JP | 2013-519543 A | 5/2013 |
| NL | 8203423 A | 4/1984 |
| RU | 2149788 C1 | 5/2000 |
| WO | 95/27975 A1 | 10/1995 |
| WO | 99/29492 A1 | 6/1999 |
| WO | 99/46461 A1 | 9/1999 |
| WO | 00/13892 A1 | 3/2000 |
| WO | 03/037970 A1 | 5/2003 |
| WO | 2007/061304 A1 | 5/2007 |
| WO | 2007/062061 A2 | 5/2007 |

(56) References Cited

FOREIGN PATENT DOCUMENTS

| | | |
|---|---|---|
| WO | 2008/118694 A1 | 10/2008 |
| WO | 2009/027480 A1 | 3/2009 |
| WO | 2009/043777 A2 | 4/2009 |
| WO | 2009/135786 A1 | 11/2009 |
| WO | 2010/021899 A1 | 2/2010 |
| WO | 2011/082128 A1 | 7/2011 |
| WO | 2011/100734 A1 | 8/2011 |
| WO | 2012/126923 A1 | 9/2012 |
| WO | 2013/062642 A1 | 5/2013 |
| WO | 2013/156166 A1 | 10/2013 |
| WO | 2013/164173 A1 | 11/2013 |
| WO | 2014/009114 A1 | 1/2014 |
| WO | 2014/066569 A1 | 5/2014 |

OTHER PUBLICATIONS

Abstract for: Murase, M., et al., "Development of vibration damping steel sheets for automobile oil pans", SAE Internation Congress and Exposition, Mar. 1-5, 1993; Paper Number: 930023; Kawasaki Steel Corp.

Abstract for: Shimizu, T. et al., "Application of hot-dip Zn-6%-Al-3%Mg Alloy Coated Steel Sheet to Automotive Body", SAE Technical Paper No. 2005-01-1330, SAE 2005 World Congress & Exhibition, Apr. 2005.

Abstract for: Welch, T. et al., "Cost and Performance Benefits for Laminated Steel Body", SAE Technical Paper 1999-01-1784, 1999.

Co-Pending U.S. Appl. No. 12/978,974, Office Action, dated Mar. 25, 2013.

Copending U.S. Appl. No. 12/540,771, filed Aug. 13, 2009, now U.S. Pat. No. 7,927,708 by Mizrahi.

Copending U.S. Appl. No. 13/052,292, filed Mar. 21, 2011 and published as US2011/0162788 A1 on Jul. 7, 2011 by Mizrahi.

Co-pending U.S. Appl. No. 13/027,423, Office Action dated Mar. 28, 2013.

Copending PCT Patent Application PCT/US2012/025619 filed on Feb. 17, 2012.

Co-Pending U.S. Appl. No. 13/399,459, filed Feb. 17, 2012 by Mizrahi et al.

DiCello, J.A., "Steel-Polypropylene-Steel Laminate—A New Weight Reduction Material," SAE Congress and Exposition, Detroit, MI, Feb. 25-29, 1980.

Gunnink, J.W. GLARE: An Improved Damage Tolerance Material. Proc. 19th European Conference on materials for Aerospace Applications, Dec. 6-8, 2000, pp. 17-24.

Haward, R.N., "Strain Hardening of Thermoplastics," Macromolecules 1993, 26, 5860-5869.

International search report for copending PCT Patent Application PCT/US2012/025619 filed on Feb. 17, 2012 and mailed on May 29, 2012.

Japanese Office Action dated Apr. 24, 2013 for co-pending Japanese Patent Application No. 2011-523875 with summary of the novelty and inventive step rejections prepared by Kiyohara & Co Patent Attorney dated May 22, 2013.

Japanese Office Action dated Apr. 24, 2013 for co-pending Japanese Patent Application No. 2011-523874 with brief description prepared by Kiyohara & Co Patent Attorney dated Apr. 26, 2013.

Kim et al., "Formability of AA5182/polypropylene/AA5182 Sandwhich Sheets", J. of Mat. Processing Tech., 139 (2003) 1-7.

Kim et al., "Forming and Failure Behaviour of Coated, Laminated and Sandwiched Sheet Metals: A Review", J. of Mat. Processing Tech., 63 (1997 38-42.

Link, Todd M. "Formability and Performance of Steel-Plastic Steel Laminated Sheet Materials", SAE 2001 World Congress, Detroit, MI, Mar. 5-8, 2001.

Markaki, A.E. and T.W. Clyne, "Mechanics of Thin Ultra-Light Stainless Steel Sandwich Sheet Material, Part I. Stiffness," Acta Materialia 51 (2003) 1341-1350.

Markaki, A.E. and T.W. Clyne, "Mechanics of Thin Ultra-Light Stainless Steel Sandwich Sheet Material, Part II. Resistance to Delamination," Acta Materialia 51 (2003) 1351-1357.

Markaki, A.E., S.A. Westgate, and T.W. Clyne, "The Stiffness and Weldability of an Ultra-Light Steel Sandwich shhet Maerial with a Fibrous Metal Core," in Processing and Properties of Lightweight Cellular Metals and Structures, TMS, 2002, pp. 15-24.

McKenna, L.W. et al., "New Light-Weight Materials for Vehicle Body Panels—Aluminum/Nylon Laminates," SAE Congress and Exposition, Detroit, MI, Feb. 25-29, 1980.

Miller, William K. "Metal-Plastic Laminates for Vehicle Weight Reduction," SAE Congress and Exposition, Detroit, MI, Feb. 25-29, 1980.

Mohr et al. Development of Formable Sandwich Seets for Automotive Applications, Adv. Eng. Materials, 7 (2005) 243-246.

Mohr, Dirk, "On the Role of Shear Strength in Sandwich Sheet Forming," International Journal of Solids and Structures 42 (2005) 1491-1512.

Office Action dated Dec. 17, 2013 for copending U.S. Appl. No. 12/978,974.

Office Action dated Dec. 4, 2013 for copending U.S. Appl. No. 13/027,423.

Office Action dated Mar. 28, 2013 for co-pending U.S. Appl. No. 13/027,423.

Office Action from the U.S. Patent Office for co-pending U.S. Appl. No. 12/978,974 Mailed on Jan. 24, 2012.

Office Action from the U.S. Patent Office for co-pending U.S. Appl. No. 13/027,423 Mailed on Apr. 13, 2012.

Office Action from the US Patent Office for copending U.S. Appl. No. 13/052,292 mailed on Apr. 19, 2012.

Office Action from the U.S. Patent Office for co-pending U.S. Appl. No. 13/027,423 Mailed on Aug. 15, 2012.

Office Action from the U.S. Patent Office for co-pending U.S. Appl. No. 13/027,423 Mailed on Dec. 13, 2012.

Office Action from the U.S. Patent Office for copending U.S. Appl. No. 13/027,423 dated Oct. 24, 2011.

Office Action from U.S. Patent Office dated Jun. 5, 2012 for copending U.S Appl. No. 12/978,974.

Office Action dated Mar. 25, 2013 for co-pending U.S. Appl. No. 12/978,974.

Office Action from the U.S. Patent Office for copending patent application No. 12978.974 mailed on Aug. 8, 2013.

PCT International Search Report, PCT/US2013/052865, Productive Research LLC, mailed Dec. 12, 2013.

PCT International Search Report, PCT/US2012/025619, Productive Research LLC, mailed May 29, 2012.

PCT International Search Report, PCT/US2009/053676, Productive Research LLC, mailed Dec. 23, 2009.

PCT International Search Report, PCT/US2010/0062138, Productive Research LLC, mailed Mar. 18, 2011.

PCT International Search Report, PCT/US2011/024829, Productive Research LLC, mailed May 10, 2011.

PCT International Search Report, PCT/US2011/046778, Productive Research LLC, mailed Nov. 10, 2011 for co-pending patent application.

Shelley, Tom, "Steel Makes Lightweight Fibre Sandwich," Sep., 2001.

Shinazaki et al. "Spot-Weldable Composite Damping Sheets" Kawasaki Steel Giho. vol. 16 =, No. 4 pp. 288-295, 1984.

Sokolova, O. et al, "Metal-polymer-metal sandwiches with local metal reinforcements: A study on formability by deep drawing and bending," Composite Structures, 94 (2011) 1-7.

Weber, Mark and Musa R. Kamal, Polymer Composites, "Estimation of the Volume Resistivity of Electrically Conductive Composites"; Dated Dec. 1997, pp. 711-725.

Weiss et al, "The Influence on Temperature on the Forming Behavior of Metal/Polymer Laminates in Sheet Metal Forming", Transactions of the ASME, 129 ( 2007) 530-537.

Weiss, M. et al., "Elastic Bending of Steel-Polymer-Steel Laminates (SPS) to a Constant Curvature," Journal of Applied Mechanics (ASME), 2006. 73 (4): p. 574-579.

www.quietsteel.com/pressrelease-022003,html. MSC Engineered Materials and Solutions Group, "Quiet Steel™ Debuts on 2003 Cadillac (Feb. 20, 2003)".

(56) References Cited

OTHER PUBLICATIONS

Office Action from the China State Intellectual Property Office for China Patent Application No. 201080064854.6 mailed on Sep. 18, 2014.
Office Action from the China State Intellectual Property Office for China Patent Application No. 2011800192082 mailed on May 4, 2014.
Office Action from the U.S. Patent Office for co-pending U.S. Appl. No. 13/939,666 mailed on Jun. 12, 2014.
Office Action from the Japan Patent Office for Japan Patent Application No. 2011-523874 dated Jun. 2014.
Office Action from the U.S. Patent Office for co-pending U.S. Appl. No. 13/027,423 mailed on Jul. 24, 2014.
Second Chinese Office Action dated Jan. 15, 2015, Application No. 201180019208.2.
Japanese Office Action dated Jan. 20, 2014, Application No. 2012-553092.
Japanese Office Action dated Dec. 22, 2014, Application No. 2012-546253.
Office Action Summary dated Jun. 12, 2014, U.S. Appl. No. 13/939,666.
Japanese Office Action dated Mar. 30, 2015, Application No. 2013-523364.
Office Action, for Copending Application No. 13/939,696 dated Mar. 11, 2015.
Office Action, for Copending U.S. Appl. No. 13/027,423 dated Apr. 21, 2015.
Office Action, for Copending U.S. Appl. No. 13/027,423 dated Nov. 6, 2014.
Copending U.S. Appl. No. 13/939,666, filed Jul. 11, 2013 by Mizrahi, published as US 2014-0162086.
Office Action from the US Patent Office for copending U.S. Appl. No. 13/052,292 dated Nov. 23, 2011.
Office Action from the US Patent Office for copending U.S. Appl. No. 12978.974 mailed on Mar. 25, 2013.
Office Action from the European Patent Office for Europe Patent Applicaction No. 11748818.9 mailed Oct. 2, 2014.
Office Action from the China State Intellectual Property Office for China Patent Application No. 201280018239.0 mail dated Sep. 19, 2014.
Advisory Action dated Jun. 30, 2015; U.S. Appl. No. 13/027,423.
Advisory Action dated May 26, 2015; U.S. Appl. No. 13/939,666.
Office Action form the European Patent Office for EP application No. 11748818.9 dated Jul. 2, 2015.
Office Action form the ChinesePatent Office for CN application No. 201280018239 dated May 26, 2015.

\* cited by examiner

US 9,115,264 B2

DELAMINATION RESISTANT, WELDABLE AND FORMABLE LIGHT WEIGHT COMPOSITES

CLAIM OF PRIORITY

This application is a national phase filing under 35 USC §371 from PCT Application serial number PCT/2011/046778 filed on Aug. 5, 2011, and claims priority therefrom. This application further claims the benefit of the filing date of U.S. patent application Ser. No. 13/027,423, filed on Feb. 15, 2011; and U.S. Provisional Patent Applications 61/371,380, filed on Aug. 6, 2010; 61/377,599, filed on Aug. 27, 2010; and 61/387,164, filed on Sep. 28, 2010 the contents of which are hereby incorporated by reference in their entirety.

FIELD OF THE INVENTION

The present invention relates generally to fiber-filled polymeric materials, and to composite materials that include a layer of the fiber-filled polymeric material, and more particularly to sandwich composites that include a layer of the fiber-filled polymeric material and a metallic layer.

BACKGROUND

Light weight composites which have a good balance of high stiffness, high toughness, and low weight are used in many applications which require low flexibility and can benefit by reduced part weight. Transportation is one industry which has a need for such materials, for example, as a component of a vehicle or for an object (such as a container) which is being transported.

The ever present need to lighten the weight of transportation vehicles, as well as objects that are being transported, as well as the need for other lighter weight materials, and substitutes for conventional steel materials, has caused industry to investigate new composite materials, and particularly sandwich composite materials. Earlier applications filed by the present inventors have described such efforts in detail.

Unfortunately, the performance requirements imposed for many commercial applications generally create competing design tensions. A material meeting one need (e.g., stampability) may not necessarily meet another need, such as weldability. As such, until the work of the present inventors, materials able to meet the various needs in a commercially viable manner have yet to be employed. Efforts to employ sandwich composites similarly have been unsuccessful, with complications often arising from the inability to realize high integrity bonding among layers, as well as long term corrosion resistance. Of course, when adding in the need for stampability and weldability, many such materials have been ruled out as viable candidates. Accordingly, notwithstanding the many efforts in the art to date, until the work of present inventors, there has remained a need for an improved composite material, such as a sandwich composite material, which can be substituted for conventional steel materials without the need for significant investment in capital for those incorporating the materials into their finished products. There also has remained a need for a material that can be stamped. There also has remained a need for a material that can be welded, and especially welded using conventional welding techniques and/or equipment. There also has remained a need for a material that exhibits long term durability characteristics such as one of both of resistance to corrosion or resistance to delamination (e.g., resistance to delamination in ordinary service conditions, such as ordinary service conditions of automotive vehicle and can endure such conditions without delamination for extended period of time (e.g., 3, 5, 10, years or longer) of the layers of the composite. Further there remains a need for a polymeric-based composite mass that can be used alone or in combination with other materials, such as layered materials, which exhibits good processability, durability, electrical characteristics (e.g., charge dissipation characterisitics), or any combination thereof.

Also, there continues to exist a need for a weldable light weight composite having a polymeric layer having improved weldability (i.e., having a larger processing window for obtaining acceptable welds). Weldability may be measured by the weld current range (i.e., the difference between the maximum current that produces an acceptable weld and the minimum current that produces an acceptable weld, with other conditions such as weld pressure and weld time being kept constant, preferably at values that produce the best welds). Weldability may be measured by the weld time range (i.e., the difference between the maximum weld time that produces an acceptable weld and the minimum current that produces an acceptable weld, with the other conditions such as weld pressure and weld current kept constant, preferably at values that results in the best welds).

SUMMARY OF THE INVENTION

The present invention in various aspects meets some or all of the above needs and is predicated upon the unexpected and surprising recognition that certain unique materials combinations actually are capable of providing a composite material, such as a sandwich composite material, that has excellent drawing capabilities, is weldable (and may even be welded using conventional techniques and/or equipment), and resists delamination in the face of conditions ordinarily conducive to delamination. So effective are the materials and other teachings herein at realizing a substitute for steel in numerous conventional steel applications that it effectively can be used as a drop-in material in place of steel. Thus, it is expected that manufacturers can employ the present materials in their manufacturing operations without the need for acquiring new equipment or other capital investments. Substantial weight savings are possible as well for resulting articles.

A variety of aspects are disclosed herein and the teachings for one aspect may be employed in combination with the teachings of other aspects as will be appreciated upon review of the following description.

In a general sense, the present teachings contemplates a composite material, comprising: a polymeric-based matrix that includes a mixture of: at least one first thermoplastic polymer; and at least one second thermoplastic polymer that is different from the first thermoplastic polymer; and a mass of metallic fibers distributed throughout the matrix to form a composite mass with the polymeric-based matrix, the mass of metallic fibers: including a plurality of metallic fibers optionally having at least one generally flat surface, and being present in concentration greater than about 3% by volume, based on the total volume of the composite mass.

The teachings also contemplate one or any combination of the following features in this summary of the invention, as well as those features described throughout the following detailed description. By way of illustration, at least one first thermoplastic polymer may include at least one polyolefinic polymer (e.g., a linear low density polyethylene); the at least one second polymer includes an elastomer, such as an ethylene-octene copolymer. The polymeric-based matrix may include a polymer that is capable of cross-linking. For example, the polymeric-based matrix include a polymer that is capable of cross-linking by application of an external stimulus selected from radiation (e.g., Ultraviolet radiation and/or, infrared radiation), moisture, heat, or any combination thereof. The relative weight and/or proportions of the first thermoplastic polymer to the second thermoplastic polymer may range from about 1:1 to about 10:1. More preferably about 2:1 to about 5:1.

The composite mass may be attached to a substrate, such as a metal sheet (e.g., it is sandwiched between opposing metal sheets); the substrate or metal sheet prior to or after being attached to the composite mass may be coated on opposing major surfaces of the sheet with a coating one or more coatings (e.g., one that include zinc, phosphate, or both) for resisting corrosion; the metal of the substrate or any sheet may be aluminum, a steel (which may be a high strength steel (e.g., a steel having mechanical strength characteristics consistent with a grade such as having a yield strength of about 240 MPa or greater, about 300 MPa or greater, about 400 MPa or greater, about 450 MPa or greater, about 500 MPa or greater, or about 550 or greater; an ultimate tensile strength of about 340 MPa or greater, about 450 MPa or greater, about 500 MPa or greater, about 500 MPa or greater, about 600 MPa greater, or about 650 or greater; or both) or a steel that otherwise includes an alloying ingredient selected from nickel, manganese, copper, niobium, vanadium, chromium, molybdenum, titanium, calcium, one or more rare earth elements, zirconium, nitrogen or any combination).

The mass of metallic fibers may include a plurality of fibers that are coated with a composition for resisting corrosion; for instance a plurality of fibers may be coated with a composition for defining a sacrificial anode so that resistance to corrosion is provided for a metal to which the composite mass is attached due to the fibers having a standard electrochemical reduction potential less than the standard electrochemical reduction potential of the metal to which the composite mass is attached. The mass of metallic fibers may include aluminum fibers, zinc fibers, magnesium fibers, or any combination thereof: and/or the fibers may be at least partially coated with aluminum, zinc, magnesium, or any combination thereof. The mass of metallic fibers includes a plurality of fibers that are in the form of a ribbon. For example, the metallic fibers may have two or more surfaces that are generally flat; the metallic fibers may have a cross-section transverse to the long direction of the fibers that includes a generally straight side; the cross-section of the metallic fiber may be generally polygonal (e.g., generally rectangular); the metallic fibers may have a cross-section including a width and a thickness, wherein the ratio of the width and the thickness is from about 20:1 to about 1:1.

The resulting composite material may exhibit excellent properties rendering it suitable as a substitute for steel in many applications. For example, The composite mass may be bonded sufficiently to any metal layer so that upon being subjected to peel testing under DIN 11339, the composite exhibits a substantial amount of cohesive failure (e.g., more than about 25%, such as at least about 40%, 50%, 60% or higher cohesive failure). The composite mass is bonded sufficiently to any metal layer so that upon being subjected to lap shear testing under DIN 11465, the composite exhibits a substantial amount of cohesive failure (e.g., more than about 25%, such as at least about 40%, 50%, 60% or higher cohesive failure).

It can be seen from the above that one of the unique and unexpected features of the present invention is that excellent bond strength is attained, and such good resistance to delamination may be achievable in the absence of the use in the composite mass of a major amount, or even in the absence of substantial amounts of (e.g., potentially up to 30%, 20%, 10%, 5% or even 1% by weight) any polar polymer. Additionally, it is unexpected and surprising that such bond strength between the polymeric matrix composite mass is not compromised, and in fact may be enhanced, by the presence of the fibers within the polymeric matrix composite mass, by the use of a phosphatized and/or galvanized steel sheets, or both. For example, it is believed possible that as compared with a sandwich composite that includes polymer without fibers sandwiched between plain carbon, uncoated steel, a composite as described herein that includes the fibers and which may also include a galvanized and/or phosphatized steel layers as the sandwiching layers, the latter could surprisingly achieve a 2× or even 3× increase in peel strength, such as when tested according to DIN 11339.

The yield strength of a sandwich composite formed using the composite material may be about 100 MPa or more. The tensile strength of a sandwich composite formed using the composite material of the teachings may be about 160 MPa or more. The composite may be in the form of a sandwich composite that has a thickness of about 0.4 mm or more, and be such that the composite mass has a thickness that is at least about 30% of the total thickness of the sandwich composite.

Welded articles using the teachings herein are also possible. For example, the shape, size, concentration, and type of the metallic fibers is selected so that a weld stack consisting of the composite material of the teachings herein, and a sheet of galvannealed steel having approximately the same thickness as the light weight composite, may exhibits a static contact resistance of $0.0020\Omega$ or less, as measured using a compressive force of about 500 lbs applied by two axially aligned, electrodes each having a face diameter of about 4.8 mm electrodes. By way of further example, the shape, size, concentration, and type of the metallic fibers may be selected so that the light weight composite has a static contact resistance ratio of about 0.01 or more, wherein the static contact resistance ratio is the ratio of: (i) the static contact resistance of a first weld stack consisting of the composite material of any of claims 1 through 23 and a sheet of steel having approximately the same thickness as the light weight composite, to (ii) the static contact resistance of a second weld stack consisting of two sheets of the same steel as in the first weld stack, wherein the static contact resistance is measured using a compressive force of about 500 lbs (about 2224 Nt) applied by two axially aligned electrodes each having a face diameter of about 4.8 mm electrodes.

The teachings herein also envision methods of making articles, which may include plastically deforming the composite material of the teachings to a draw ratio of at least about 1.5 (e.g., by way of a stamping operation), welding the composite material (e.g., using the same welding conditions as are conventionally employed for welding two bodies of conventional hot dipped galvanized steel without the need for employing special welding parameters), or both. The teachings also contemplate articles employing the composite materials of the teachings and/or made from the methods of the teachings. Use of the materials and articles in or as part of an automotive vehicle component is contemplated as well.

Other attributes of the composite materials of the teachings may include one or more of the following. The flexural modulus of the composite material may be at least about 200 GPa as measured according to ASTM D790. The concentration of the filled polymeric layer is sufficiently high so that the density of the composite material is about 0.8 dm or less, where dm is the weighted average density of any metal sheet employed in combination with the composite mass. A surface of any of the metal layers may be treated on one or more surfaces (prior to formation of the composite) for resisting corrosion by galvanizing, such as by an electro-galvanizing technique; phosphatizing so as to include a phosphate containing layer; electrostatically coating; or any combination.

The metallic fibers may be formed from scrap and/or or starting material derived from either or both of the first or second metal layer (e.g., shredded strips of scrap or shredded strips of starting material, which may or may not have a coating on it); or the metallic fibers may include steel fibers and fibers of another metal having a melting temperature lower than the melting temperature of the steel fibers.

When two or more polymers are employed, one of the polymers may have a tensile modulus, as measured according to ASTM D638, that is about 25% or more different from the tensile modulus of another polymer. One polymer may have a rate of water absorption, as measured by ASTM D570 that is about 25% or more different from the rate of water absorption of another polymer. One polymer may have a heat deflection temperature as measured according to ASTM D648 that is about 5° C. or more different from the heat distortion temperature of another polymer. One or more polymer may be substantially free of oxygen and nitrogen atoms. One or more polymer may include a total concentration of oxygen and nitrogen atoms, based on the total weight percent of the polymer that is less than the total concentration of oxygen and nitrogen atoms in the other polymer.

At least one of the polymers employed may be a polyamide. At least one of the polymers employed may be an ionomer. At least one of the polymers may be a co-polymer. The ratio of tensile modulus as between two of the polymers may be 1.25:1 or higher. The weight or volume ratio of one polymer to the other may range from about 10:90 to about 90:10. One of the polymers may include a grafted polyolefin, e.g., a polyolefin grafted with maleic anhydride.

The teaching herein further contemplate that composites may be further characterized by one or any combination of the following features: the fight weight composite may have a static contact resistance of 0.0017Ω or less; the light weight composite may have a static contact resistance of about 0.0015Ω or less; the light weight composite may have a static contact resistance greater than the static contact resistance of galvanized steel of the same thickness; the light weight composite may have a static contact resistance that is at least 100% greater than the static contact resistance of galvanized steel having the same thickness; the light weight composite may have a static contact resistance that is at least 200% greater than the static contact resistance of galvanized steel having the same thickness; the light weight composite may have a static contact resistance that is at least 400% greater than the static contact resistance of galvanized steel having the same thickness, the light weight composite may have a static contact resistance of about 0.0001Ω or more; the light weight composite may have a current range of about 1.5 kA or more; the light weight composite have a current range of about 2.1 kA or more; the light weight composite has a current range of about 2.1 kA or more; the light weight composite may have a current range of about 2.5 kA or more; light weight composite may have a current range greater than the current range of steel of the same thickness; the light weight composite may have a current range at least about 0.5 kA greater than the current range of steel of the same thickness; the light weight composite may have a current range at least about 1.0 kA greater than the current range of steel of the same thickness.

The concentration of the metallic fibers may be from about 10 volume percent to about 25 volume percent, based on the total volume of the filled polymeric material; the concentration of the metallic fibers may be from about 12 volume percent to about 23 volume percent, based on the total volume of the filled polymeric material; the metallic fibers may have an average cross-sectional area of about 0.0009 mm$^2$ or more, wherein the cross-sectional area is measured in the direction perpendicular to the length of the fibers; the metallic fibers may have an average cross-sectional area of about 0.0025 mm$^2$ or more, wherein the cross-sectional area is measured in the direction perpendicular to the length of the fibers; the metallic fibers may have a generally rectangular cross-section in the direction perpendicular to the length of the fibers; or the rectangular cross-section is characterized by a thickness and a width that at least as long as the thickness, wherein the ratio of the width to the thickness is about 20 or less.

It yet another aspect the teachings contemplate a process comprising the steps of: i) applying pressure to a weld stack; ii) applying an initial weld current to the weld stack while the pressure is applied, wherein the initial weld current is about 0.8 kA or less; iii) incrementally increasing or continuously ramping the welding current for an upslope time until the weld current reaches a second weld current; wherein the second weld current is at least about 0.5 kA higher than the first weld current, and the upslope time is about 0.01 seconds or more; wherein the weld stack includes a component that includes a composite material, and one or more additional components each including at least one metal layer; wherein the composite material includes two metal layers; and one or more polymeric layers at least partially interposed between the two metal layers, the polymeric layer includes one or more polymers, the polymeric layer includes one or more metallic fibers, and the total volume of the one or more polymeric layer is about 30% or more of the total volume of the composite material. Preferably, the process includes a step of holding the weld current at the second weld current for at least 0.06 seconds.

DETAILED DESCRIPTION

Figure 1A:
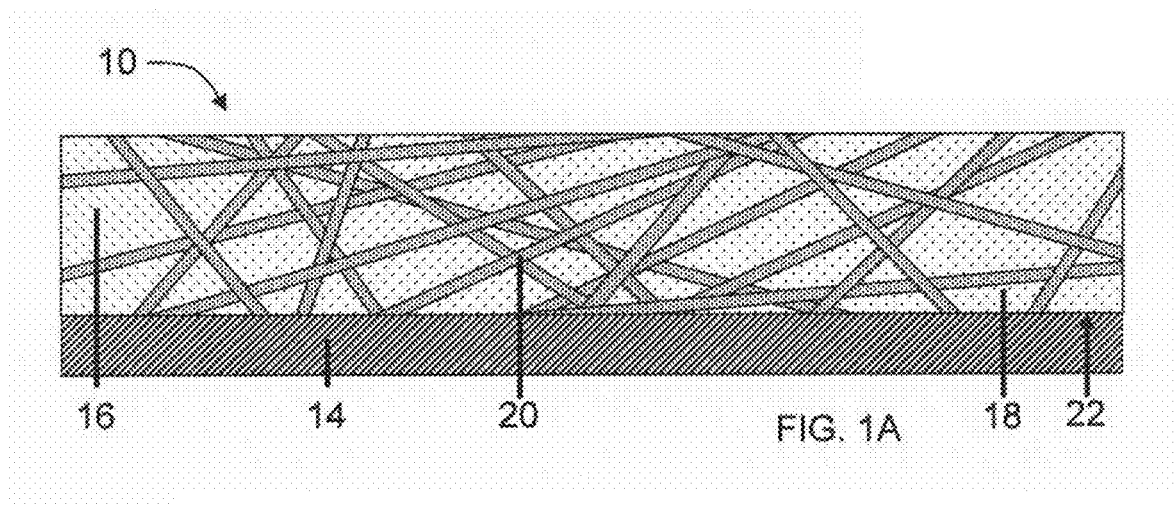
FIG. 1A illustrates a composite material having a polymeric layer and a metallic layer.

In general, the materials herein employ a tilled polymeric material, as will be described, and particularly one that includes a metal fiber phase distributed in a polymeric matrix. In general, the composite materials herein employ at least two layers, one of which is the above filled (e.g., fiber-filled) polymeric material (e.g., in a fiber-filled polymeric layer). More particularly, the materials herein are composites that include a sandwich structure, pursuant to which a fiber-filled polymeric layer is sandwiched between two or more other layers. The materials herein also contemplate sandwich structure pre-cursors, e.g., a first layer upon which a filled polymeric layer is attached so that the filled polymeric layer has an exposed outer surface. A second layer may subsequently be attached to the filled polymeric layer. The invention also contemplates feedstock compositions (e.g., in the form of a pellet, a sheet, or otherwise) that include a fiber-filled polymeric material in accordance with the present teachings. As will be illustrated, the materials herein exhibit a unique, surprising, and attractive combination of properties, which render the materials suitable for deforming operations (e.g., relatively high strain rate forming operations, such as stamping), welding operations, or both. For instance, as will be seen from the teachings, the filled polymeric layer is designed in a manner such that is multiphasic. At least one phase (e.g., the filler) provides a conductive flow path, and is such that it is plastically deformable, and may even strain harden when subjected to a stress that induces plastic deformation. In addition, the polymeric phase is such that it bonds sufficiently to another material (e.g., a metal layer such as a steel sheet) that processing of the composite materials for welding and/or deforming (e.g., forming, such as by stamping), will be free of delamination of the composite. The polymeric phase may also be such that it withstands degradation when subjected to coating operations (e.g., when subjected to chemical baths such as electrostatic coating baths, or other baths for imparting corrosion resistance, common in sheet metal coating operations).

Composite materials of the present invention, despite including a polymer having generally poor electrical conductivity, may have surprisingly good weldability using electrical resistance weldability. For example the process window for obtaining an acceptable weld may be generally wide. As used herein, an acceptable weld may be a weld that has a button size diameter that is about 95% or more of the diameter of the electrode use to make the weld. As described herein, the composite material may even have a broader processing window for welding than steel (e.g., galvannealed steel) of the same thickness.

The present invention in its various aspects makes use of unique combinations of materials to derive an attractive composite, and particularly a laminate composite. The laminate may be drawn (e.g., deep drawn), welded, or both, in a manner similar to conventional art-disclosed sheet materials, such as sheet metal (e.g., stainless and/or low carbon steel). In general, the invention makes use of a multi-phase composite material in which the materials are selected and employed so that, as a whole, they impart drawability, weldability, or both. Additionally, the materials are such that the resulting laminates can be processed in a manner similar to conventional art-disclosed thin walled structures particularly as it relates to processes for imparting a decorative or functional surface treatment (e.g., a coating, a plating, or otherwise).

For example, a particular preferred combination of materials herein may include two layers that flank a core material, the latter of which is preferably a filled polymeric material. The filled polymeric material preferably includes at least one polymer, which polymer may include, consist essentially of, or consist entirely of a thermoplastic polymer, or otherwise has characteristics that render it generally processable as a thermoplastic polymer. The filled polymeric material preferably also includes a filler phase, and preferably a phase having a filler that includes, consists essentially of, or consists entirely of a fiber phase, and particularly an elongated fiber phase, such as an elongated metal fiber phase. Such phase may be sufficiently positioned and/or distributed (e.g., wrapped, braided, aligned, entangled, or any combination thereof), and used in sufficient volume that an electrically conductive network across at least portions of the filled polymeric material is realized even if the polymer itself generally is not conductive. A particularly preferred elongated fibrous phase may also itself exhibit elongation (either or both individual fibers or the mass as a whole) and possibly strain hardening.

It should be appreciated that references to "layers" herein do not necessarily require discrete and separate pieces of material. For example, a layered composite may still be within the teachings herein if it includes a single sheet of a material that has been folded over upon itself to define two layers of the material, albeit sharing a common edge, between which is located the filled polymeric material.

Turning now with more particularity to the teachings herein, it is seen that in a first aspect there is contemplated a composite material that is made from layers of adjoining dissimilar materials, which includes at least one layer (e.g., a metal layer such as a metal face layer) and at least one polymeric layer, the composite being formable (e.g., stampable by application of a stress to cause plastic strain (e.g., at a relatively rapid rate) of the material or otherwise capable of being cold-formed on a press machine) into a formed panel. The composite material may be a composite laminate containing one metallic layer and one polymeric layer, or it may include one or more other layers. For example, it may be a laminate including one metallic layer interposed between two polymeric layers, or a laminate including a polymeric layer sandwiched between at least two opposing metallic layers. As indicated, a particularly preferred approach envisions this latter structure, the former structures possibly serving as precursors for the later structure. In such instance the method of forming a sandwich structure may include a step of applying a layer to a precursor to form a sandwich structure, a step of applying a first precursor to a second precursor to form a sandwich structure, or both.

Figure 1B:
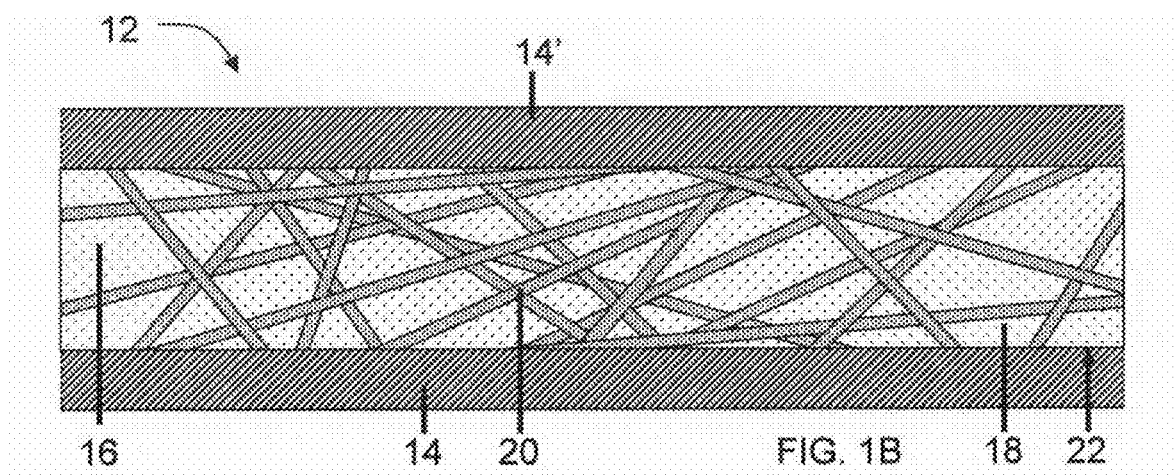
FIG. 1B illustrates a composite material having a polymeric core layer interposed between two metallic layers.

An example of a composite laminate 10 having one metallic layer 14 and one polymeric layer 16 is illustrated in FIG. 1A. A sandwich 12 may contain a first metallic layer 14, a second metallic layer 14' and a polymeric layer 16 (e.g., a polymeric core layer) interposed between the first and second metallic layers, as illustrated in FIG. 1B. Referring to FIGS. 1A and 1B, the polymeric layer 16 includes at least one polymer (e.g., a thermoplastic polymer) 18 and a fiber 20. The polymeric layer 16 and the first metallic layer 14 may have a common surface 22. As illustrated in FIGS. 1A and 1B some or all of the fibers may have a length and orientation such that they extend from one surface of the polymeric layer to the opposing surface of the polymeric layer. However, it will be appreciated that other fiber lengths and orientations are within the scope of the inventions. For example, the fraction of the fibers (e.g., metallic fibers) that extend between the two opposing faces of the polymeric layer may be less than 20%, less than 10%, less than 5%, or less than 1%. The fibers illustrated in FIGS. 1A and 1B are generally straight fibers. It will be appreciated from the teachings herein that preferred fibers are generally not straight. Preferred fibers have one or more bends along a length of the fiber, have a generally curved profile, or both.

As mentioned, in addition to the composite, multi-layered structures, another aspect of the invention contemplates a precursor polymeric layer sheet material (i.e., a single layer of the polymeric layer) including the thermoplastic polymer and the fiber (e.g., metallic fiber), that can be later sandwiched between two metallic layers.

Yet another aspect of the invention contemplates a precursor polymeric feedstock material containing the polymer and the fibers. Such a polymeric feedstock material may be formed (e.g., molded or extruded) into the polymeric layer (e.g., into a sheet) either as a single material or by diluting with one or more additional materials (e.g., one or more additional polymers). As such, the precursor polymeric feedstock material may include some or all of the components in the polymeric layer of the composite material. Preferably, the precursor polymeric feedstock material includes substantially all of the fiber for the polymeric layer.

In use, the composites may be deformed (e.g., formed, such as by stamping), attached to another structure (e.g., to steel or to another composite material), or both. A preferred approach is to employ a step of welding the composite of the invention to the other structure. The formed panel may be joined to other parts, when necessary, by techniques other than welding, such as by using adhesives, a brazing process, or the like. In both cases, the composite material (e.g., the laminate or sandwich sheet) is formable by low-cost stamping methods and yet is surprisingly free of the limitations that have been faced previously in the art. The unique features of the composite material render it an extremely attractive candidate for applications which traditionally utilize a regular monolithic metal sheet, such as in the body panels currently employed in the transportation (e.g., automotive) industry.

One unique feature of the invention is that it includes specific selection of the polymer (e.g., thermoplastic polymer) and the metal fibers, and incorporation of metal fibers and optional particles, as well as other optional fillers, into the polymeric matrix to produce a novel formable composite material (e.g. sandwich or laminate structure) for low-cost stamping operation. Another novelty is that the stampable sandwiches can be joined by conventional welding techniques such as resistance welding (e.g., spot welding, seam welding, flash welding, projection welding, or upset welding), energy beam welding (e.g., laser beam, electron beam, or laser hybrid welding), gas welding (e.g., oxyfuel welding, using a gas such as oxyacetylene), arc welding (e.g., gas metal arc welding, metal inert gas welding, or shielded metal arc welding). Preferred joining techniques include high speed welding techniques such as resistance spot welding and laser welding.

Various features of formable/stampable materials such test methods, test criteria, descriptions of defects, and descriptions of forming processes are described in the following publications, all expressly incorporated herein by reference:

M. Weiss, M. E. Dingle, B. F. Rolfe, and P. D. Hodgson, "The Influence of Temperature on the Forming Behavior of Metal/Polymer Laminates in Sheet Metal Forming", Journal of Engineering Materials and Technology, October 2007, Volume 129, Issue 4, pp. 530-537.

D. Mohr and G. Straza, "Development of Formable All-Metal Sandwich Sheets for Automotive Applications", Advanced Engineering Materials, Volume 7 No. 4, 2005, pp. 243-246.

J. K. Kim and T. X. Yu, "Forming And Failure Behaviour Of Coated, Laminated And Sandwiched Sheet Metals: A Review", Journal of Materials Processing Technology, Volume 63, No 1-3, 1997, pp. 33-42.

K. J. Kim, D. Kim, S. H. Choi. K. Chung, K. S. Shin, F. Bariat, K. H. Oh, J. R. Youn, "Formability of AA5182/polypropylene/AA5182 Sandwich Sheet, Journal of Materials Processing Technology, Volume 139. Number 1, 20 Aug. 2003, pp. 1-7.

Trevor William Clyne and Athina Markaki U.S. Pat. No. 6,764,772 (filed Oct. 31, 2001, issued Jul. 20, 2004).

Frank Gissinger and Thierry Gheysens, U.S. Pat. No. 5,347,099, Filed Mar. 4, 1993, Issued Sep. 13, 1994, "Method And Device For The Electric Welding Of Sheets Of Multilayer Structure".

Straza George C P, International Patent Application Publication (PCT): WO2007062061, "Formed Metal Core Sandwich Structure And Method And System For Making Same", Publication date: May 31, 2007.

Haward R. N., Strain Hardening of Thermoplastics, Macromolecules 1993,26, 5860-5869.

International Patent Application Publication No. WO2010/021899 published on Feb. 25, 2010 by Mizrahi.

U.S. Patent Application No. 61/290,384 (filed on Dec. 28, 2009 by Mizrahi).

U.S. Patent Application No. 61/089,704 (filed on Aug. 18, 2008 by Mizrahi).

U.S. Patent Application No. 61/181,511 (filed on May 27, 2009 by Mizrahi).

U.S. Patent Application Publication No. U.S. 2010/0040902A1, published on Feb. 18, 2010, by Mizrahi.

Materials

By way of example, the use of a fibrous filler in the polymeric layer is believed to facilitate composite manufacturing and surprisingly low levels may be employed to achieve the beneficial results herein. Surprisingly, the selection and combination of materials taught herein affords the ability to employ less metal per unit volume than conventional metal structures of like form (e.g., sheet metal) while still exhibiting comparable properties and characteristics. The problem that the skilled artisan might envision in such a combination of materials unexpectedly are avoided. In this regard, some of the behavioral characteristics of the materials that might be predicted are surprisingly avoided, are employed advantageously in the resulting composite, or both. The resulting laminates thus render themselves as attractive candidates to be a drop-in substitute for existing materials, for example, they can be employed instead of sheet steel, without the need for significant investment in resources to re-tool or significantly alter processing conditions.

Polymeric Layer

The polymeric layer generally may include or even consist essentially of a filled polymer, (e.g., a thermoplastic polymer filled with a reinforcing fiber, such as a metallic fiber). As such it is generally a filled polymeric material composite mass, which has a polymeric matrix and a mass of fiber distributed throughout the matrix.

The filled polymeric material for use in the polymeric layer preferably is one that generally would be characterized as being relatively rigid, relatively strong, have a relatively high elongation at break, have high strain hardening properties, is light weight, or any combination thereof, such as described in International Patent Application Publication No. WO2010/

021899 published on Feb. 25, 2010 by Mizrahi, incorporated herein by reference in its entirety.

Preferably, at least some of the polymer in the filled polymeric material is a thermoplastic, but it may be or include a thermoset polymer, particularly a thermoset polymer that is processable as a thermosplastic, but cured. Preferably, at least 50% (more preferably at least 60%, 70%, 80%, 90% or even 95%, if not 100%) by weight of the polymer used in the filled polymeric material is a thermoplastic polymer.

The filled polymeric material may have electrical conductivity properties (e.g., the filled polymeric material may be an electrical conductor) such that a conductive path is provided through the filled polymer and the composite material may be welded to another structure such as a sheet metal. The electrical conductivity properties of the polymeric core material may be achieved by employing metallic fibers and optionally metallic or carbon black particles that are dispersed in the polymer in a quantity to have at least a percolation concentration, such as described in International Patent Application Publication No. WO2010/021899 published on Feb. 25, 2010 by Mizrahi. The filled polymeric material and the composite materials of the present teachings may be weldable using art-disclosed weld schedules or with other weld schedules as described International Patent Application Publication No. WO2010/021899 published on Feb. 25, 2010 by Mizrahi. For example, the materials may allow for more economical weld schedules that are faster, require less energy, or both.

The filled polymeric material (e.g., the polymer of the filled polymeric material) may additionally include one or more additives known to the polymer compounding art, such as described in International Patent Application Publication No. WO2010/021899 published on Feb. 25, 2010 by Mizrahi. For example, the filled polymeric material may include halogenated flame retardant compounds disclosed in U.S. Pat. No. 3,784,509 (Dotson et. al., Jan. 8, 1974, see for example the substituted imides described in column 1, line 59 through column 4, line 64), U.S. Pat. No. 3,868,388 (Dotson et al. Feb. 25, 1975, see tor example the halogenated bisimides described in column 1, line 23 through column 3, line 39); U.S. Pat. No. 3,903,109 (Dotson et al. Sep. 2, 1975, see for example the substituted imides described in column 1, line 46 through column 4, line 50); U.S. Pat. No. 3,915,930 (Dotson et al. Oct. 28, 1975, see for example halogenated bisimides described in column 1, line 27 through column 3, line 40); and U.S. Pat. No. 3,953,397 (Dotson et al. Apr. 27, 1976, see for example the reaction products of a brominated imide and a benzoyl chloride described in column T, line 4 through column 2, line 28), each of which is incorporated by reference in its entirety.

The filled polymeric material may be free of a plasticizer or other relatively low molecular weight materials which may become volatilized (e.g., during a resistance welding process). If employed, the concentration of plasticizer or other relatively low molecular weight materials preferably is less than about 3 wt. %, more preferably less than about 0.5 wt. %, and most preferably less than about 0.1 wt. % based on the total weight of the filled polymeric material (e.g., such that the filled polymeric material does not delaminate from a metallic layer).

It is also possible the teachings herein contemplate a step of selecting materials, processing conditions, or both, so that during processing, delamination of the filled polymeric material from the metallic layer is substantially, or entirely avoided (e.g., delamination caused by vapor pressure buildup at an Interface between the filled polymeric material and the metallic layer sufficient for causing delamination).

Polymers

With more attention now to particular examples of polymers for use herein, the polymers used for the filled polymeric material preferably include thermoplastic polymers that either have a peak melting temperature (as measured according to ASTM D3418-08) or a glass transition temperature (as measured according to ASTM D3418-08) greater than about 50° C. (preferably greater than about 80° C., even more preferably greater than about 100° C., even more preferably greater than about 120"C, more preferably greater than about 160° C., even more preferably greater than 180° C., and most preferably greater than about 205° C.). The thermoplastic polymer may have a peak melting temperature, a glass transition temperature, or both that is less than about 300° C., less than about 250° C., less than about 150° C., or even less than about 100° C. They may be at least partially crystalline at room temperature or substantially entirely glassy at room temperature. Suitable polymers (e.g., suitable thermoplastic polymers) may be characterized by one or any combination of the following tensile properties (measured according to ASTM D638-08 at a nominal strain rate of 0.1 s$^{-1}$): a tensile modulus (e.g., Young's Modulus) greater than about 30 MPa, (e.g., greater than about 750 MPa, or greater than about 950 MPa); an engineering tensile strength (i.e., $\sigma_e$), a true tensile strength (i.e., $\sigma_1$, where $\sigma_1 = (1+\epsilon_e)\sigma_e$ where $\epsilon_e$ is the engineering strain), or both, greater than about 8 MPa (e.g., greater than about 25 MPa, greater than about 60 MPa, or even greater than about 80 MPa); or a plastic extension at break or elongation at failure of at least about 20% (e.g., at least about 50%, at least about 90%, or even at least about 300%). Unless otherwise specified, the term tensile strength refers to engineering tensile strength.

The polymer may preferably have strain hardening properties (e.g., a relatively high strain hardening modulus, a relatively low extrapolated yield stress, or both), such as described in International Patent Application Publication No. WO2010/021899 published on Feb. 25, 2010 by Mizrahi. As such, the strain hardening properties may be measured using the method of Haward R. N., Strain Hardening of Thermoplastics, *Macromolecules* 1993, 26, 5860-5869, incorporated herein by reference in its entirety.

Examples of thermoplastic polymers which may be used for the polymeric layer include polyolefins (e.g. polyethylene (such as linear low density polyethylene) and polypropylene), acetal copolymers, polyamides, polyamide copolymers, polyimides, polyesters (e.g., polyethylene terephthalates and polybutylene terephthalate), polycarbonates, thermoplastic polyurethanes, thermoplastic polyether-ester copolymers (such as a thermoplastic elastomer ether-ester material described in ASTM D 6835-08, incorporated herein by reference), acrylonitrile butadiene styrene copolymers, polystyrenes, copolymers including at least 60 wt. % of an α-olefin and at least one additional monomer (such as an ethylene copolymers including at least 80 wt. % ethylene), copolymers including any of these polymers, ionomers including any of these polymers, blends of any of these polymers, or any combination thereof. As can be appreciated from the above description, one or more polymers may be an elastomer, such as a thermoplastic elastomer.

The filled polymeric material preferably includes, or consists essentially of one or more polymers having sufficient adhesion to metal so that the polymer adheres to the metallic fibers, a metal layer, or both. For example, the filled polymeric material may include, or consist essentially of one or more polymers having a sufficient concentration of polar groups so that the polymer adheres to the metallic fibers, the metal layer, or both.

Of course, as the teachings elsewhere support, it is also surprisingly possible that a generally non-polar group containing polymer may be employed as a predominant polymeric component and satisfactory adhesion results obtained. In particular, it is possible that good resistance to delamination may be achievable in the absence of the use in the composite mass of a major amount, or even in the absence of substantial amounts of (e.g., potentially up to 30%, 20%, 10%, 5% or even 1% by weight) any polar polymer.

Additionally, it is unexpected and surprising that such bond strength between the polymeric matrix composite mass is not compromised, and in fact may be enhanced, by the presence of the fibers within the polymeric matrix composite mass, by the use of a phosphatized and/or galvanized steel sheets, or both. For example, it is believed possible that as compared with a sandwich composite that includes polymer without fibers sandwiched between plain carbon, uncoated steel, a composite as described herein that includes the fibers and which may also include a galvanized and/or phosphatized steel layers as the sandwiching layers, the latter could surprisingly achieve a 2× or even 3× increase in peel strength, such as when tested according to DIN 11339. Such results may be possible by employing a polymer having polar groups, a polymer that does not include polar groups or both. One approach is to employ a mixture of a thermoplastic polymer (e.g., a polyolefin, such as a linear low density polyethylene) and an elastomer (e.g., a thermoplastic elastomer, such as an ethylene-containing co-polymer), an ionomer, or both.

The filled polymeric material may include, consist of or consist essentially of one or more generally ductile polymers (e.g., an elastomer, such as a thermoplastic elastomer) that are ductile when impacted at low temperatures (e.g., at a temperature of about −30° C., at a temperature of about −40° C., or both) so that composite material can be stamped in a high speed stamping operation, so that the composite material does not fracture when impacted at −30° C. or −40° C., or both. By way of example, the generally ductile polymers include polymers having a glass transition temperature of about −25° C. or less, about −30° C. or less, about −35° C. or less, about −40° C. or less, or about −45° C. or less. Without limitation, the glass temperature of the generally ductile polymer may be about −100° C. or more. The ductile polymer may be a semi-crystalline polymer having a crystallinity of about 90 wt. % or less, about 80 wt. % or less, about 70 wt. % or less, about 60 wt. % or less, about 50 wt. % or less, or about 40 wt. % or less. Such polymers may be characterized as having a high tensile elongation, preferably about 50% or more, more preferably about 80% or more, and most preferably about 110% or more, as measured by ASTM D638.

As discussed herein, in various aspects of the invention, the composite material is subjected to one or more electrical resistance welding operations. It will be appreciated that such welding operations may produce high temperatures near the weld that may degrade polymer into low molecular weight compounds (i.e., compounds that volatilize at a temperature of about 200° C., or at about 300° C.), cause low molecular weight compounds to volatize (possibly exerting an internal pressure in the composite that may result in delamination), or both. As such, the polymer may be selected so that it does significantly degrade during a welding operation to produce low molecular weight compounds. The polymer may be selected so that the concentration of low molecular weight compounds, if any, is sufficiently low so that the filled polymeric material does not delaminate from a metal layer during a resistance welding operation. Furthermore, the composite material preferably is substantially free of, or even entirely free of polymers or other compounds that when heated in a welding operation produce compounds that can degrade metal, such as the metal of the metal layer.

Preferred polymers reduce or prevent corrosion of the metallic fibers, the metal layers or both, particularly in environments that are humid (e.g., about 90% relative humidity, about 95% relative humidity, or more), hot (e.g., about 25° C., about 40° C., or about 60° C.), corrosive (e.g., a mist of salt water containing about 5 wt. % sodium chloride), or any combination thereof. For example, the polymer may adhere to the metal and prevent water from contacting the surface of the metal. As such, the filled polymeric composition may include, or consist essentially of one or more polymer having an equilibrium water concentration (e.g., measured at about 25° C., at a relative humidity of about 90%) of about 8 wt. % or less, preferably about 3 wt. % or less, more preferably about 1 wt. % or less, even more preferably about 0.2 wt. % or less, and most preferably about 0.05 wt. % or less. The filled polymeric material may be substantially free of, or even entirely free of polymer that corrodes metal. If a polymer that corrodes metal is employed, the polymer is preferably compounded with one or more additives, one or more additional polymers, or both, so that metal corrosion is reduced or substantially prevented.

A single thermoplastic polymer may provide one or more desirable characteristics for the filled thermoplastic composition or the light weight composite material, such as those characteristics described herein. As such, the thermoplastic polymer may consist essentially of a single thermoplastic polymer. However, it may be desirable to use a blend or mixture of thermoplastic polymers, or even to employ a plurality of layers containing one or more different thermoplastic polymers for achieving one or more of the characteristics, for reducing the cost, or both. The filled thermoplastic composition may include at least i) a first thermoplastic polymer and ii) a second thermoplastic polymer that is different from the first thermoplastic polymer. For example, the filled thermoplastic composition may include a first thermoplastic polymer and a second thermoplastic polymer having one or any combination of the following characteristics: the first thermoplastic polymers may have one or more oxygen atoms, one or more nitrogen atoms, or both; the second thermoplastic polymer may be substantially free of oxygen and nitrogen atoms; the second thermoplastic polymer may include a total concentration of oxygen and nitrogen atoms, based on the total weight percent of the polymer that is less than the total concentration of oxygen and nitrogen atoms in the first thermoplastic polymer (preferably the difference between total concentration of oxygen and nitrogen atoms in the first thermoplastic polymer and the second thermoplastic polymer is about 2 wt. % or more, more preferably about 4 wt. % or more, even more preferably about 10 wt. % or more, and most preferably about 20 wt. % or more). The second thermoplastic polymer may have a tensile modulus, as measured according to ASTM D638, that is about 15% or more different (preferably about 25% or more different, more preferably about 50% or more different, and most preferably about 70% or more different) from the tensile modulus of the first thermoplastic polymer. The second thermoplastic polymer may have a rate of water absorption, as measured by ASTM D570 that is about 15% or more different (preferably about 25% or more different, more preferably about 50% or more different, and most preferably about 70% or more different) from the rate of water absorption of the first thermoplastic polymer. The second thermoplastic may a softening point such as a heat deflection temperature as measured according to ASTM D648 that is about 5° C. or more different (preferably about 15° C. or more different, more preferably about 25° C. or more different, even more preferably about 35° C. or more different, and most preferably about 50° C. or more different) from the heat distortion temperature of the first thermoplastic polymer. Surprisingly, such mixtures including a first thermoplastic polymer and a second thermoplastic polymer may result in materials having properties that are not found in a single thermoplastic polymer.

Preferable polyolefins for use in any of the embodiments herein include polypropylene homopolymers (e.g., isotactic polypropylene homopolymer), polypropylene copolymers (e.g., random polypropylene copolymers, impact polypropylene copolymer, or other polypropylene copolymer containing isotactic polypropylene), polyethylene homopolymer (e.g., high density polyethylene, or other polyethylene having a density greater than about 0.94 g/cm$^{3-}$; linear low density polyethylene (e.g., having a density below that of a high density polyethylene, such as below about 0.93 g/cm$^3$) or otherwise), polyethylene copolymers (e.g., preferably including at least about 60% ethylene, more preferably at least 80 wt. % ethylene), a blend of any of these polymers, or any combination thereof. Polypropylene homopolymers and polypropylene copolymers may be substantially free of atactic polypropylene. If present, the concentration of atactic polypropylene in the polypropylene preferably is less than about 10 wt. %. Suitable polypropylene copolymers and polyethylene copolymers include copolymers that consist essentially of (e.g., at least 98% by weight), or consist entirely of one or more α-olefins. Other polypropylene copolymers and polyethylene copolymers that may be used include copolymers containing one or more comonomers selected from the group consisting acrylates, vinyl acetate, acrylic acids, or any combination thereof. The concentration of the comonomer may be less than about 40 wt. %, preferably less than about 25 wt. %, more preferably less than about 20 wt. %, and most preferably less than about 15 wt. % based on the total weight of the copolymer. Exemplary polyethylene copolymers that may be used include ethylene-co-vinyl acetate (i.e., "EVA", for example containing less than about 20 wt. % vinyl acetate), ethylene-co-methyl acrylate (i.e., EMA), ethylene co-methacrylic acid, or any combination thereof.

Polyamides generally are polymers having one or more repeating units that includes an amide groups along the backbone of the polymer chain. For example, polyamides may be a reaction products of a diamine and a diacid. Other examples of polyamides include monadic polyamides. Generally, monadic polyamides are formed by a ring opening reaction. Exemplary polyamides which are formed from a diamine and a diacid may include polyamides (e.g., polyamides) containing reaction products of either adipic acid or terephthalic acid with a diamine. Exemplary monadic polyamides include polyamide 6, and poly(p-benzamide). The polyamide may be a homopolymer, a copolymer, or a mixture thereof. Preferred polyamide homopolymers which may be used in the present invention include polyamide 3, polyamide 4, polyamide 5, polyamide 6, polyamide 6T, polyamide 66, polyamide 610, polyamide 612, polyamide 69, polyamide 7, polyamide 77, polyamide 8, polyamide 9, polyamide 10, polyamide 11, polyamide 12, and polyamide 91. Copolymers containing any of the above mentioned polyamides may also be used. Polyamide copolymers may be random copolymers, block copolymers, a combination thereof. Examples of polyamide copolymers include polymers having a plurality of different amides (i.e., a polyamide-polyamide copolymers), polyesteramide copolymers, polyetheresteramide copolymers, polycarbonate-ester amides, or any combination thereof.

A polyamide-polyamide copolymer may include two or more of the polyamides described herein for a polyamide homopolymer. Preferred polyamide-polyamide copolymers include, polyamide 6 and polyamide 66, polyamide 610, or any combination thereof. For example, a polyamide-polyamide copolymer may consist essentially of two or more polyamides selected from the group consisting of polyamide 6, polyamide 66, polyamide 69, polyamide 610, polyamide 612, and polyamide 12. More preferably the polyamide-polyamide copolymer consists essentially of two or more polyamides selected from the group consisting of polyamide 6, polyamide 66, polyamide 69, and polyamide 610. Examples of such copolymers include polyamide 6/66, polyamide 6/69, and polyamide 6/66/610. A particularly preferred polyamide-polyamide copolymer is a polyamide 6/66 copolymer. The concentration of polyamide 66 in the polyamide 6/66 copolymer may be about 90 weight percent or less, preferably about 70 weight percent or less, more preferably about 60 weight percent or less, and most preferably about 50 weight percent or less, based on the total weight of the copolymer. The concentration of polyamide 6 in the polyamide 6/66 copolymer may be about 10 weight percent or more, preferably about 30 weight percent or more, more preferably about 40 weight percent or more, and most preferably about 50 weight percent or more, based on the total weight of the copolymer. Another particularly preferred polyamide-polyamide copolymer is a random or block copolymer of a polyamide 6 and polyamide 69. Polyamide copolymers (i.e., a copolymer including one or more amide monomers) may include a polyether, such as an aliphatic ether or an aromatic ether.

If employed, a polyamide copolymer may be used alone or as a mixture with one or more additional thermoplastics. The polyamide copolymer may be a block copolymer, a random copolymer, an alternating copolymer, a graft copolymer, or any combination thereof. Without limitation, the polyamide copolymer may include polyamide 6, polyamide 6,9, or both. For example the polyamide copolymer may be a copolymer include polyamide 6 at a concentration of about 1 wt. % or more, preferably about 5 wt. % or more, more preferably about 10 wt. % or more and most preferably about 20 wt. % or more. If employed, the concentration of the polyamide 6 in the copolymer may be about 99 wt. % or less, preferably about 95 wt. % or less, even more preferably about 90 wt. % or less and most preferably about 80 wt. % or less. The polyamide copolymer may be a copolymer include polyamide 6,9 at a concentration of about 1 wt. % or more, preferably about 5 wt. % or more, more preferably about 10 wt. % or more and most preferably about 20 wt. % or more. If employed, the concentration of the polyamide 6,9 in the copolymer may be about 99 wt. % or less, preferably about 95 wt. % or less, even more preferably about 90 wt. % or less and most preferably about 80 wt. % or less. A particularly preferred polyamide copolymer includes or consists essentially of polyamide 6 and polyamide 6,9. The polyamide copolymer may be blended with one or more polyamide homopolymers. Without limitation, polyamide homopolymers that may be employed include or consist essentially of polyamide 6, polyamide 6,6, polyamide 6,9, or any combination thereof. Such a blend may have a sufficient amount of polyamide copolymer so that the filled polymeric layer has good toughness, good formability, or both. Such a blend may have a sufficient amount of polyamide homopolymer so that the filled polymeric material has a high heat deflection temperature, a generally low cost, or both. The weight ratio of the polyamide homopolymer to the polyamide copolymer may be about 1:99 or more, about 5:95 or more, about 10:90 or more, about 30:70 or more, or about 50:50 or more. The weight ratio of the polyamide homopolymer to the polyamide copolymer may be about 99:1 or less, about 95:1 or less, about 90:10 or less, about 80:20 or less, or about 70:30 or less. A particularly preferred blend of polyamide homopolymer and polyamide copolymer is a blend of polyamide 6 and polyamide 6/6,9 copolymer (e.g., at a ratio of about 30:70 to about 70:30).

Polyethers which may be used in a polyamide copolymer may be formed by the polymerization of a diol, such as a glycol (e.g., with one or more additional monomers). Exemplary glycols which may be used include propylene glycol, ethylene glycol, tetramethylene glycol, butylene glycol, or any combination thereof. Any of the above copolymers may be a block copolymer including a relatively soft block and a relatively hard block. The ratio of the elastic modulus of the relatively hard block to the relatively hard block may be greater than about 1.1, preferably greater than about 2, and more preferably greater than about 10. The relatively hard block may include or consist essentially of one or more aromatic amides, one or more semi-aromatic amides, or one or more aliphatic amides. The relatively soft block may include a polyester, such as a polyester described above (e.g., an aliphatic polyester), a polycarbonate (e.g., an aliphatic polycarbonate), a polyether (e.g., an aliphatic polyether), or any combination thereof. Amide copolymers may include a first monomer (e.g., a first amide monomer) and a second monomer, each both independently having a concentration greater than about 5 wt. %, preferably greater than about 20 wt. %, more preferably greater than about 30 wt. % and most preferably greater than about 40 wt. %, based on the total weight of the copolymer. The concentration of the first monomer, the second monomer, or both independently may be less than about 95 wt. %, preferably less than about 80 wt. %, more preferably less than about 70 wt. %, and most preferably less than about 60 wt. % based on the total weight of the copolymer. The combined concentration of the first monomer and the second monomer may be greater than about 50 wt. %, preferably greater than about 75 wt. %, more preferably greater than 90 wt. %, and most preferably greater than about 95 wt. % based on the total weight of the copolymer.

The polyamide copolymer may be characterized as a thermoplastic elastomer, having a relatively low melting temperature, a relatively low elastic modulus, or both. For example, the copolymer may have a relatively low melting temperature compared to the highest melting temperature of any of the homopolymer consisting essentially of one of the monomers of the copolymer. For example, the copolymer may have a relatively low elastic modulus compared to the highest elastic modulus of any of homopolymer consisting essentially of one of the monomers of the copolymer. Preferred polyamide copolymers or other polymeric materials for use herein may be characterized by a melting point less than about 220° C. (preferably less than about 190° C., more preferably less than about 170° C., and most preferably less than about 150° C.) as measured according to ASTM D3418-08; a melting point greater than about 60° C. (preferably greater than about 80° C., more preferably greater than about 100° C., and most preferably less than about 110° C.) as measured according to ASTM D3418-08; an elastic modulus less than about 2.5 GPa (preferably less than about 1.2 GPa, more preferably less than about 800 MPa, and most preferably less than about 500 MPa), as measured according to ASTM D638-08; an elastic modulus greater than about 50 MPa (preferably greater than about 100 MPa, and more preferably greater than about 200 MPa), as measured according to ASTM D638-08; a strain at break greater than about 50% (preferably greater than about 90%, more preferably greater than about 300%), as measured according to ASTM D638-08; or any combination thereof.

The teachings herein may employ a combination of two or more polymers, at least one of which may be a polyolefin, such as a linear low-density polyethylene. The polymer may be capable of exhibiting an ultimate tensile strength of at least about 50 MPa, more preferably at least about 60 MPa (per ASTM D882-10), and ultimate elongation (per ASTM D882-10) of at least about 500%, and more preferably at least about 600%. Examples of commercially available polyolefins may include HIFOR® LT74104, from Westlake Chemical; Dowlex™ 2553, 2045G, 2517, from The Dow Chemical Company; Equistar Petrothene Select GS710060; MarFlex® 7109 from Chevron Phillips; or SABIC LLDPE 726 Series, from SABIC.

Suitable ionomers mixtures of an ionic compound and a copolymer including a polar monomer and a nonpolar monomer. Suitable non-polar monomers that may be used in the copolymer of an ionomer include α-olefins, such as α-olefins having from 2 to about 20 carbon atoms (e.g., from about 2 to about 8 carbon atoms). Exemplary nonpolar monomers that may be employed in a copolymer (with or without an ionomer) herein include ethylene, propylene, 1-butene, 1-hexene, and 1-octene, or any combination thereof. Suitable polar monomers include monomers which upon polymerization have an ionic group. Without limitation, examples of polar monomers that may be employed in a copolymer (with or without an ionomer) herein include acids, such as acids having from about 2 to about 20 carbon atoms (e.g., methacrylic acid, ethacrylic acid. The concentration of the polar monomer in any copolymer herein (with or without an ionomer) may be less than about 40 wt. %, preferably less than about 25 wt. %, and more preferably less than about 20 wt. %, based on the total weight of the ionomer. The concentration of the polar monomer in the ionomer may be about 1 wt. % or more, about 2 wt. % or more, about 3 wt. % or more, about 5 wt. % or more, about 7 wt. % or more, or about 10 wt. % or more. Suitable ionic compounds for any ionomer herein may include compounds containing one or more alkali earth metals, one or more alkaline earth metals, or both. Without limitation, the ionic compound may include sodium, potassium, lithium, calcium, magnesium, or any combination thereof. Particularly preferred ionic compounds include sodium hydroxide, potassium hydroxide, calcium hydroxide and magnesium hydroxide. By way of example, commercially available ionomers include SURLYN® poly(ethylene-co-methacrylic acid) ionomer and NAFION® perfluorosulfonate ionomers. An example of a generally non-polar polymer that may be employed herein (e.g., alone or as part of a mixture of polymers) is an ethylene-octene copolymer. A suitable non-polar polymer may have an ultimate tensile strength (MPa), per ASTM D638-08 of at least about about 7.5 and more preferably at least about 9.0, an ultimate tensile elongation (%) per ASTM D638-08 of at least about 700, and more preferably at least about 800, a flexural modulus (MPa) per ASTM D790-10 (1% secant) of at least about 13, and more preferably at least about 15 and (2% secant) of at least about 12 and more preferably at least about 14. Example of possible commercially available polymers may include Tafmer® A-0550S from Mitsui Chemicals, Exact™ 9071 from ExxonMobil, Engage™ 8150 from The Dow Chemical Company, or Infuse™ 9007 from The Dow Chemical Company.

If employed, an ionomer or non-polar polymer as described above may be used alone or as a mixture with one or more additional polymers, such as one or more additional thermoplastics. For example, the ionomer may be used in a mixture including one or more polyolefins.

Exemplary polyolefins that may be employed in any of the embodiments herein or that optionally may be mixed with an ionomer include homopolymers and copolymers including about 50 wt. % or more of an α-olefin having about 2 to about 10 carbons. Preferred polyolefins for mixing with an ionomer include those having about 50 wt. % or more of ethylene, propylene, butane, or hexane. More preferred polyolefins for mixing with an ionomer include those having about 50 wt. % or more of ethylene, or propylene. The concentration of the α-olefin (e.g., the concentration of the ethylene or propylene) In the polyolefin preferably is about 60 wt. % or more, more preferably about 70 wt. % or more, even more preferably about 80 wt, % or more, and most preferably about 90 wt. % or more, based on the total weight of the polyolefin. Preferred polyolefins include polyolefins consisting essentially of one or more α-olefins. For example, the concentration of the one or more α-olefins may be about 90 wt. % or more, about 95 wt. % or more, about 98 wt. % or more, about 99 wt. % or more, or about 99.9 wt. % or more, based on the total weight of the polyolefin. Without limitation, the polyolefin used in a blend with an ionomer may include or consist essentially of high density polyethylene (e.g., having a density of about 0.945 to about 0.990 g/cm$^3$), low density polyethylene, linear low density polyethylene (e.g., a copolymer having a density of about 0.915 to about 0.930 g/cm$^3$), medium density polyethylene (e.g., a copolymer having a density of about 0.930 to about 0.945 g/cm$^3$), very low density polyethylene (e.g., having a density of about 0.900 to about 0.915 g/cm$^3$), polyethylene plastomers (e.g., a copolymer having a density of about 0.860 to about 0.900 g/cm$^3$, preferably from about 0.870 to about 0.895 g/cm$^3$), isotactic polypropylene homopolymer, isotactic polypropylene copolymers having a crystallinity of about 5 wt. % or more, impact polypropylene, polypropylene block copolymers including one or more blocks of isotactic polypropylene, mixtures thereof, or any combination thereof.

Examples of other polyolefins suitable for use herein, such as for optional blending or other mixing with another polymer (e.g., with an elastomer, an ionomer, or otherwise) are copolymers including or consisting essentially of i) about 60 wt. % or more of an α-olefin; and ii) one or more monomers selected from the group consisting of vinyl acetate, methyl acrylate, butyl acrylate, acrylic acid, methyl methacrylate, methacrylic acid, and any combination thereof. The mixture of an ionomer and a polyolefin may include a sufficient amount of the ionomer so that the polymer adheres to the metal layers, to the metallic fiber, or both. The weight ratio of the ionomer to the polyolefin may be about 1:99 or more, about 3:97 or more, about 5:95 or more, about 10:90 or more, or about 20:80 or more. The weight ratio of the ionomer to the polyolefin may be about 99:1 or less, about 90:10 or less, about 70:30 or less, about 50:50 or less, or about 40:60 or less.

Suitable polyurethanes include thermoplastics formed from polymerizing one or more diisocyanates and one or more diols. Preferred polyurethanes include thermoplastic formed from polymerizing one or more diisocyanates and two or more diols. The polyurethane may be a thermoplastic polyurethane elastomer, such as one including a first polymer block containing a first diol and a second polymer block than includes a second diol, where the first block is a relatively hard block (e.g., having a relatively high modulus) and the second block is a relatively soft block (e.g., having a modulus lower than the relatively hard block). The concentrations of the relatively hard block and the relatively soft block may each independently be greater than about 5 wt. %, preferably greater than about 10 wt. %, and more preferably greater than about 20 wt. % based on the total weight of the copolymer. The concentrations of the relatively hard block and the relatively soft block may each independently be less than about 95 wt. %, preferably less than about 90 wt. %, and more preferably less than about 20 wt. % based on the total weight of the copolymer. The total concentration of the relatively hard block and the relatively soft block may be greater than about 60 wt. preferably greater than about 80 wt. %, more preferably greater than about 95 wt. %, and most preferably greater than about 98 wt. % based on the total weight of the polymer. Commercially available thermoplastic polyurethanes (TPU) that may be employed include ESTANE® brand TPU available from Lubrizol Corporation, ELASTOLAN® brand TPU available form BASF and DESMOPAN® brand TPU available from Bayer.

The thermoplastic polymers are preferably relatively long chain polymers, such that they may have a number average molecular weight greater than about 20,000, preferably greater than about 60,000, and most preferably greater than about 140,000. They may be unplasticized, plasticized, elastomer modified, or free of elastomer. Semi-crystalline polymers may have a degree of crystallinity greater than about 10 wt %, more preferably greater than about 20 wt %, more preferably greater than about 35 wt %, more preferably greater than about 45 wt %, and most preferably greater than about 55 wt %. Semi-crystalline polymers may have a degree of crystallinity less than about 90 wt %, preferably less than about 85 wt %, more preferably less than about 80 wt %, and most preferably less than about 68 wt %. Crystallinity of the thermoplastic polymer may be measured using differential scanning calorimetry by measuring the heat of fusion and comparing it to art known heat of fusion for the specific polymer.

The polymer of the filled polymeric material may also contain up to about 10 wt % of a grafted polymer (e.g., a grafted polyolefin such as isotactic polypropylene homopolymer or copolymer, or a polyethylene homopolymer or copolymer) which is grafted with a polar molecule, such as maleic anhydride. The concentration of the grafted compound may be about 0.01 wt. % or more based on the total weight of the grafted polymer. Particularly preferred grafted polymers include from about 0.1 wt, % to about 3 wt. % maleic anhydride.

The thermoplastic polymer may include a substantially amorphous polymer (e.g., a polymer having a crystallinity less than about 10 wt. %, preferably less than about 5 wt. %, and most preferably less than about 1 wt. %, as measured by differential scanning calorimetry at a rate of about 10° C./min). For example, the thermoplastic polymer may include a substantially amorphous polymer having a glass transition temperature greater than 50° C., preferably greater than 120° C., more preferably greater than about 160° C. even more preferably greater than about 180° C. and most preferably greater than about 205° C., as measured by dynamic mechanical analysis at a rate of about 1 Hz. Exemplary amorphous polymers include polystyrene containing polymers, polycarbonate containing polymers, acrylonitrile containing polymers, and combinations thereof:

Without limitation, examples of styrene containing copolymers that may be employed in the filled polymeric material are described in International Patent Application Publication No. WO2010/021899 published on Feb. 25, 2010 by Mizrahi.

As appreciated from the teachings herein, in lieu of or in addition to any thermoplastic polymer, the polymeric layer may employ an elastomer having one or both of the following properties: a relatively low tensile modulus at 100% elongation (e.g., less than about 3 MPa, preferably less than about 2 MPa), a relatively high tensile elongation at break (e.g., greater than about 110%, preferably greater than about 150%) both measured according to ASTM D638-08 at a nominal strain fate of about 0.1 s$^{-1}$. Examples of elastomers that may be employed, are described in International Patent Application Publication No. WO2010/021899 published on Feb. 25, 2010 by Mizrahi.

It is possible that one or more polymers may be employed in any of the embodiments of the teachings herein that are crosslinkable or crosslinked. They may be be thermoset materials or monomers, or other precursors of thermoset materials. They may be epoxy based, rubbers, urethane, or some other suitable material. One or more other agents may be employed for allowing crosslinking (and crosslinking may be employed) in response to a stimulus, such as heat, radiation (e.g., ultraviolet and/or infrared radiation), moisture or any combination thereof.

Though it is possible that some amounts of epoxy may be used, the polymer of the filled polymeric material preferably is substantially free or entirely free of epoxy, or other brittle polymers (e.g., polymers having an elongation at failure of less than about 20% as measured according to ASTM D638-08 at a nominal strain rate of about 0.1 s$^{-1}$), or both. If present, the concentration of epoxy, other brittle polymers, or both is preferably less than about 20%, more preferably less than about 10%, more preferably less than about 5%, and most preferably less than about 2% by volume, based on the total volume of the filled polymeric material.

In one particularly preferred aspect of the invention the filled polymeric material includes a one or more polyamide copolymers, one or more thermoplastic polyurethanes, one or more thermoplastic polyether-ester copolymers, one or more ionomers, or any combination thereof. The polyamide copolymer may be any of the polyamide copolymers described above herein. Preferred polyamide copolymers include polyamide-polyamide copolymers, polyesteramide copolymers, polyetheresteramides, polycarbonate-esteramide copolymers, or any combination thereof. Any of (the thermoplastics may be a random copolymer or a block copolymer. Any of the thermoplastics may be a thermoplastic elastomer. By way of example, the filled polymeric material may include a polyester amide thermoplastic elastomer, a polyetheresteramide thermoplastic elastomer, a polycarbonate-esteramide thermoplastic elastomer, a polyether-ester thermoplastic elastomer, a amide block copolymer thermoplastic elastomer, or any combination thereof. The filled polymeric material may optionally include one or more polymers that is not a copolymer. For example filled polymeric material may include one or more polyamide homopolymer. Particularly preferred polyamide homopolymers include polyamide 6 and polyamide 6.6. If employed the concentration of the one or more polyamide homopolymers preferably is relatively low (e.g., compared with the concentration of the one or more copolymers. If present, the concentration of the one or more polyamide homopolymers preferably is about 50 weight percent or less, more preferably about 40 weight percent or less, even more preferably about 30 weight percent or less, and most preferably about 25 weight percent or less, based on the total weight of the polymer in the filled polymeric material.

Filled polymeric materials that include a generally polar polymer may have sufficient attraction between the polar polymer and the metallic fibers so that there is no need for a functionalized polymer to improve the adhesion between the thermoplastic and the metallic fibers. As such, the filled polymeric material may be substantially free of, or even entirely free of polymers having maleic anhydride, acrylic acid, an acrylate, an acetate, or any combination thereof. For example, the filled polymeric may be substantially free of, or entirely free of maleic grafted polymers. If employed, the concentration of polymers having maleic anhydride, acrylic acid, an acrylate, an acetate, or any combination in the filled polymeric material preferably is about 20 weight percent or less, more preferably about 10 weight percent or less, even more preferably about 5 weight percent or less, even more preferably about 1 weight percent or less, and most preferably about 0.1 weight percent or less, based on the total weight of the polymer in the filled polymeric material. By way of example, generally polar polymers include acetal homopolymers or copolymers, polyamide homopolymers or copolymers, polyimide homopolymers or copolymers, polyester homopolymers or copolymers, polycarbonate homopolymers or copolymers, and any combination thereof. Filled polymeric materials that include a generally polar polymer may be substantially free of, or entirely free of polyolefin homopolymers and copolymers including about 50 weight percent of one or more olefins. If employed, the total concentration of any polyolefin homopolymers and any copolymers including about 50 weight percent of one or more olefins may be about 30 weight percent or less, preferably about 20 weight percent or less, more preferably about 10 weigh percent or less, even more preferably about 5 weight percent or less, and most preferably about 1 weight percent or less, based on the total weight of the polymers in the filled polymeric material.

The life cycle use of the composite material may include a step of heating the composite material to a temperature sufficiently high so that the metal can be reclaimed. As such, the polymer may be heated to a temperature at which it burns or otherwise thermally degrades. Preferred polymers for use in the composite material include polymers that do not form toxic compounds (e.g., toxic gases and/or carcinogenic compounds) during combustion or thermal decomposition (e.g., at a temperature of about 600° C. or more).

Fillers

The filled polymeric material (e.g., the filled thermoplastic polymeric layer) contains one or more fillers. The fillers may be a reinforcing filler, such as fibers, and more particularly metallic fibers. Metallic fillers (e.g., metallic fibers) that may be employed are described in International Patent Application Publication No. WO2010/021899 published on Feb. 25, 2010 by Mizrahi. For example, metallic fibers which may be used in the invention include fibers formed from metals such as steel (e.g., low carbon steel, stainless steel, and the like), aluminum, magnesium, titanium, copper, alloys containing at least 40 wt % copper, other alloys containing at least 40 wt % iron, other alloys containing at least 40 wt % aluminum, other alloys containing at least 40 wt % titanium, and any combination thereof. The metallic fibers may include or consist essentially of carbon steel, such as a steel that has about 10 wt. % or less chromium, about 7 wt. % or less chromium, or about 3 wt. % or less chromium.

The metallic fibers may have a melting or liquidus temperature sufficiently low so that during a step of welding (such as electrical resistance spot welding), some or all of the metallic fibers in the region between the weld tips at least partially melt (e.g., entirely melt) before one or both of the metallic layers melt. The electrical resistivity of the filled polymeric material may be higher (e.g., about 10 times higher, or even about 100 times higher) than the electrical resistivity of the metal layer, so that the metallic fibers begin to melt before the metal layer begins to melt. The welding process may employ a step of sufficiently cooling the weld tips so that the metallic fibers melts before the metal layer begins to melt. As such, the metallic fibers may include or consist essentially of a metal (e.g., a steel) having a melting temperature or liquidus temperature less than, the same as, or even greater than the steel in the first metallic layer, the second metallic layer, or both.

The filled polymeric material may contain non-metallic conductive fibers, such as those described in International Patent Application Publication No. WO2010/021899 published on Feb. 25, 2010 by Mizrahi.

The metallic fibers or other fillers employed in the filled polymeric material preferably are capable of reducing or eliminating the corrosion of the metallic layers. In one approach, one or more of the metallic fibers or other fillers in the filled polymeric material may have a relatively high galvanic activity. For example, the metallic fibers or other fillers in the filled polymeric material may have a higher galvanic activity than the metal employed for the surface of one or preferably both of the metallic layers (of the composite material) in contact with or facing the filled polymeric material. As such, it may be desirable for the filled polymeric material to be substantially, or even entirely free of fillers having a low galvanic activity. By way of example, this approach to reducing the corrosion of a composite material may use a filled polymeric material that is substantially or entirely free of carbon black. The one or more fillers having a relatively high galvanic activity preferably have an anodic index that is greater than the metallic layer by about 0.05 V or more, more preferably by about 0.1 V or more, even more preferably by about 0.20 V or more, and most preferably by about 0.25 V or more. The one or more fillers having a relatively high galvanic activity may be any art known material having a higher galvanic activity than the metallic layer. By way of example, such fillers may includes one or more zinc containing materials, one or more magnesium containing materials, one or more aluminum containing materials, or any combination thereof. The one or more fillers may include a first filler and a second filler having a higher galvanic activity than the first filler, where the second filler is a sacrificial filler. If the filled polymeric materials includes a first filler and a sacrificial filler, the first filler preferably is a metallic fiber. The sacrificial filler may have a relatively high total surface area (i.e., of all of the sacrificial filler particles) compared to the surface are of the metallic layer, the total surface area of the first filler, or preferably both. For example, the ratio of the total surface are of the sacrificial filler to the surface area of the metallic layer may be about 1.5 or more, preferably about 3 or more, more preferably about 10 or more, and most preferably about 50 or more. If the filled polymeric materials includes a first filler and a sacrificial filler, the first filler may have a surface having a galvanic activity that is less than, equal to, or greater than the galvanic activity of the surface of the metallic layer. If the first filler has a surface having a galvanic activity greater than the galvanic activity of the surface of the metallic layer, the first filler may function as a sacrificial filler. As such, a second sacrificial filler may not be needed and the filled polymeric may be substantially or entirely free of a second sacrificial filler.

Some or all of the metallic fibers may provide cathodic protection to one or more metallic layer of the composite material. For example, the metallic fibers may include fibers formed of a material or coated with a material having a standard electrochemical reduction potential less than the standard electrochemical reduction potential of the first metallic layer, the second metallic layer, or both. Metals having a generally low standard electrochemical reduction potential include metals having a standard electrochemical reduction potential less than steel (e.g., SAE carbon steel 1015). Metals having generally low standard electrochemical reduction potentials include aluminum, zinc, and magnesium. As such, some or all of the metallic fibers may include or consist essentially of aluminum, zinc, magnesium, an alloy thereof, or any combination thereof. Particularly preferred fibers for cathodic protection are zinc fibers. Some or all of metallic fibers may include metal (e.g., steel) that has been coated and/or plated, such as by a process that includes one or more steps of electrocoating, electroplating, or both. For example, the metal may be coated by a step of galvanizing. A metallic fiber may be coated on one or more, or even all of its sides. Without limitation, a fiber may be coated by spraying, by dipping (e.g., by hot dipping). By way of example, a metallic fiber may be prepared from a sheet or foil that is coated (e.g., by spraying or dipping) on one or two surfaces and then cut into narrow strips or ribbons. As such, the metallic fiber may have one or two coated surface. As another example, the fibers may be coated after being formed into fibers so that all sides of the fibers are coated. As yet another example, a continuous filament may be coated and then cut into fibers so that all of the sides of the fiber are coated except the ends. The coating preferably includes a metal selected from aluminum, zinc, magnesium, an alloy thereof, or any combination thereof. As such the metallic fibers may include one or more coating layers of a metal that includes aluminum, zinc, magnesium, an alloy thereof, or any combination thereof, and one or more substrate layers that are free of aluminum, zinc, magnesium, an alloy thereof, or any combination thereof. Particularly preferred coated metallic fibers include a coating layer having a standard electrochemical reduction potential less than the standard electrochemical reduction potential of the metallic layers of the composite material (e.g., the first metal layer, the second metal layer or both). Particularly preferred coated fibers are fibers that are coated with a layer including zinc or a zinc alloy.

If employed, the fibers providing cathodic protection may be provided at a sufficient quantity, size, surface area, or any combination thereof so that corrosion of the surface of the metallic layer (e.g., the surface facing the polymeric layer) during prolonged exposure to a corrosive environment (e.g., at about 40° C., with a mist spray of salt water (e.g., containing about 5 wt. % sodium chloride), for about 200 or more (e.g.,) hours is reduced or essentially eliminated.

The metallic fibers preferably have dimensions and distribution of dimensions as described in International Patent Application Publication No. WO2010/021899 published on Feb. 25, 2010. Without limitation, the metallic fibers may have a weight average length, $L_{avg}$, greater than about 1 mm, more preferably greater than about 2 mm, and most preferably greater than about 4 mm. Suitable fibers may have an $L_{avg}$ of less than about 200 mm, preferably less than about 55 mm, more preferably less than about 30 mm, and most preferably less than about 25 mm. The weight average diameter of the fibers may be greater than about 0.1 μm, more preferably greater than about 1.0 μm, and most preferably greater than about 4 μm. The weight average diameter of the fiber may be less than about 300 μm, preferably less than about 50 μm, even more preferably less than about 40 μm, and most preferably less than about 30 μm.

The metallic fibers may have any shape. Preferably, the metallic fibers are curvilinear. For example, generally linear metallic fibers may be used. More preferably the metallic fibers are not straight fibers along the length of the fiber. By way of example, metallic fibers that are not straight, may have one or more bends, may have a generally arcuate profile, may have a generally helical shape, or any combination thereof. Metallic fibers that are initially straight, preferably become fibers that are not straight (such as described above) when combined with the thermoplastic polymer.

The cross-section of the metallic fibers, perpendicular to the length of the fiber, may have any geometry. For example, the cross-section may have one or more sides that are generally arcuate, one or more sides that are generally straight, or any combination thereof. By way of example, the metallic fibers may have a cross-section that is elliptical, circular, polygonal, star-shaped, semi-circular, or the like.

In one embodiment of the invention the metallic fibers preferably have one or more generally flat surfaces, such as a generally flat surface in the longitudinal direction of the fiber. Without being bound by theory, it is believed that a metallic fiber having a generally flat surface may increase the electrical conductivity of the filled polymeric material and/or the light weight composite compared with a material in which the metallic fibers have a generally cylindrical shape. The cross-section of a metallic fiber, in the transverse direction of the fiber (i.e., perpendicular to the length of the fiber), may have one or more generally straight sides. For example, the cross-section of a metallic fiber in the transverse direction may have four or more generally straight sides, two or more parallel sides, or both. Without limitation, the metallic fiber may have a cross-section that is generally rectangular, generally a parallelogram, generally a polygonal having four or more sides, or generally a square. It will be appreciated that the metallic fiber may have a cross-section that is generally elliptical, such as an ellipse having an aspect ratio of about 3 or more, preferably about 5 or more, and more preferably about 7 or more. The cross-section of the metallic fiber in the transverse direction may be characterized by a width (i.e., the longest dimension) and a thickness (e.g., the thinnest dimension and/or the direction perpendicular to the width). The ratio of the width to the thickness of the fibers may be about 1 or more, about 2 or more, or about 3 or more. The ratio of the width to the thickness of the fibers may be about 30 or less, about 20 or less, or about 15 or less. Exemplary fibers are fibers prepared by cutting a metallic foil (e.g., having a thickness that is about the thickness of the fibers) into narrow ribbons (e.g., the spacing between cuts may be the width of the fibers). It will be appreciated from the teachings herein that the metallic fibers may be prepared from a monolithic metallic foil, or from a metallic foil having one or more coatings (e.g., a coating on both large surfaces), such as a coating that offers galvanic protection.

The metallic fibers have a length that is greater than the width and the thickness. The weight average length of the metallic fibers preferably is about 200 µm or more, more preferably about 500 µm or more, even more preferably about 800 µm or more, and most preferably about 1 mm or more. It will be appreciated that the metallic fibers may have a weight average length of about 10 mm or more, or even be generally continuous. For applications that require spot welding, the metallic fibers preferably have a weight average length that is less than the diameter of a weld tip typically used for spot welding, so that the metallic fibers may more easily flow away from the weld zone during a welding process. For example, the metallic fibers may have a weight average length of about 20 mm or less, about 10 mm or less, about 7 mm or less, about 5 mm or less, about 4 mm or less, or about 3 mm or less. The aspect of a fibers may be estimated by dividing the length of the fiber by $(4A_T/\pi)^{1/2}$, where $A_T$ is the cross-sectional area of the fiber in the transverse direction. The aspect ratio of the fiber may be about 5 or more, about 10 or more, about 20 or more, or about 50 or more. The aspect ratio of the fibers may be about 10,000 or less, about 1,000 or less, or about 200 or less. It will be appreciated from the teachings herein that metallic fibers having an aspect ratio greater than 10,000 may employed.

When used in the polymeric layer between two metallic layers, the metallic fibers preferably are present as a mass of fibers. The mass of metallic fibers may be interconnected. The mass of metallic fibers may be entangled. The mass of fibers may form mechanical interlocks (i.e., two or more fibers may be mechanically interlocked). The mass of metallic fibers preferably spans with thickness of polymeric layer so that the mass of fibers (e.g., the network of metallic fibers) electrically connects the two metallic layers. Although a single metallic fiber may span the thickness of the polymeric layer, preferably none of the metallic fibers span the thickness of the polymeric layer. If metallic fibers span the thickness of the polymeric layer, the fraction of the fibers that span the thickness preferably is about 0.4 or less, more preferably about 0.20 or less, even more preferably about 0.10 or less, even more preferably about 0.04 or less, and most preferably about 0.01 or less. The fibers in the mass of fibers preferably are arranged in a non-ordered arrangement. For example, the maximum number of neighboring metallic fibers that are arranged in a generally aligned arrangement may be less than about 100, preferably less than about 50, more preferably less than about 20, even more preferably less than about 10, and most preferably less than about 5. More preferably the mass of fibers are arranged in a generally random arrangement. Individual metallic fibers that contact a surface of one of the metallic layers preferably are free of a planar contact. As such, the composite material may be characterized as being essentially free, or even entirely free of planar contacts between a metallic fiber and a metallic layer. Fibers that contact a metallic surface, preferably have a line contact, a point contact, or a combination, thereof. Some of the metallic fibers may contact one of the metallic layers, however few, if any of the metallic fiber will contact a metallic layer over a large portion of the length of the metallic fiber. As such, a large fraction of the metallic fibers do not contact a metallic layer or at least have a significant portion that is not in contact with the metallic layer. The fraction of the metallic fibers that contact a metallic layer along at least half of the length of the fiber is preferably about 0.3 or less, more preferably about 0.2 or less, even more preferably about 0.1 or less, even more preferably about 0.04 or less, and most preferably about 0.01 or less.

The metallic fibers are preferably sufficiently thin and present in a sufficient concentration so that many fibers are arranged between the surfaces of the layer. For example, the average number of fibers that intersect a line parallel to the thickness direction of the polymeric layer and going through the polymeric layer preferably is about 3 or more, more preferably about 5 or more, more preferably about 10 or more, and most preferably about 20 or more. Without being bound by theory, it is believed that a large number of metallic fibers advantageously allows for more homogeneous deformation of the material, such as during a stamping process.

The concentration of the metallic fibers is preferably greater than about 1 volume %, more preferably greater than about 3 volume %, even more preferably greater than about 5 volume %, even more preferably greater than about 7 volume %, even more preferably greater than about 10 volume %, and most preferably greater than about 12 volume % based on the total volume of the filled polymeric material. The metallic fibers may be present in the filled polymeric material at a concentration less than about 60 volume %, preferably less than about 50 volume %, more preferably less than about 35 volume %, still more preferably less than about 33 volume %, and most preferably less than about 30 volume % (e.g., less than about 25 volume %, or even less than about 20, 10, or 5 volume %). For example the amount of fiber may be about 1%, 2%, 3%, 4%, 5%, 6%, 7%, 8%, 9%, or 10%, by volume based on the total volume of the filled polymeric material, or within a range bounded by those values (such as from about 1% to about 6%). It is possible that composites herein may employ a concentration of metallic fibers that surprisingly is substantially lower than the amount of a particle filler necessary to achieve similar welding characteristics. Moreover, it is also possible that the fibers and materials are selected so that better welding performance surprisingly may be realized at a relatively low concentration of metallic fibers as compared with an identical composite material having a higher concentration of metallic fibers. For example, it is surprisingly seen that using a filled polymeric material having about 10 volume % metallic fiber results in composite materials having superior welding characteristics compared with those made with filled polymeric materials having higher concentrations of metallic fiber.

The thermoplastic polymer material may be present in the filled polymeric material at a concentration greater than about 40 volume %, preferably greater than about 65 volume %, more preferably greater than about 67 volume %, still more preferably greater than about 70 volume %, and most preferably greater than about 75 volume % (e.g., at least about 80 volume %, at least about 90 volume %, or even at least about 95 volume %).

The volume ratio of the polymer (e.g., the thermoplastic polymer) to the fibers (e.g., the metallic fibers) is preferably greater than about 2.2:1, more preferably greater than about 2.5:1, and most preferably greater than about 3:1. The volume ratio of the polymer (e.g., the thermoplastic polymer) to the fibers (e.g., the metallic fibers) is preferably less than about 99:1, more preferably less than about 33:1, even more preferably less than about 19:1, and most preferably less than about 9:1, (e.g., less than about 7:1).

The material of any core in the sandwich composites herein may contain pores or voids, or may be substantially free of pores and voids. Preferably, the concentration of pores and voids in the filled polymeric material is less than about 25 volume %, more preferably less than about 10 volume %, still more preferably less than about 5 volume %, and most preferably less than about 2 volume % (e.g., less than about 1% by volume), based on the total volume of the filled polymeric material.

The fiber (e.g., the conductive fiber, such as the metallic fiber) preferably is present at a concentration greater than about 40 volume %, more preferably greater than about 70 volume %, and most preferably greater than about 80% (e.g., greater than about 90 volume %, or even greater than about 95 volume %) based on the total volume of the filler in the filled polymeric material.

The combined volume of the polymer (e.g., thermoplastic polymer) and the metallic fibers is preferably at least about 90% by volume, more preferably at least about 95% by volume and most preferably at least about 98% by volume based on the total volume of the filled polymeric material.

The metallic fibers provide one or any combination of electric conductivity for welding, a reinforcement for strengthening, or strain hardening the polymeric structure by utilizing fibers that as metals are capable of extending and imparting better strain hardening properties to the polymeric core. As such, the tensile elongation (at failure) of the metal fibers is preferably greater than about 5%, more preferably greater than about 30%, and most preferably greater than about 60% as measured according to ASTM A370-03a.

It is possible that the materials herein may employ in combination with fibers, a metallic particle. Metallic particles may be spherical, elongated, or of any shape other than a fiber shape. Metallic particles which may be employed include those described in International Patent Application Publication No. WO2010/021899 published on Feb. 25, 2010.

The fibers (e.g., the metallic fibers) or the combination of the fibers and the metallic particles preferably are dispersed (e.g., randomly dispersed) in the polymeric matrix at a volumetric concentration of less than about 30% (more preferably less than about 25%, and most preferably less than about 20%) by volume of the total polymeric layer). If metallic particles are employed, the ratio of the volume of the fibers (e.g., the metallic fibers) to the volume of the metallic particles in the filled polymeric material layer may be greater than about 1:30, preferably greater than about 1:1, and most preferably greater than about 2:1.

In one aspect of the invention, metallic particles, metallic fibers, or both may be obtained by a step of grinding offal and/or scrap such as described in International Patent Application Publication No. WO2010/021899 published on Feb. 25, 2010 by Mizrahi. The offal and/or scrap may be derived from the metal sheet that is employed to make sandwich composites herein. Thus, to the extent that the sheet metal has been coated or otherwise treated to resist corrosion, the offal and/or scrap may also include such coating or treatment. The fibers thus may be in the form of comminuted or otherwise shredded phosphatized and/or galvanized steel, which may be high strength steel.

A particularly preferred metallic fiber that may be used, optionally with one or more other fibers, is a carbon steel having a generally rectangular cross-section in direction transverse to the length, a weighted average thickness of about 10 to about 70 µm, a weighted average width of about 40 to about 200 µm, and a weighted average length of about 0.8 to about 5 mm. Surprisingly this metallic fiber can be used in a composite material having an electrical conductivity in the through-thickness direction that is larger (e.g., by about 50% or more, or even by about 100% or more) relative to an identical composite material except the fibers are replaced by the same weight of a stainless steel fiber having a generally cylindrical cross-section and a diameter of about 10 µm or less.

Figure 3:
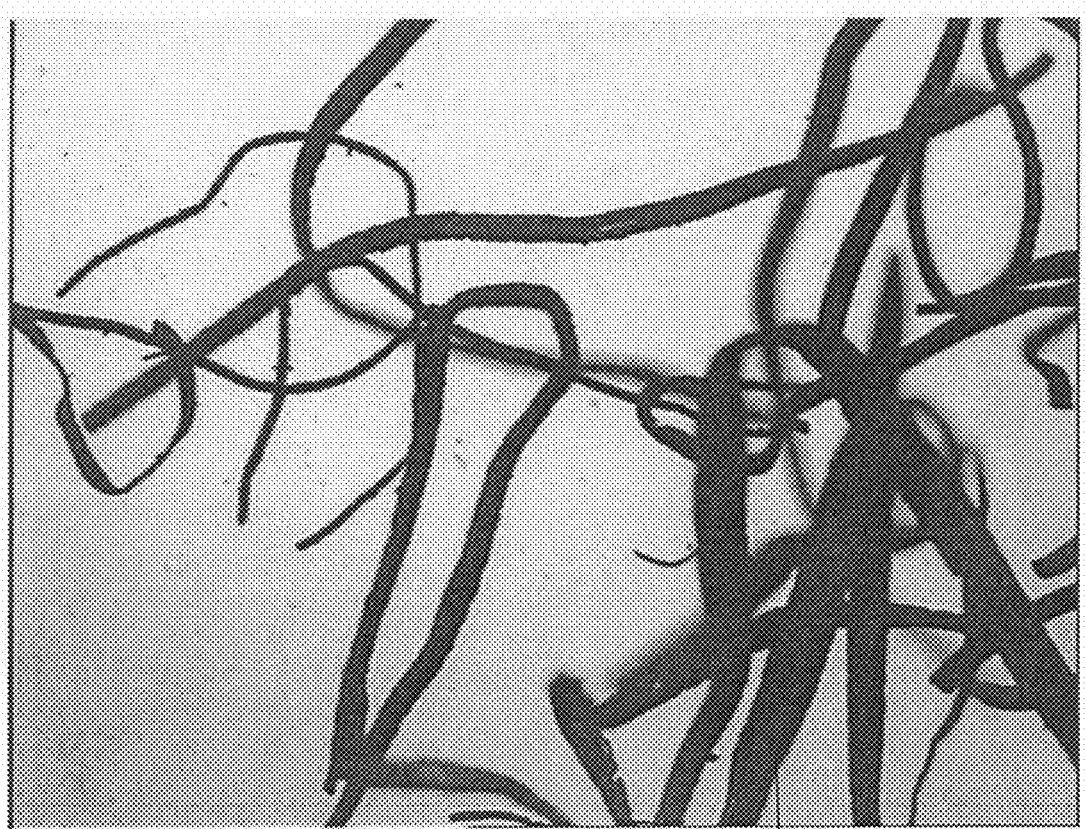
FIG. 3 is a micrograph of illustrative metallic fibers that may be employed in the core layer.

With reference to FIG. 3, the metallic fibers 20″ may have a cross-section in the direction transverse to the long direction that includes one, two or more generally straight sides (such as a generally rectangular cross-section). The length of the metallic fibers may have regions that are generally straight, regions that are generally arcuate, or both. The metallic fibers may be sufficiently long, have sufficient curvature (e.g., along the length of the fibers), be present in sufficient quantity or any combination thereof, so that an entangled mass of fibers is formed.

Figure 4:
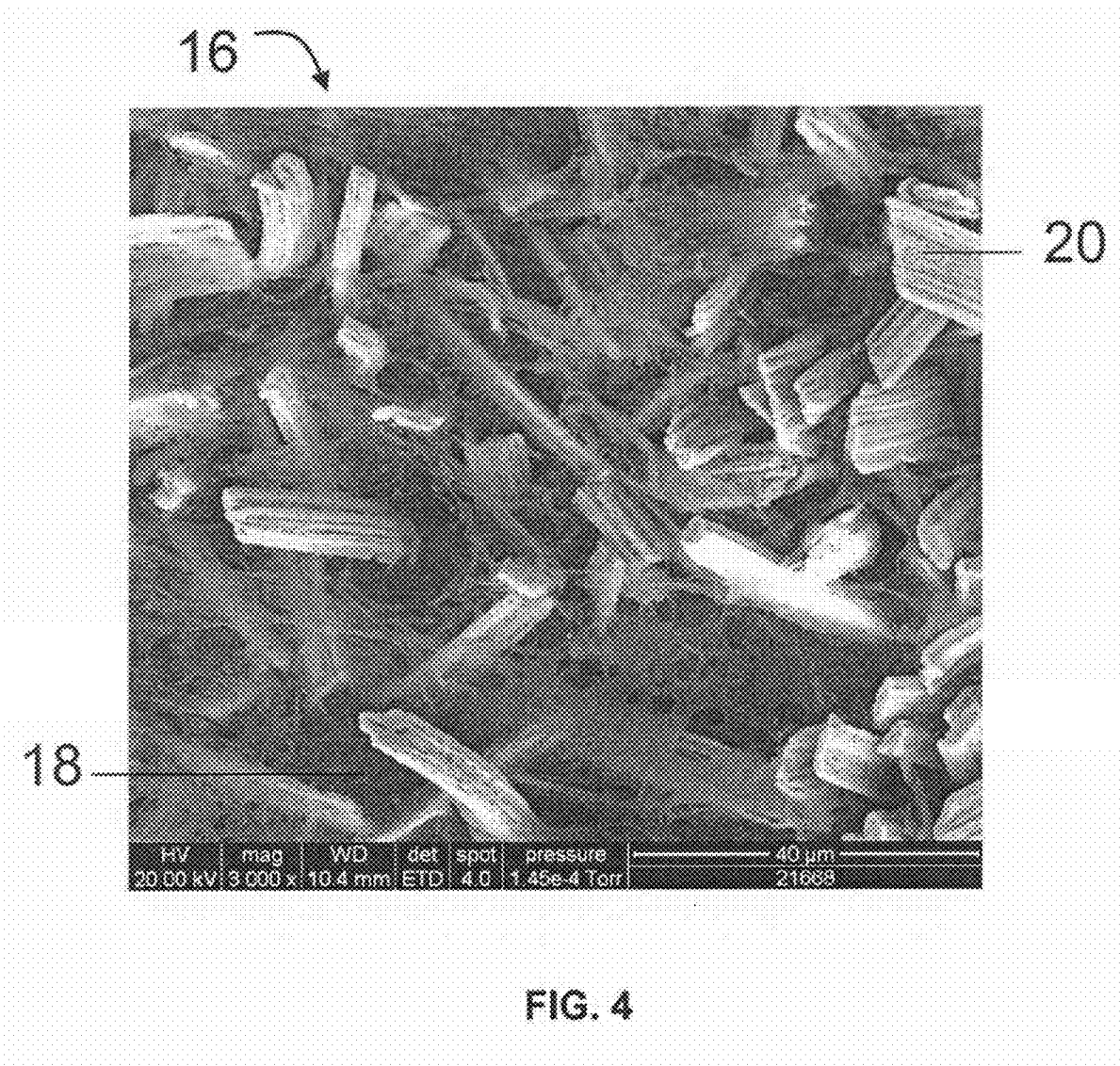
FIG. 4. is a micrograph of an illustrative core layer including metallic fibers and a polymer.

FIG. 4 is an illustrative micrograph of a section of a core layer 16 including metallic fibers 20 and a polymer 18. As illustrated in FIG. 4, fibers may sufficiently overlap so that an electrical current can be transferred through the core layer. For example, the electrical conductivity of the core layer may be sufficient so that the composite material can be welded using electrical resistance welding.

Figure 5:
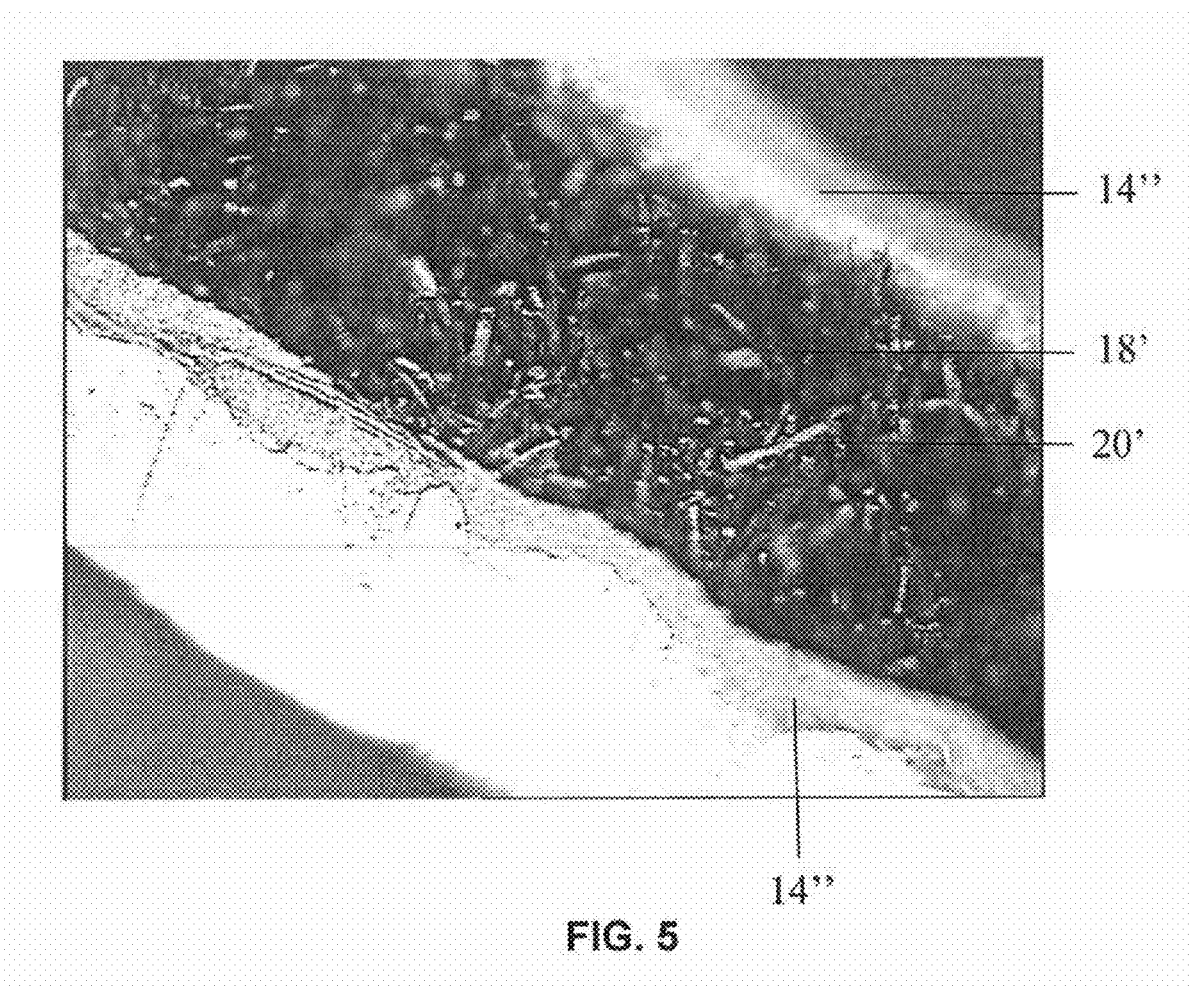
FIG. 5 is a micrograph of an illustrative light weight composite including two metal layers, metallic fibers, and a polymer.

FIG. 5 illustrates an edge of an illustrative composite material including metallic fibers 20′ having a generally rectangular cross-section in the direction transverse to the long direction of the fibers. The core layer includes an entangled mass of metallic fibers 20′ and a polymer 18′ sandwiched between two metallic layers 14″.

As will be seen, the metallic fibers preferably are selected so that the composite material has generally god weld characteristics. For example, the concentration of the metallic fibers, the size of the metallic fibers, the amount of contact between the metallic fibers, the shape of the metallic fibers, the amount of contact between a metallic fiber and the metal layers, or any combination thereof of may be selected so that the composite material has a generally good weld processing window, a generally high electrical conductivity, a generally high static contact resistance, or any combination thereof. A generally good weld processing window may be characterized for example by a high weld current range, a high weld time range, or both.

In addition to the above fillers, one or more art-disclosed conventional fillers may also be employed herein in their art-disclosed proportions, examples of which may include talc, mica, wollastonite, nanoclays, calcium carbonate, silicates, or the like.

The Test Method for Weld Current Range Measurement

The current range for a test material can be measured by welding a stack consisting of a sheet of the test material and a sheet of a control monolithic steel (such as a sheet of galvanized steel) having the same thickness as the sheet of the test material. The weld may be performed using two electrodes. The electrode against the test material has a face diameter, d. The electrode against the sheet of the control steel may be equal to or greater than d. The weld time and the weld pressure are fixed and may be predetermined, such as from a standard weld schedule for a material. The weld button size may be measured by separating the two sheets. The measurement is started by selecting a current that produces a weld button greater than 0.95 d. The weld current is then decreased incrementally until the weld button is less than d. The weld current is then increased until a poor weld is obtained. The minimum current that produces an acceptable weld (e.g., a weld having a weld button size of at least 0.95 d) is the minimum weld current. At high weld currents, a poor weld may be indicated by metal expulsion, sticking of a sheet to an electrode, a loud weld popping noise, or otherwise, or any combination thereof. The highest current that produces an acceptable weld is the maximum weld current. The weld current range is the difference between the maximum weld current and the initial weld current. By way of example, the weld current range may be performed using a composite material having a thickness of about 0.8 mm, and galvannealed steel sheet having a thickness of about 0.8 mm. The electrode on the composite material may have a diameter of about 3.8 mm and the electrode on the galvannealed steel may have a thickness of about 4.8 mm. An compressive force of about 610 psi may be applied. The weld conditions may include a mid frequency DC weld current having a frequency of about 1,000 Hz, an upslope time of about 50 miliseconds, and a weld time of about 200 miliseconds. The materials preferably have a width of about 25 mm and a thickness of 25 mm or 75 mm.

Figure 6:
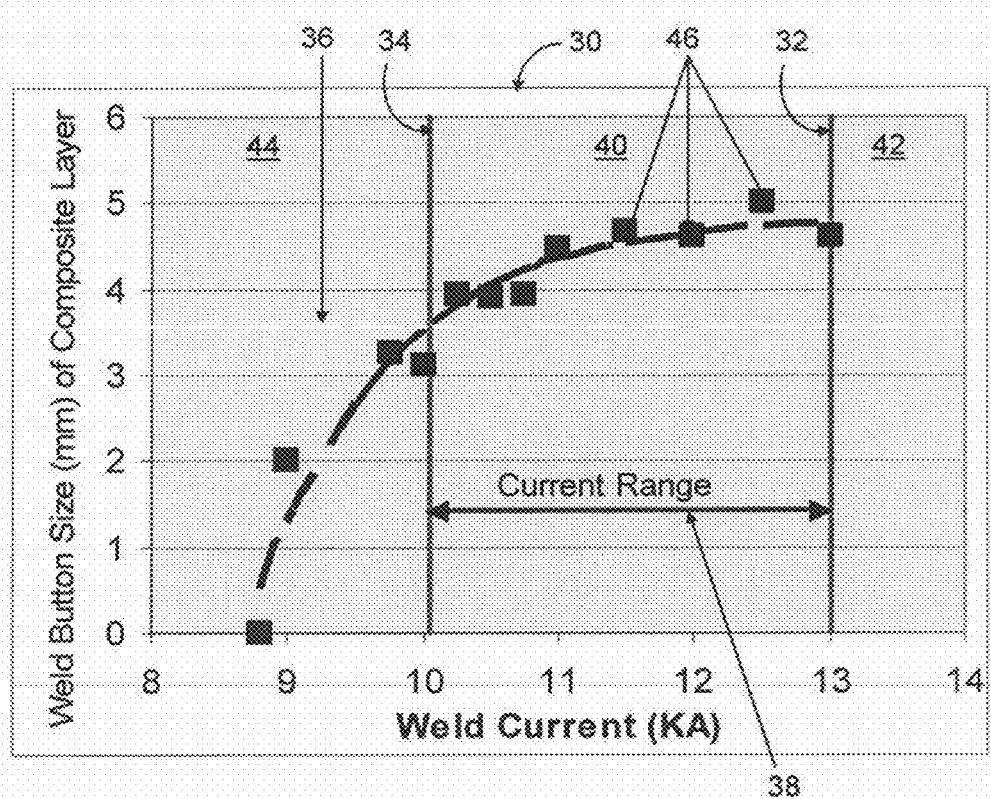
FIG. 6 is a curve showing the relationship between the weld button size (in units of mm) and the weld current (in units of kA) for a light weight composite material welded to galvannealed metal having a weld current range of more than 2.0 kA (e.g., about 3.0 kA).

The weld current range for the composite material, Ic, when welded to a sheet of monolithic steel having the same thickness as the composite material is preferably greater than the current range for two monolithic sheets of steel, Im, having the same thickness as the composite material. The ratio of Ic to Im is preferably about 1.1 or more, more preferably about 1.2 or more, even more preferably about 1.3 or more, even more preferably about 1.4 or more, and most preferably about 1.5 or more. The current range of the composite material, Ic, preferably is about 1.5 kA or more, more preferably about 1.7 kA or more, even more preferably about 1.9 kA or more, even more preferably about 2.1 kA or more, even more preferably about 2.3 kA or more, and most preferably about 2.5 kA or more. FIG. 6 illustrates the weld current range for a composite material having a surprisingly high weld current range.

Test Method for Measuring Static Contact Resistance

The static contact resistance may be measured by placing a stack consisting of the composite sheet and a sheet of cold rolled steel having a thickness of about 0.8 mm between two class I—RWNA electrodes (preferably having a face diameter of about 4.8 mm), applying a force of about 500 psi for about 45 seconds or more without welding the two sheets, and measuring the average resistance of the weld stack for the 5 seconds following the time at which the resistance is stable. A stable resistance may be determined by a resistance change of less than 2% per second, less than 1% per second, or less than 0.5% per second. Preferably, the static contact resistance may be measured using sheets having a thickness of about 0.8 mm, a width of about 25 mm and a length of about 25 mm or about 75 mm. However, sheets having other thicknesses, lengths, and widths may be employed.

The static contact resistance of the composite material preferably is about 0.0020 Ω or less, more preferably about 0.0017 Ω or less, even more preferably about 0.0015 Ω or less, even more preferably about 0.0012 Ω or less, and most preferably about 0.0008 Ω or less.

Without being bound by theory, it is believed that having a static contact resistance greater than monolithic steel is useful for increasing achieving a high weld current range. As such, the ratio of the static contact resistance of the composite material to the static contact resistance of steel (e.g., cold rolled steel, galvanized steel, galvannealed steel, or any combination thereof) preferably is about 1 or more, more preferably about 1.2 or more, even more preferably about 1.5 or more, even more preferably about 2 or more, even more preferably about 3 or more, even more preferably about 4 or more, even more preferably about 5 or more and most preferably about 10 or more. It will be appreciated that if the static contact resistance is too high, the composite may have difficulty in passing a current and thus not be easily welded. As such, the ratio of the static contact resistance of the composite material to the static contact resistance of steel (e.g., cold rolled steel, galvanized steel, galvannealed steel, or any combination thereof) preferably is about 1000 or less, more preferably about 300 or less, even more preferably about 100 or less, even more preferably about 75 or less, and most preferably about 40 or less.

Metal Layers

As discussed, it is envisioned that composites herein may employ a sandwich structure by which a mass of a polymeric core is flanked on opposing sides by spaced apart layers. For example, a structure herein may include two sheets (e.g., metal sheets) that have a metal fiber reinforced polymeric core material disposed between the sheets and preferably in contact with the sheets. The metal layers (e.g., the first metallic layer and the second metal layer) of the sandwich construction may be made of a suitable material (e.g., metal) in the form of foils or sheets or other layers having equal or unequal thickness (e.g., average thickness) across the layer. Each metallic layer may have a generally constant thickness or may have a thickness that varies. The face metal on each side may be made of materials having the same or different properties and be made of the same or different metals. If the metal faces are made of metal sheets of unequal thickness, materials having different properties; or materials having different metal. The composite material may have a marking or other means of identifying and distinguishing the different metal faces. The layers, may be the same or different in composition, size (e.g., thickness, width, volume, or otherwise), shape, or other features, relative to each other layer. The metal layer may have a surface treatment for helping to resist corrosion (e.g. a coating with zinc, phosphorus, or both). Thus, prior to or after making a composite with the filled polymeric layer, one or more metal layer may be galvanized, phosphatized or both.

Examples of metal layers that may be employed are described in described in International Patent Application Publication No. WO2010/021899 published on Feb. 25, 2010 by Mizrahi.

The ability to down gauge sheets of steel using high strength steel in panel applications, such as automotive panel applications, is generally not limited by the strength of the steel, but rather by the flexural modulus of the steel. Surprisingly, the filled polymeric layer provides sufficient stiffness with respect to the flexural modulus of the composite material so that further down gauging is possible. As such, a particularly preferred steel for use in one or more metal layers (e.g., the first metal layer, the second metal layer, or both) of the composite material is a high strength steel. Without limitation the high strength steel may have a yield strength of about 280 MPa or more, preferably about 280 MPa or more, more preferably about 320 MPa or more, and most preferably about 340 MPa or more. The high strength steel may have a yield strength of about 600 MPa or less. Without limitation the high strength steel may have a tensile strength of about 340 MPa or more, preferably about 370 MPa or more, more preferably about 400 MPa or more, even more preferably about 430 MPa, and most preferably about 450 MPa or more. The high strength steel may have a tensile strength of about 800 MPa or less.

The first metal layer, the second metal layer, or both may include a sufficient amount of high strength steel so that the flexural modulus of the composite material is at least about 200 GPa, as measured according to ASTM D790, wherein the concentration of the filled polymeric layer is at sufficiently high so that the density of the composite material is about 0.8 dm or less, where dm is the weighted average density of the first metal layer and the second metal layer. Surprisingly such composite materials may have one or both of the following characteristics a high yield strength of about 100 MPa or more (preferably about 120 MPa or more, more preferably about 140 MPa or more, even more preferably about 170 MPa or more, even more preferably about 200 MPa or more, and most preferably about 240 MPa or more); or a high tensile strength of about 160 MPa or more (preferably about 200 MPa or more, more preferably about 220 MPa or more, even more preferably about 250 MPa or more, even more preferably about 270 MPa or more, even more Preferably about 290 MPa or more, and most preferably about 310 MPa or more).

Preferred metal layers have a generally uniform thickness so that the properties of the composite material do not vary, such as in a periodic pattern. For example, the difference between the highest thickness and the lowest thickness, divided by the average thickness, in a 100 mm×100 mm section of a metal layer may be about 20% or less, about 10% or less, or about 5% or less.

One or both of the metal faces preferably may be relatively thick, such that the metal face does not wrinkle, tear, or form other defects when preparing and/or processing the composite material. Preferably, the thickness of one or both of the metal faces is at least about 0.05 mm, more preferably at least about 0.10 mm, even more preferably at least about 0.15 mm, and most preferably at least about 0.18 mm. The sheets may have a thickness less than about 3 mm, preferably less than about 1.5 mm, and more preferably less than about 1 mm, and most preferably less than about 0.5 mm. For example, the composite material may be used in an automotive panel requiring at least one class A or class B surface, preferably at least one class A surface (e.g., after a stamping step, a welding step, an electrocoating step, a painting step, or any combination thereof). Such a composite material may have a first surface which is a class A surface and a second surface which is not a class A surface. The class A surface may be the surface of a first, metal face having a relatively high thickness and the surface that optionally is not a class A surface may be the surface of a second metal face having a relatively low thickness (e.g., at least about 20% or even at least about 40% less than the thickness of the first metal face). In general, the ratio of the thickness (e.g., average thickness) of the first metal layer to the thickness of the second metal layer may be from about 0.2 to about 5, preferably from about 0.5 to about 2.0, more preferably from about 0.75 to about 1.33 and most preferably from about 0.91 to about 1.1.

Composite Material

The composite material may be in the form of a multi-layered sheet, e.g., a sandwich structure including sheets of a material such as a metal that sandwich a core of the filled polymeric material. The sheets may have a total average thickness less than about 30 mm, preferably less than about 10 mm, more preferably less than about 4 mm and most preferably less than about 2 mm; and preferably greater than about 0.1 mm, more preferably greater than about 0.3 mm, and most preferably greater than about 0.7 mm). The composite material may have a generally uniform thickness or the composite material may have a thickness that varies (e.g., a random or periodic variation in one or more directions). For example, the variation in the thickness may be such that the standard deviation of the thickness is less than about 10% of the average thickness. The standard deviation of the thickness is preferably less than about 5% of the average thickness, more preferably less than about 2% of the average thickness, and most preferably less than about 1% of the average thickness.

The thickness of the filled polymeric layer may be greater than about 10%, 20% 30%, 40%, or more of the total thickness of the composite material. The volume of the filled polymeric layer may be greater than about 10%, 20%, 30%, 40%, or more of the total volume of the composite material. Preferably, greater than 50% of the volume of the composite material will be the filled polymeric material. The concentration of the filled polymeric material is more preferably greater than about 60 volume % and more preferably greater than about 70 volume % based on the total volume of the composite material. The concentration of the filled polymeric material is typically less than 92 volume % based on the total volume of the composite material; however, higher concentrations may be used, particularly in relatively thick composites (e.g., having a thickness greater than about 1.5 mm).

The total thickness of outer layers of a sandwich composite structure herein (e.g., metallic layers) may be less than about 70% of the total thickness of the composite material. The total thickness of metallic layers preferably is less than about 50%, more preferably less than about 40% and most preferably less than about 30% of the total thickness of the composite material. The total thickness of the outer layers (e.g., the metallic layers) may be greater than about 5%, preferably greater than about 10%, and more preferably greater than about 20% of the total thickness of thickness of the composite material.

The polymeric core layer preferably is in contact (direct or indirect, such as via a primer and/or adhesive layer) with at least a portion of the surface of the adjoining layers (e.g., one or more metallic layer) facing the core layer. Preferably, the area of contact is at least about 30%, more preferably at least about 50%, most preferably at least about 70% of the total area of the surface of the adjoining layer facing the polymeric core layer. If a primer or adhesive layer is employed, the thickness preferably is sufficiently low so that it does not affect the electrical characteristics of the composite material. If employed, the ratio of the thickness of the primer and/or adhesive layer to the thickness of the polymeric core layer preferably is about 0.30 or less, more preferably about 0.20 or less, even more preferably about 0.10 or less, even more preferably about 0.05 or less, and most preferably about 0.02 or less. Two adjacent metallic layers preferably are substantially not in contact with each other. If a surface of a first metallic layer contacts a second metallic layer, the ratio of the area of contact to the area of the surface of the first metallic layer is preferably about 0.3 or less, more preferably about 0.1 or less, even more preferably about 0.05 or less, even more preferably about 0.02 or less, and most preferably about 0.01 or less.

The composite material may include a plurality of polymeric core layers. For example, the composite material may include one or more core layers which includes an adhesive such that it adheres to a metallic layer, a different core layer, or both.

The composite material may have a relatively high stiffness to density ratio, such as described in described in International Patent Application Publication No. WO2010/021899 published on Feb. 25, 2010 by Mizrahi.

Process for Preparing the Filled Polymeric Layer and the Composite

The process for preparing the filled polymeric material and the composite material may employ a process described in International Patent Application Publication No, WO2010/021899 published on Feb. 25, 2010 by Mizrahi.

The composite material may be prepared using a process that results in the filled polymeric material (e.g., core layer) being bonded to at least one adjoining layer (e.g., a metallic sheet) and preferably being interposed between two layers (e.g., two metallic layers) and bonded to one or both layers. The process may include one or any combination of steps of heating, cooling, deforming (e.g., forming, such as by stamping), or bonding, in order to arrive at a final desired article. It is envisioned that at least one, or even all of the adjoining layers (e.g., metallic layers) may be provided in the form of a rolled sheet, a forging, a casting, a formed structure, an extruded layer, a sintered layer, of any combination thereof.

The sheets may be heated to a temperature greater than about 90° C. (e.g. greater than about 130° C., or greater than about 180° C.). Preferably, the sheets are heated to a temperature greater than about $T_{min}$, where $T_{min}$ is the highest glass transition temperature ($T_g$) and melting temperature ($T_m$) of the thermoplastic of the filled polymeric material. The metallic sheets, the filled polymeric material, or both may be heated to a maximum temperature above which the polymer (e.g., the thermoplastic polymer) may undergo significant degradation. The thermoplastic polymer may be heated to a temperature preferably less than about 350° C., more preferably less than about 300° C. The heated polymer may be mixed with the metallic fiber, and with any additional fillers. The heated polymer (e.g., thermoplastic polymer) may be extruded as a sheet layer. The sheet layer may be extruded directly between the metal faces, or placed between the metal faces later in the process or in a separate step. The process may include one or more steps of drying the polymer so that the concentration of water in the polymer is below a predetermined maximum moisture concentration. A step of drying the polymer may occur before, during, or after a step of heating the polymer. The process may include one or more steps of storing a polymer, a polymeric core layer, or a composite material in low humidity environment so that the concentration of water in the polymer is maintained below a predetermined maximum moisture concentration.

The polymeric core layer may be a homogeneous layer or may comprise a plurality of sublayers. For example, the filled polymeric material may contain an adhesive layer such as described in International Patent Application Publication No. WO2010/021899 published on Feb. 25, 2010 by Mizrahi.

The process for fabricating the composite material may also include one or more steps of heating one or more metal layers, applying pressure to the layers, calendaring a polymer (e.g., a thermoplastic polymer or the thermoplastic polymer compounded with the metallic fiber and the optional fillers), and annealing the composite sheet (e.g., at a temperature greater than the melting temperature of any thermoplastic polymer in the material).

The process for preparing the filled polymeric material (e.g., a core layer for the sandwich composites herein) may include a step of contacting the fiber and at least a portion of the polymer (e.g., thermoplastic polymer), blending the fiber and at least a portion of the polymer, or both. The process of forming the polymeric layer may be a continuous process or a batch process. Preferably, the process is a continuous process. The blending or contacting step may include heating the polymer to a maximum temperature greater than about 90° C., greater than about 140° C., greater than about 170° C., or greater than about 190° C. The blending or contacting step may include heating the polymer to a maximum temperature less than about 350° C., less than about 300° C., less than about 280° C., less than about 270° C., or less than about 250° C.

Suitable process may employ one or more steps of applying pressure when at least some of the polymer of the filled polymeric material is at a temperature greater than about 80° C., preferably greater than about 120° C., more preferably greater than about 180° C., even more preferably greater than about 210° C., and most preferably greater than about 230° C. The step of applying pressure may employ a maximum pressure greater than about 0.01 MPa, preferably greater than about 0.1 MPa, more preferably greater than about 0.5 MPa, even more preferably greater than about 1 MPa, and most preferably greater than about 2 MPa. The maximum pressure during the step of applying pressure may be less than about 200 MPa, preferably less than about 100 MPa, more preferably less than about 40 MPa, and most preferably less than about 25 MPa. The process may also include a step of cooling the composite material (e.g. to a temperature below $T_{min}$, preferably below the melting temperature of polymer of the filled polymeric material, and more preferably below about 50° C.).

The composite material may be or include a laminate, such as described in International Patent Application Publication No. WO2010/021899 published on Feb. 25, 2010 by Mizrahi.

It may desirable to prevent water (liquid, gas, or solid) from contacting the polymeric material so that the moisture level in the polymeric material is low, so that the filler in the polymeric material does not corrode, or both. As such, the process for preparing the composite material may include one or more steps of substantially protecting an edge of the composite material from contact with a liquid or gas. For example, a coating or protective layer may be placed over one or more (or preferably all) of the edges of a polymeric layer (core layer), one or more (or preferably all) of the edges of the composite material may be sealed, or any combination thereof. If employed, a coating or protective layer placed over an edge of a polymeric layer preferably includes one or more materials that have a relatively low permeability to moisture compared to the polymer of the filled polymeric material. Any material having relatively low permeability to moisture may be used. Without limitation, a low permeability material may include a layer of polyethylene vinyl alcohol or a copolymer thereof, a layer of a polyolefin homopolymer, or a copolymer consisting substantially of one or more olefins, or any combination thereof. A coating or protective layer may be permanently attached to the polymeric layer, to the metallic layer or both. Alternatively, a coating or protective layer may be used temporarily. For example, a coating or protective layer may be removed prior to one or more forming steps, prior to one or more welding steps, prior to one or more electrocoating steps, or prior to one or more painting steps. Any edges of the composite material may be sealed using any art known mean that forms one or more sealed spaces between the metallic layers. By way of example, the metallic layers may be welded together near an edge. The metallic layers may be welded together along the entire periphery of the composite material.

One or more steps of monitoring the quality of the parts may be employed during or after assembly of components of the polymeric layer or the composite material. The monitoring may be for the purpose of assuring bond integrity between two or more layers, assuring proper dispersion of fibers, detecting surface abnormalities (such as cracks, blemishes, creases, roughness, and the like), detecting voids, determining the thickness distribution (e.g., average thickness, mean thickness, thickness variation, minimum thickness, maximum thickness, or any combination thereof) of one or any combination of layers of the composite, or any combination thereof.

One approach may include a step of monitoring the part (e.g., the polymeric material or the composite material) with one or more probes. The monitoring may be done optically (such as to detect surface defects, to determine a thickness or thickness distribution, a temperature such as by infrared measurement, or any combination thereof). It may be done by measuring a response of the part to one or more external stimulus. For example, electrical conductivity, electrical resistivity, impedance, or some other electrical characteristic may be measured in response to or more applied electrical stimulus. For example a probe may be used to measure the electrical characteristic at one or more location on the part (consecutively and/or essentially simultaneously in response to the electrical stimulus. A magnetic characteristic may be monitored in similar manner. The stimulus may be a magnetic field and the response may be a mechanical response, an electrical response, a magnetic response, or any combination thereof. The monitoring may be done acoustically (e.g., using a probe or other source of sound waves such as ultrasound waves). Acoustical measurements may be employed for detecting voids, cracks, compositional distributions, and the like.

Figure 2:
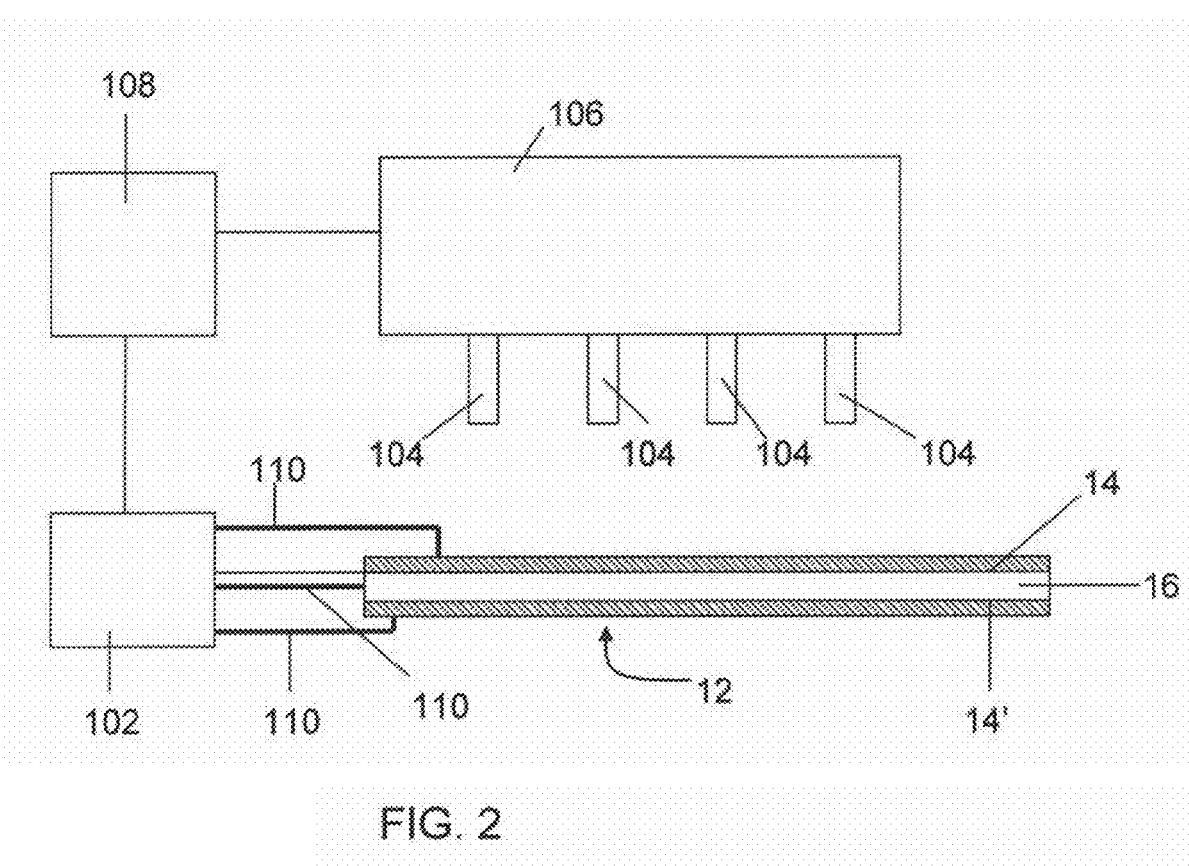
FIG. 2 is a diagram of an illustrative process for monitoring a polymeric material or a composite material.

A suitable assembly for monitoring may include a source of electricity one or more probes (e.g. a plurality of probes on a common carrier (possible even an array of probes) that essentially spans the part for assessing quality or that is translated over the part to obtain measurements), and at least one processor for receiving signals from the probes. The processor may perform an operation such as comparing the signals with a predicted value range for the measured part, and signaling when the measured value is outside of a predicted range, or otherwise falls within a certain predetermined range. FIG. 2_illustrates an example of such a system.

A layered workpiece 12 of the present teachings (e.g. a laminate of metallic layers 14, 14' sandwiching a polymeric layer 16 containing metallic fibers) is assembled. After the layers are joined a stimulus is applied (e.g., an electrical stimulus applied by an electrical source 102) to one or more of the metal layers 14, 14', the polymeric layer 16, or any combination thereof. The electrical stimulus may be transmitted to the one or more metal layers using one or more wires 110 or other means of electrical communication.

One or more probes 104 may be carried by a carrier 106, and will measure a response of the workpiece to the stimulus. The probes may be on one or both sides of the workpiece. The measured response may be signally transmitted to a processor 108, which may also be in controlling or other signaling communication with the stimulation source, (e.g. electrical source 102).

It will be appreciated that the monitoring process described herein may also be used for monitoring a polymeric material (e.g., a pellet, a sheet, or other sample of the polymeric material).

Forming Process

The composite material of the present invention may be subjected to a suitable forming process, such as a process that plastically deforms a material and may include a step of stamping, roll forming, bending, forging, punching, stretching, coiling, some other metalworking, or any combination thereof. A preferred forming process is a process that includes a step of stamping the composite material. The stamping process may occur at or near ambient temperatures. For example, the temperature of the composite material during stamping may be less than about 65° C., preferably less than about 45° C., and more preferably less than about 38° C. The forming process may involve drawing regions of the composite material to various draw ratios. In one aspect of the invention, the composite material is subjected to a step of drawing to a relatively high draw ratio without breaking, wrinkling, or buckling. For example, it is subjected to a step of drawing so that at least a portion of the composite is drawn to a draw ratio greater than 1.2. Desirably, the composite material may be capable of being drawn and is drawn to a maximum draw ratio greater than about 1.5, preferably greater than about 1.7, more preferably greater than about 2.1, and most preferably greater than about 2.5. The cracking limit of the draw ratio may be determined using the circular cup drawing test as described by Weiss et al. (M. Weiss, M. E. Dingle, B. F. Rolfe, and P. D. Hodgson, "The Influence of Temperature on the Forming Behavior of Metal/Polymer Laminates in Sheet Metal Forming", Journal of Engineering Materials and Technology, October 2007, Volume 129, Issue 4, pp. 534-535), incorporated herein by reference. The forming process may include a step applying a pressure to a die (e.g., a die having a hardness, as measured according to Mohrs hardness scale, greater than the hardness of the metallic fibers) in contact with the composite material.

Suitable forming processes that may be employed include those described in International Patent Application Publication No. WO2010/021899 published on Feb. 25, 2010 by Mizrahi.

After forming a composite material, the process may include one or more steps of protecting an edge of the composite material to reduce the penetration of moisture into the filled polymeric material. Any of the aforementioned steps for protecting an edge of the composite material may be used.

Characteristics of Composites

The polymeric layer, the composite material, or both, may have a low springback angle, a relatively low electrical resistivity, good weldability (e.g., using resistance welding), relatively low thermal conductivity, relatively low sound transmission, or any combination thereof, such as described in International Patent Application Publication No. WO2010/021899 published on Feb. 25, 2010 by Mizrahi.

Preferably, the filled thermoplastic material, the composite material, or both is weldable (e.g., weldable using a resistance welding technique such as spot welding, seam welding, flash welding, projection welding, or upset welding) and has a relatively low electrical resistance. The teachings herein thus also contemplate one or more steps of welding the composite materials taught herein. The electrical resistance of the composite material in the through-direction may be described by the sum of the electrical resistance of the metallic layers and the core layer. Typically, the electrical resistance of the metallic layers is much less than the electrical resistance of the core layer, such that the electrical resistance of the composite material may be estimated by the electrical resistance of the core layer. The resistivity (e.g., the resistivity measured in the through-thickness direction, normal to the plane of a sheet) may be measured using AC modulation and determined from the voltage drop, V, and the current, I:

$$\text{Resistivity} = (V/I)(A/t)$$

where A is the area of the sheet, and t is the thickness of the sheet. The resistivity (in the through-thickness direction) of the composite material, the core layer, or both, may be relatively low (e.g., the composite material, the core layer (e.g., the filled thermoplastic material), or both, may be characterized by a resistivity less than about 100,000 Ω·cm, preferably less than about 10,000 Ω·cm, more preferably less than about 3,000 Ω·cm, and most preferably less than about 1,000 Ω·cm).

The composite material may have an electrical resistivity sufficiently low so that the composite material is capable of being welded to a monolithic sheet of steel by a resistance welding technique that uses a welding schedule that is generally the same as the welding schedule for welding two monolithic sheets of steel of the same thicknesses. For example, the electrical resistivity in the through thickness direction, may be about 100 Ω·cm or less, preferably about 10 Ω·cm or less, more preferably about 1 Ω·cm, even more preferably about 0.15 Ω·cm or less, even more preferably about 0.1 Ω·cm or less, and most preferably about 0.075 Ω·cm or less.

The composite materials may be welded using any welding process known to one of ordinary skilled in the art of welding metals. The welding process may include one or more of the steps, devices, or processes described in International Patent Application Publication No. WO2010/021899 published on Feb. 25, 2010 by Mizrahi, U.S. Patent Application No. 61/290,384 (filed on Dec. 28, 2009 by Mizrahi, both incorporated by reference herein in their entirety for all purposes.

Preferred composite materials have a relatively good corrosion resistance. The composite material preferably is characterized by a rate of corrosion of a surface of a metallic layer facing a core layer, the core layer including a polymer and a metallic filler, that is lower than (more preferably at least 50% lower than) the rate of corrosion of a surface of a metallic layer facing a core layer of an identical composite material except the metallic filler in the core layer is replaced with the polymer of the core layer. For example, the composite material may have a rate of corrosion of a surface of a metallic layer facing a core layer, the core layer including a sacrificial filler, that is lower than the rate of corrosion of a surface of a metallic layer facing a core layer of an identical composite material except the sacrificial filler is replaced with the polymer of the core layer. The rate of corrosion in water may be determined by placing samples of a composite material having predetermined dimensions, in a water bath at a predetermined corrosion test temperature for a predetermined corrosion test time, and measuring the amount of corrosion on a surface. The rate of corrosion in salt water may be determined by placing samples of a composite material having predetermined dimensions, in a salt water bath having a predetermined salt concentration, at a predetermined corrosion test temperature for a predetermined corrosion test time, and measuring the amount of corrosion on a surface. Without limitation the, corrosion test temperature may be about 40° C., and the corrosion test time may be about 168 hours.

It is possible that weld joints made using various composites taught herein may exhibit a variation of microstructures across the composite such as described in International Patent Application Publication No. WO2010/021899 published on Feb. 25, 2010 by Mizrahi.

Welding of Composite Material

When welding (e.g., spot welding) the composite material to one or more monolithic metal material (e.g., a steel material such as a steel sheet), the process may employ a first electrode that contacts the composite material and a second electrode that contacts a monolithic metal. The first electrode and the second electrode may be the same or different. Preferably the first electrode and the second electrode are different. Surprisingly, when the first electrode has a diameter that is less than the diameter of the second electrode, both metallic layers of the composite material are more easily welded to the monolithic metal material. Without being bound by theory, it is believed that the use of a smaller diameter electrode to contact the composite material results in a more balanced heat distribution, more effectively removes polymer from the weld zone, or both. Most preferably, the first electrode has a diameter that is sufficiently less than the diameter of the second electrode, so that the first metallic layer and the second metallic layer are both welded during a spot welding process. The ratio of the diameter of the second electrode to the diameter of the first electrode preferably is about 1.02 or more, more preferably about 1.06 or more, even more preferably about 1.12 or more, and most preferably about 1.2 or more. The ratio of the diameter of the second electrode to the diameter of the first electrode preferably is about 5 or less, more preferably about 3 or less, and most preferably about 2 or less.

The composite materials of the present invention preferably can be welded to one or more monolithic metal materials. For example, the shape, size, concentration, and type of the metallic fibers may selected so that the composite material is capable of being welded (e.g., spot welded) to steel materials selected from the group consisting of uncoated steel, hot dipped galvanized steel, galvannealed steel, or any combination thereof. In particularly preferred embodiments of the invention, the composite material has a generally high weld current range (e.g., as described hereinbefore) for two or more different monolithic steel materials (e.g., two or more of uncoated steel, hot dipped galvanized steel, or galvannealed steel), for two or more monolithic steel materials having different thickness (e.g., one material having about the same thickness as the composite material and a second material having a thickness about 1.5 times the thickness of the composite material or more), or both, without the need to change the weld time, the electrode force, the weld time, or the weld tip size. As such, the composite material may be welded to a surprisingly wide variety of materials, having a surprisingly wide range of thicknesses without needed to change the welding conditions. Although some changes to welding conditions may be required, the large weld current range allows for these changes to be greatly reduced relative to other materials.

Figure 7:
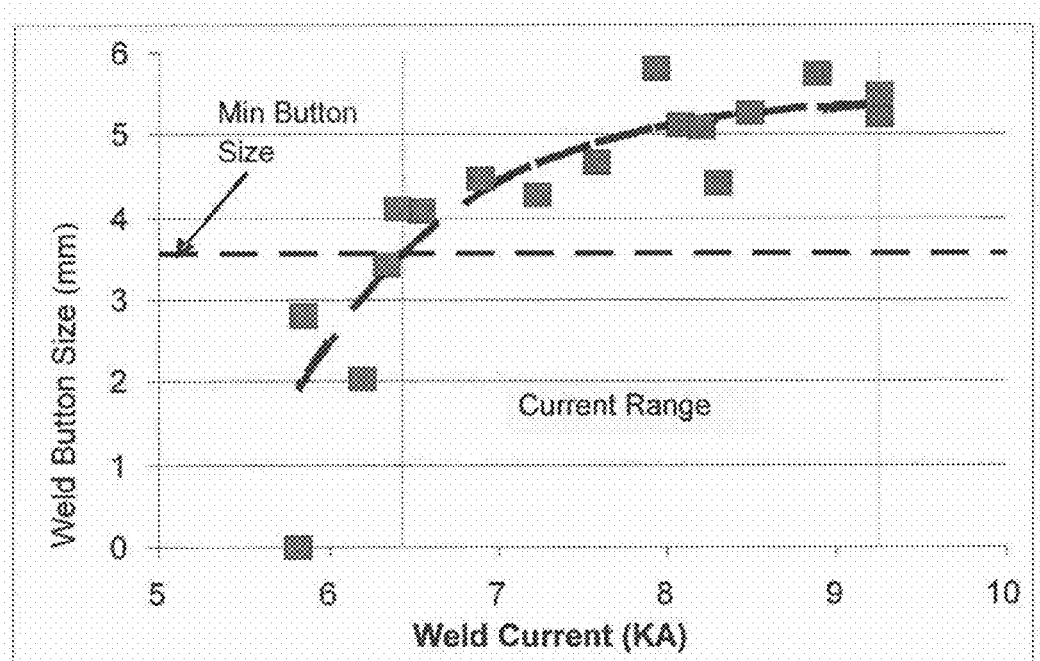
FIG. 7 is a graph showing the relationship between the weld button size (in units of mm) and the weld current (in units of kA) for a light weight composite material welded to uncoated deep drawing quality steel having a weld current range of about 2.0 kA, or more (e.g., about 2.8 kA).
Figure 8:
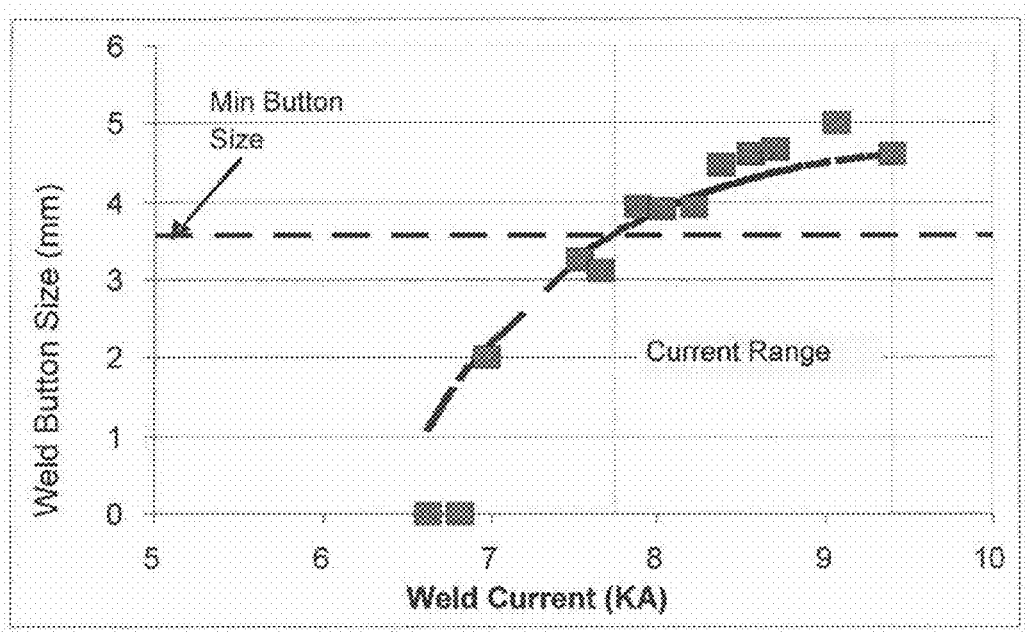
FIG. 8 is a graph showing the relationship between the weld button size (in units of mm) and the weld current (in units of kA) for a light weight composite material welded to galvannealed metal having a weld current range of about 1.5 kA, or more (e.g., about 1.7 kA).
Figure 9:
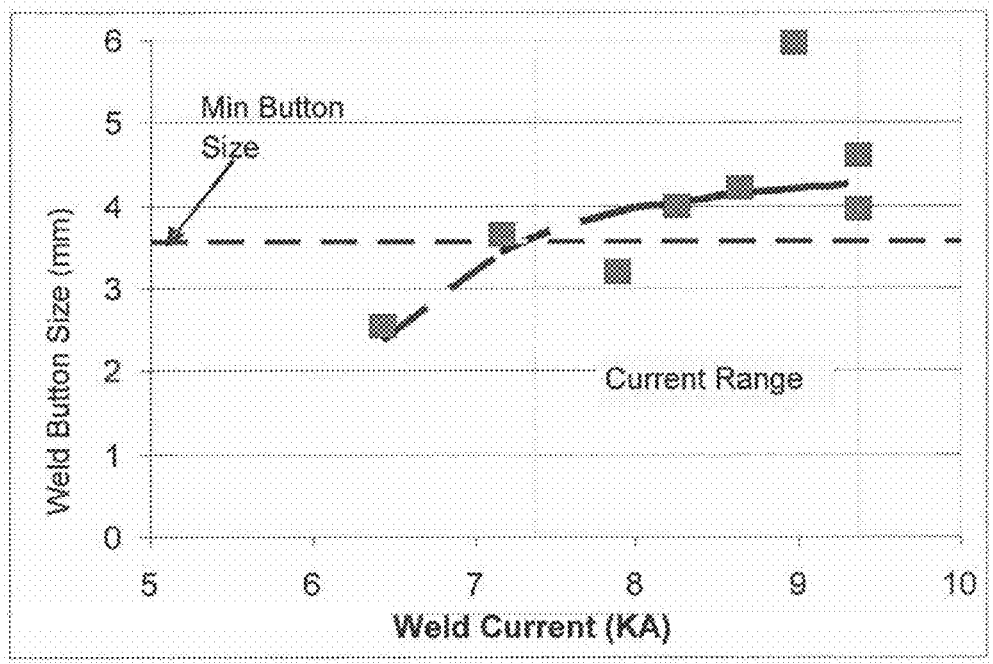
FIG. 9 is a graph showing the relationship between the weld button size (in units of mm) and the weld current (in units of kA) for a light weight composite material welded to hot dipped galvanized coated metal having a weld current range of about 1.5 kA, of more (e.g., about 2.0 kA).

By way of example, FIGS. 7, 8, and 9 illustrate the measurement of the weld current range for a composite material of the present invention welded to uncoated steel, galvannealed steel, and hot dipped galvanized steel respectively.

FIGS. 7, 8 and 9 are graphs showing the weld button size as a function of the weld current. Acceptable or good welds may be those welds which have i) a weld button size greater than about 95% of the weld electrode diameter ii) no expulsion of metal; or both. For example, when an electrode diameter of about 3.8 mm is used to contact the composite material, a good weld may have a weld button size of about 3.6 mm or more. FIGS. 7, 8, and 9 illustrates a composite material having a weld current range of about 1.5 or more (e.g., about 1.7 or more). FIG. 7 illustrates that good welds can be obtained with a weld current from about 6.4 kA to about 9.2 kA when welding the composite material to a first steel (e.g., uncoated steel). FIG. 8 illustrates that good welds can be obtained with a weld current from about 7.75 kA and about 9.45 kA when welding the composite material to a different steel (e.g., galvannealed steel). FIG. 9 illustrates that good welds can be obtained with a weld current from about 7.35 kA and about 9.35 kA when welding the composite material to another steel (e.g., hot dipped galvanized steel). First, all three materials give generally high weld current ranges. Second, the overlap of the currents that result in good welds (i.e., the overlapping weld current range) is generally high. For example, the composite material produces good welds with these three materials from about 7.8 kA to about 9.2 kA, and the overlapping weld current range is about 1.4 kA or more.

The composite materials of the present invention may be used in any number of applications requiring one or any combination of the properties described herein, including but not limited to relatively low density, relatively low thermal conductivity, relatively high stiffness to density ratio, or relatively low acoustical transmission. Exemplary applications which may employ the composite materials of the present invention may include automotive and other transportation related applications, building construction related applications, and appliance related applications. The composite materials may be used in applications such as an automotive panel, a truck panel, a bus panel, a container (e.g., a container used for shipping), a panel on a train car, a panel on a jet, a tube (e.g., a bicycle tube), a motorcycle panel (e.g., a cowling or fairing), a trailer panel, a panel on a recreational vehicle, a panel on a snowmobile, an automotive bumper fascia, a spoiler, a wheel well liner, an aerodynamic ground effect, an air dam, a container, a bed liner, a divider wall, an appliance housing, a vehicle fuel filler door, a vehicle bumper, a decorative insert, a duct, a grab bar, a storage compartment door, a housing for an electronic device (such as a cellular phone, a computer, a camera, a tablet computer, a music or video storage device, or a music or video player), a console, an air inlet part, a battery housing, a grille, a wheel well, or a seat pan. The composite materials may be used as a building construction material, such as an exterior trim element, flashing, gutters, shingles, walls, flooring, countertops, cabinet facing, window frames, door frames, paneling, vents, ducts, planking, framing studies, shelving, plumbing fixtures, sinks, shower pans, tubs, and enclosures. An exemplary application is an vehicle body panel (e.g., a body outer skin of a vehicle such as an automobile). Automobile panels which may use the composite materials described herein include front quarter panels, rear quarter panels, door panels, hood panels, roof panels, or otherwise. The automotive panel may have a class A, class B, or class C surface, preferably a class A or class B surface, and more preferably a class A surface. The composite materials herein may also include one or more decorative outer surfaces or veneers, such as a metal veneer, a wood veneer, a polymeric veneer, or otherwise. The outer surface may have a different texture, color or. other appearance as an opposing layer. For example, a ferrous outer layer may be colored so that it simulates a copper color, a bronze color, a brass color, a gold color, or some other color.

The composite materials of the present invention may be used in a process that includes a step of coating the composite material, such as an electrocoating process, a paint process, a powder coat process, any combination thereof, or the like. If employed, the coating process may include one or more steps of cleaning or otherwise preparing the surface, one or more steps of heating or baking the coating (e.g., at a temperature greater than about 100° C., preferably greater than about 120° C.), or any combination thereof. The coating may be applied by any conventional means, such as by a dipping process, a spraying process, or with a process employing an applicator such as a roller or a brush. As such, the composite material preferably is free of ingredients (e.g., low molecular weight ingredients) that leach out and contaminate a bath of a coating process, such as a bath of an electrocoat process. Likewise, methods herein include one or more coating steps that are free of bath contamination due to an ingredient of the composite.

The composite material (e.g., a stamped part formed of the composite material) may be used in an assembly which requires joining the composite material to one or more other materials or parts. For example the composite material may be mechanically joined to another part using a fastener, or chemically joined to another part using an adhesive, an adhesion promoter (e.g., a primer), or both. Other means of joining include welding, brazing, and soldering. One or any combination of these joining methods may be employed.

As discussed previously, high integrity laminates that are resistant to delamination in service are possible in accordance with the teachings herein. The resulting composite material may exhibit excellent properties rendering it suitable as a substitute for steel in many applications. For example, the composite mass may be bonded sufficiently to any metal layer so that upon being subjected to peel testing under DIN 11339, the composite exhibits a substantial amount of cohesive failure (e.g., more than about 25%, such as at least about 40%, 50%, 60% or higher cohesive failure). The composite mass is bonded sufficiently to any metal layer so that upon being subjected to lap shear testing under DIN 11465, the composite exhibits a substantial amount of cohesive failure (e.g., more than about 25%, such as at least about 40%, 50%, 60% or higher cohesive failure). As will be appreciated reference to cohesive failure refers generally to failure that would result within the polymeric matrix of in contrast with adhesive failure that would occur as between the polymeric matrix and adjoining metal layers. Thus, a high amount of cohesive failure is reflective of a bond strength between the polymer matrix and one or both of the metal layers of a sandwich composite that exceeds the internal strength of the polymeric matrix material.

Preferably, the composite material does not delaminate (e.g., the metallic layer does not delaminate from the core layer) during the processing of the composite material to form a part or an assembly, or during the use of the part. As such, the composite material preferably does not delaminate during a stamping operation, during a joining operation (e.g., during a welding operation), or both.

Another aspect of the invention contemplates a method for post-consumer reclamation, recycling, or both of parts made using the present invention. One approach envisions providing a part having the composite structure taught herein, and subjecting it to a step of separating hydrocarbon compounds (e.g., by an elevated temperature heating step) from the metallic materials. Either or both of the hydrocarbon compounds or the metallic materials can be recovered and re-used. Another approach envisions recycling by grinding the composite material or otherwise forming particles from the composite materials, and optionally providing the particles as an ingredient for the core material of a composite (such as a composite material described herein).

EXAMPLES

It should be appreciated that the compositions of the following examples maybe varied by about ±20% and give similar results (e.g., within about ±20%). Further, other materials taught herein may be substituted for those stated and similar results are contemplated.

Example 1

The core material for the light weight composite is prepared by melt blending about 45 g polyamide 6 and about 72 g stainless steel fibers having an average diameter of about 3-10 µm and an average length of about 2-4 mm in a Brabender Plastograph mixer at 260° C., with a speed of about 20 rpm. The polyamide 6 has a density of about 1.142 g/cm$^3$ and the steel has a density of about 7.9 g/cm$^3$. After mixing for about 60 minutes, the admixture is removed from the Brabender mixer. It will be appreciated to one skilled in the art that longer or preferably shorter mixing times (e.g., less than about 30 minutes, less than about 20 minutes, less than about 10 minutes, or even less than about 5 minutes) may be used. Moreover, such mixing times may be employed for the other polymers of the present teaching. Thus prepared, example 1 contains about 18.8 volume % steel fibers and about 81.2 volume % polyamide 6 and has a density of about 2.411 g/cm$^3$.

Example 2

A core material is prepared using the same method as for Example 1, except the weight of the stainless steel fiber is about 102 g and the weight of the polyamide 6 is about 40 g. Thus prepared, the admixture contains about 26.9 volume % steel fibers and about 73.1 volume % polyamide 6 and has a density of about 2.962 g/cm$^3$.

Example 3

A core material is prepared using the same method as for Example 1, except the weight of the stainless steel fiber is about 35.4 g and the weight of the polyamide 6 is about 50.6 g. Thus prepared, the admixture contains about 10 volume % steel fibers and about 90 volume % polyamide 12 and has a density of about 1.816 g/cm$^3$.

Comparative Example 4

A core material is prepared using the same method as for Example 1, except no stainless steel fiber is used and about 53 g of the polyamide 6 is mixed in the Brabender Plastograph mixer. Comparative Example 5 has a density of about 1.142 g/cm$^3$.

Comparative Examples 5-6

Composite materials are prepared by compression molding a sandwich panel containing two steel plates, each having a thickness of about 0.20 mm a length of about 74.2 mm and a width of about 124.2 mm, and Polyamide 12, without metallic fibers, is placed between the metal plates. The steel plates are made of No. 5 temper Aluminum killed) low carbon steel that meets AISA 1008 and ASTM A109 standards. The thickness of the core material for comparative examples 5 and 6 is about 0.30 mm, and about 0.44 mm, respectively, as shown in Table 1. Comparative Example 5 and 6 are compression molded using a positive mold at a temperature of about 250° C. and a load of about 12000 kg. The overall density of the composite panels is about 32-46 wt. % lower than the density of the steel used in the steel plates. The through-thickness electrical resistivity of comparative examples 5 and 6 is greater than $1 \times 10^{10}$ Ω·cm, indicating that these panels have insulating characteristics. Though stampable, attempts to weld Comparative Examples 5 and 6 to a monolithic steel panel results in structure that do not weld together. These samples fail the weld test in that the weld is weaker than the panels being welded together.

TABLE 1

|  | Comparative Example 5 | Comparative Example 6 |
|---|---|---|
| Metal Plate 1 |  |  |
| Material | Steel | Steel |
| Thickness, mm | 0.20 | 0.20 |
| Metal Plate 2 |  |  |
| Material | Steel | Steel |
| Thickness, mm | 0.20 | 0.20 |
| Core Material |  |  |
| Thickness, mm | 0.30 | 0.44 |
| Thickness, vol % of total | 43% | 57% |
| Metal Fiber, volume % of core | 0% | 0% |
| Polyamide 12, volume% of core | 100% | 100% |
| Total Density, g/cm$^3$ | 5.37 | 4.27 |
| Weight Saving, % | 32% | 46% |
| Core Layer Resistivity, Ω·cm | >10$^{12}$ | >10$^{12}$ |
| Weld Properties | Fail | Fail |

Examples 7-8

Examples 7 and 8 are composite materials prepared by compression molding a sandwich panel using the method described for Comparative Examples 7 and 8, except a core material including about 26.9 volume % of steel fibers and about 73.1 volume % polyamide 12 is used. The steel fibers in the core material have an average diameter of about 3-10 µm and an average length of about 2-4 mm and are mixed with the polyamide 12 in a Brabender Plastograph mixer at about 260° C. The thickness of the core material is about 0.40 mm and about 0.57 mm for Examples 7 and 8, respectively. These samples are illustrated in Table 2. The overall density of the composite panels is about 29-36 wt. % lower than the density of the steel. These composite panels are welded to steel sheet having a thickness of about 0.8 mm using AC resistance welding (spot welding). Good welds (i.e., welds that are stronger than the panels being welded, such that a weld button is obtained when the welded panels are separated by force) are obtained using a welding current of about 9.7 kA and 8 weld cycles, with a pressure of about 600 psi. These conditions are lower than those required for welding two monolithic sheets of 0.8 mm thick steel (12.9 KA, 15 weld cycles, 600 psi pressure). Each weld cycle is about 1/60 second and the welding parameters include a slope of about 1 cycle (i.e., about 1/60 second), a hold time of about 10 cycles (i.e., about 1/6 second) and a squeeze time of about 1 second.

TABLE 2

|  | Example 7 | Example 8 | Example 9 | Example 10 |
|---|---|---|---|---|
| Metal Plate 1 | | | | |
| Material | Steel | Steel | Steel | Steel |
| Thickness, mm | 0.20 | 0.20 | 0.20 | 0.20 |
| Metal Plate 2 | | | | |
| Material | Steel | Steel | Steel | Steel |
| Thickness. mm | 0.20 | 0.20 | 0.20 | 0.20 |
| Core Material | | | | |
| Thickness, mm | 0.40 | 0.57 | 0.37 | 0.55 |
| Thickness, vol % of total | 50% | 59% | 48% | 58% |
| Metal Fiber, volume % of core | 26.9% | 26.9% | 20.2% | 20.2% |
| Polyamide 12, vol % of core | 73.1% | 73.1% | 79.8% | 79.8% |
| Total Density, g/cm$^3$ | 5.61 | 5.04 | 5.43 | 4.70 |
| Weight Saving, % | 29% | 36% | 31% | 41% |
| Core Layer Resistivity, Ω · cm | 910 | 480 | 740 | 500 |
| Weld Properties | Good | Good | Good | Good |

Examples 9-10

Examples 12 and 13 are composite materials prepared by compression molding a sandwich panel using the method described for Comparative Examples 5-6, except a core material including about 20.2 volume % of steel fibers and about 79.8 volume % polyamide 12 is used. The steel fibers in the core material have an average diameter of about 3-10 μm and an average length of about 2-4 mm and are mixed with the polyamide 12 in a Brabender Plastograph mixer at about 260° C. The thickness of the core material is about 0.37 and about 0.55 mm, for Examples 9 and 10 respectively. These samples are illustrated in Table 2. The overall density of the composite panels is about 31-41 wt. % lower than the density of the steel. These composite panels are welded to steel sheet having a thickness of about 0.8 mm using AC resistance welding (spot welding). Good welds are obtained using a welding current of about 9.7 kA and 8 weld cycles, with a pressure of about 600 psi.

The stiffness and density of Example 9 and a monolithic sheet of the same steel material used in the metallic layers of Example 9, both having a thickness of about 0.87 mm are measured in the through-thickness direction. Example 9 is expected to have a higher stiffness to density ratio than the monolithic sheet of steel.

Example 11

Example 11 composite material sample is prepared by compression molding a sandwich panel using the method described for Comparative Examples 5, except Example 3 is used for the core material. This composite panel sample is welded to steel sheet having a thickness of about 0.8 mm using AC resistance welding (spot welding). Good welds are obtained using a welding current of about 9.7 kA and 8 weld cycles, with a pressure of about 600 psi.

Example 12-14

Examples 12 through 14 are neat polymers and mixtures of polymers with stainless steel fibers prepared using the method Example 1. Examples 12 through 14 are prepared using polyamide 6 with about 0 wt %, about 3 wt. %, and about 10 wt. % stainless steel fiber, respectively for Examples 12, 13, and 14. The tensile modulus of the core material of Example 12 is about 3.3 GPa. When the steel fiber is added at a concentration of about 3 wt. % (Example 13), the tensile modulus increases by more than 17% to about 3.9 GPa. When the steel fiber is added at a concentration of about 10 wt. % (Example 14), the tensile modulus increases by more than 100% to about 7.3 GPa. The polyamide is replaced with a copolyamide and the concentration of the stainless steel fiber is about 0% wt. %, about 3 wt. % and about 10 wt. % for Examples 15, 16, and 17, respectively. The tensile modulus of the core material of Example 15 is about 700 MPa. When the steel fiber is added at a concentration of about 3 wt. % (Example 16), the tensile modulus increases by more than 50% to about 1160 MPa. When the steel fiber is added at a concentration of about 10 wt. % (Example 17), the tensile modulus increases by more than 200% to about 2280 MPa. As such, in general this and other embodiments of the invention taught herein may be characterized by a tensile modulus of the filled polymeric material (e.g., the material of the core layer) including metallic fibers that is greater than the tensile modulus of the filled polymeric material (e.g., the material of the core layer) having the same composition but without metallic fibers preferably by at least 15%, more preferably by at least 50%, even more preferably by at least about 100%, and most preferably by at least about 200%.

Examples 15-20

Electrical Resistivity

Examples 15 through 20 are prepared by mixing steel fibers and a thermoplastic in a Brabender mixer, using the polymer and steel fiber concentration shown in TABLE 3. The composite materials are then prepared by molding, sandwiches having 0.4 mm of the fiber filled thermoplastic layer between two 0.2 mm thick steel sheets. The through-thickness electrical resistivity of the composite materials, as measured using AC Modulation, is shown in TABLE 3. All of the composite materials filled thermoplastics have relatively low electrical resistivity and all of the unfilled thermoplastics have relatively high electrical resistivity.

TABLE 3

|  | Thermoplastic | Steel Fibers (Volume %) | Electrical Resistivity Ω · cm |
|---|---|---|---|
| Example 15 | Polyamide | 0 | >10$^{11}$ |
| Example 16 | Polyamide | 26.9 | 250 |
| Example 17 | Polyamide | 10 | 300 |
| Example 18 | EVA | 0 | >10$^{11}$ |
| Example 19 | EVA | 3 | 400 |
| Example 20 | Copolyamide | 3 | 600 |

EVA = Ethylene Vinyl Acetate Copolymer

Example 21

A filled thermoplastic material is prepared by mixing about 15 volume % low carbon steel fibers having a diameter from about 4 to about 40 μm, and a length from about 1 to about 10 mm and about 85 volume % of a copolyamide of about 50 wt. % polyamide 6 and about 50 wt. % polyamide 6,9 (the copolymer characterized by an elastic modulus of about 300 MPa measured according to ISO 527-2, a melting point of about 130° C. as measured according to ISO 11357, and an elongation at break of about 900% measured according to ISO 527-3). The filled thermoplastic material is mixed at a temperature from about 190° C. to about 250° C. The filled thermoplastic material is then placed between two sheets of low carbon steel, each having a thickness of about 0.2 mm. The materials are then pressed at a temperature from about 200° C. to about 230° C. with a pressure of about 1 to about 22 MPa. The composite material has a core thickness of the filled thermoplastic material of about 0.4 mm. The composite material is stamped in a high speed stamping operation with a draw ratio greater than about 3, and no cracks or other surface defects are observed. After stamping, the surface of the composite material is relatively smooth compared to the surface of a monolithic low carbon steel sample having the same total thickness and stamped under the same conditions. The composite material is then submitted to a typical e-coat process and painted with a primer and black paint. The painted surface has a smooth finish with no pitting, no orange peeling, and no other visible surface defects. The painted surface is characterized as a class A finish. The surface of the painted composite material is smoother than the surface of a similarly processed monolithic sample of low carbon steel having a thickness of about 0.8 mm.

Example 22

A composite material is prepared using the same materials, composition, and method as Example 21, except the fibers are replaced with low carbon fibers having a generally rectangular cross-section in the direction transverse to the length of the fibers. The fibers have an average length of about 2.3 mm. The average cross-sectional area of the fibers is about 0.0045 mm². The ratio of the width to the thickness of the fibers is about 2 to 8. The composite material has a thickness of about 0.8 mm. The composite material is stacked with a sample of cold rolled steel having a thickness of about 0.8 mm. The stack is placed in a spot welding machine between a pair of weld tips having a diameter of about 13 mm. A force of about 2.2 kNt is applied to the weld tips. The resistivity of the composite material in the through-thickness direction is determined while under force of 2.2 kNt. Thus determined, the electrical resistivity of Example 22 composite material is about 0.1 Ω·cm or less. When welded using weld schedules typical for two sheets of cold rolled steel having a thickness of about 0.8 mm, the composite material welds to the cold rolled steel, producing a weld button having a diameter greater than the diameter of the weld tips. No extra heating, no extra weld cycles, and no extra current are required to produce a good weld with Example 22.

Example 22B

Example 22B is identical as Example 22, except the concentration of the metallic fiber in the filled polymeric material is increased to about 20 volume percent and the concentration of the polymer is reduced to about 80 volume percent. The composite material of Example 22B is welded to a sheet of galvannealed steel having a thickness of about 0.8 mm. An electrode having a face diameter of about 3.8 mm is used on the side of the weld stack having the composite material and an electrode having a face diameter of about 4.8 mm is used on the side having the galvannealed steel. A force of about 610 lbs is applied to the weld stack by the electrodes. The materials are welded using mid frequency DC welding, having a frequency of about 1,000 Hertz. Each weld is done on samples having a width of about 25 mm and a length of about 75 mm. The weld time is constant at about 200 miliseconds. Welds are made using weld currents ranging from about 8.8 ka to over 13 kA. The size of the weld button on the composite sheet is measured after the welding is completed. The weld button size and the weld current of each weld sample 46 is shown in a graph 30 in FIG. 6. At low weld currents given by the region 44, the weld button size is less than the 95% of the diameter of the electrode 36 that is used on the face of the composite material during the welding step. At intermediate weld currents illustrated by the region 40, the button size is greater than 95% of the diameter of the electrode 36. At high weld currents illustrated by region 42, the there is expulsion of metal and/or a loud popping noise during the welding and the resulting welds are unacceptable. The minimum weld current 34 for obtaining acceptable welds is about 10 kA for Example 22B. The maximum weld current 32 for obtaining acceptable welds is about 13 kA. The difference between the maximum weld current 32 and the minimum weld current 34 is the current range 38. Thus measured, the weld current range of Example 22B is about 3.0 kA. For comparison, the weld current range is for a weld stack consisting of two monolithic sheets of the galvannealed steel each having a thickness of about 0.8 mm similarly measured and is determined to be less than about 1.3 kA. Surprisingly, the composite material of Example 22B is easier to weld (i.e., has a broader processing window for welding) than the galvannealed steel, as determined by its higher weld current range.

Example 22C

The weld current range is measured for a weld stack consisting of two monolithic sheets of the galvannealed steel each having a thickness of about 0.8 mm similarly measured and is determined to be less than about 1.3 kA. The weld current range is measured using the same method as for Example 228. Surprisingly, the composite material of Example 228 is easier to weld (i.B., has a broader processing window for welding) than the galvannealed steel, as determined by its higher weld current range (e.g., compared to Example 22C).

Example 22D

Example 22D is a composite material having the same composition, filled thermoplastic polymer, and structure as Example 228. The weld current range of Example 220 is measured using the same conditions as in Example 228, except the load on the weld tips is about 2.76 kN (about 600 lb), the upslope time is about 50 ms, the weld time is about 300 ms, and the initial weld current is about 8-9 kA. The weld current range is first measured for a weld stock consisting of the Example 220 composite material and a sheet of uncoated deep drawing quality steel (Le., 000) having a thickness of about 1.2 mm. The weld button size is measured at different weld currents as shown in FIG. 7. Good welds characterized by i) a button size of about 3.6 mm or more in diameter and ii) no metal expulsion are obtained when the weld current is from about 6.4 kA to about 9.2 kA. The weld current range is determined to be about 2.8 kA for welding the Example 22D to 1.2 mm thick uncoated DDQ.

Next, weld stacks consisting of the composite material and 0.8 mm thick galvannealed steel are prepared and welded using the same conditions as for the uncoated DOC steel. Surprisingly, good welds are obtained without changing the upslope time, the weld time, the initial weld current, or the load on the weld tips. The weld button is measured at different weld currents as shown in FIG. 8. Good welds characterized by i) a button size of about 3.6 mm or more in diameter and ii) no metal expulsion are obtained when the weld current is from about 7.75 kA to about 9.45 kA. The weld current range is determined to be about 1.7 kA for welding the Example 22D composite material to 0.8 mm thick galvannealed steel.

The composite material of Example 22D is also welded to hot dip galvanized steel (I.e., HOG) having a thickness of about 1.5 mm. Weld stacks consisting of the composite material and the 1.5 mm thick HDG are prepared and welded using the same conditions as for the uncoated DDQ steel. Surprisingly, good welds are obtained without changing the upslope time, the weld time, the initial weld current, or the load on the weld tips. The weld button is measured at different weld currents as shown in FIG. 9. Good welds characterized by i) a button size of about 3.6 mm or more in diameter and ii) no metal expulsion are obtained when the weld current is from about 7.35 kA to about 9.35 kA. The weld current range is determined to be about 2.0 kA for welding the Example 220 composite material to 1.5 mm thick HOG.

Surprisingly, the same welding conditions can be used for welding the composite material to different types of steel (e.g., 000, HOG, or galvannealed steel). Additionally, it is surprising that the composite material is capable of being welded to steel having thickness varying by about 87% (I.e., from 0.8 mm to 0.8 mm×187%=1.5 mm) without changing the welding conditions. It is also surprising that for the different types of steels, and the different thickness of the steel, the welding to the composite material is characterized by generally large weld current ranges.

Example 23

A composite material is prepared using the same materials, composition, and method as Example 21, except the metal sheets are replaced by 0.2 mm thick sheets of a high strength steel having a yield strength of about 350 MPa, a tensile strength of about 460 MPa, and an elongation of about 22%. The composite material is expected to have a yield strength of about 193 MPa, a tensile strength of about 253 MPa, and an elongation of about 22%. The density of the composite material is expected to be about 34% less than a monolithic sheet of the low carbon steel having the same thickness (about 0.8 mm). The composite material is expected to have a yield strength that is about 50 MPa or more higher than the yield strength of the monolithic sheet of low carbon steel having the same thickness. The composite material is expected to have a tensile strength that is at least about 90% of the tensile strength of the monolithic sheet of low carbon steel having the same thickness. The composite material is expected to have a flexural modulus that is at least about 85% of the flexural modulus of the monolithic sheet of low carbon steel having the same thickness.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x' in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist or even consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

As used herein the terms "polymer" and "polymerization" are generic, and can include either or both of the more specific cases of "homo-" and copolymer" and "homo- and copolymerization", respectively.

If is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A composite material comprising:
a first sheet of metal;
an optional second sheet of metal; and
an extrusion of a filled polymeric material composite attached to the first sheet of metal, that includes:
   a. a polymeric-based matrix that includes:
   at least one thermoplastic polymer that is an elastomer, an ionomer, or both;
   b. a mass of metallic fibers distributed throughout the polymeric-based matrix to form a filled polymeric material composite mass with the polymeric-based matrix,
wherein the mass of the metallic fibers is present from about 10 volume percent to about 25 volume percent based on the total volume of the filled polymeric material composite mass, the mass of metallic fibers generally spans the thickness of the filled polymeric material composite mass, and includes a plurality of the metallic fibers that:
   i. are steel fibers;
   ii. have a weight average length from about 0.5 mm to about 7 mm the length being greater than a width and a thickness of the fibers;
   iii. are in the form of ribbon fibers having a generally rectangular cross-section;
   iv. have a ratio of a width to a thickness of about 2 to about 20; and
   v. are entangled with one another; and
wherein the composite material has a total thickness of about 0.7 mm to about 10 mm and the filled polymeric material composite mass has a thickness greater than about 20% of the total thickness of the composite material.

2. The composite material of claim 1, wherein the thermoplastic polymer is a non-solar polymer having an ultimate tensile strength (per ASTM D638-08) of at least about 7.5 MPa, an ultimate tensile elongation (per ASTM D638-08) of at least about 700%, and a flexural modulus (per ASTM D790-10, 1% secant) of at least about 3 MPa.

3. The composite material of claim 1, wherein the thermoplastic polymer includes the elastomer, and the elastomer has a tensile modulus at 100% elongation of less than 3 MPa as measured according to ASTM D638-08.

4. The composite material of claim 3, wherein the thermoplastic polymer includes an ethylene-octene copolymer or an ethylene-hexene copolymer.

5. The composite material of claim 1, wherein the composite material includes the second sheet of metal and the filled polymeric material composite mass is sandwiched between the first sheet of metal and the second of metal wherein said sheets of metal are coated on at least one major surface of the sheet with a coating for resisting corrosion.

6. The composite material of claim 3, wherein the filled polymeric material composite mass is attached to the first metal sheet, wherein the first sheet of metal is a steel sheets and is galvanized, phosphatized, or both.

7. The composite material of claim 1, wherein the polymeric-based matrix includes a polymer that is capable of cross-linking.

8. The composite material of claim 1, wherein the composite material is a sandwich composite including the second sheet of metal, wherein the yield strength of the sandwich composite is about 100 MPa or more, the tensile strength of the sandwich composite is about 160 MPa or more the sandwich composite has a thickness of 0.4 mm or mare, and the filled polymeric material composite mass has a thickness that is at least about 30% of the thickness of the sandwich composite.

9. A welded article comprising a composite material of claim 1 welded to a metallic body.

10. A welded article comprising a composite material of claim 1, wherein the shape, size, concentration, and type of the metallic fibers is selected so that a weld stack consisting of the composite material and a sheet of galvannealed steel having approximately the same thickness as the composite material, exhibits a static contact resistance of 0.0020Ω or less, as measured using a compressive force of about 500 lbs applied by two axially aligned electrodes each having a face diameter of about 4.8 mm electrodes.

11. A welded article comprising a composite material of claim 1, wherein the shape, size, concentration, and type of the metallic fibers is selected so that the light weight composite has a static contact resistance ratio of about 0.01 or more, wherein the static contact resistance ratio is the ratio of: (i) the static contact resistance of a first weld stack consisting of the composite material and a sheet of steel having approximately the same thickness as the composite material, to (ii) the static contact resistance of a second weld stack consisting of two sheets of the same steel as in the first weld stack, wherein the static contact resistance is measured using a compressive force of about 500 lbs applied by two axially aligned electrodes each having a face diameter of about 4.8 mm electrodes.

12. A method of making an article, comprising the steps of plastically deforming the composite material of claim 1.

13. The method of making an article of claim 4, wherein the welding includes the steps of: i) applying pressure to a weld stack; ii) applying an initial weld current to the weld stack while the pressure is applied, wherein the initial weld current is about 0.8 kA or less; iii) incrementally increasing or continuously ramping the welding current for an upslope time until the weld current reaches a second weld current; wherein the second weld current is at least about 0.5 kA higher than the first weld current, and the upslope time is about 0.01 seconds or more, and wherein the process optionally includes a step of holding the weld current at the second weld current for at least 0.06 seconds.

14. A material assembly including the composite material of claim 6, wherein the composite material is formed and welded to a steel sheet.

15. The composite material of claim 1, wherein the composite material is a sandwich composite including the second sheet of metal and the filled polymeric material composite mass sandwiched between the first and second sheets of metal, wherein the first and second sheets of metal include a coating layer including a primer or adhesive, the coating layer having a thickness, and the ratio of the thickness of the coating layer to the thickness of the filled polymeric material composite mass is about 0.05 or less.

16. The composite material of claim 15, wherein any steel fibers that contact a surface of one of the sheets of metal are essentially free of planar contact between the steel fiber and the sheets of metal.

17. A composite material comprising:
a first sheet of metal;
a second sheet of metal; and
an extrusion of a filled polymeric material composite attached to the first sheet of metal, that includes:
a. a polymeric-based matrix that includes a blend:
  i. at least one first thermoplastic polymer; and
  ii. at least one second thermoplastic polymer that is different from the first thermoplastic polymer and is an elastomer, an ionomer, or both; and
b. a mass of metallic fibers distributed throughout the polymeric-based matrix to form the filled polymeric material composite mass with the polymeric-based matrix,
wherein the mass of metallic fibers is present from about 10 volume percent to about 25 volume percent based on the total volume of the filled polymeric material composite mass the mass of metallic fibers generally spans the thickness of the filled polymeric material composite mass, and includes a plurality of fibers that:
  i. are steel fibers;
  ii. have a weight average length from about 0.5 mm to about 7 mm;
  iii. are in the form of ribbon fibers having a generally rectangular cross-section;
  iv. have a ratio of a width to a thickness of about 2 to about 20; and
  iv. are entangled with one another; and
wherein the composite material has a total thickness of about 0.7 mm to about 10 mm and the filled polymeric material composite mass has a thickness greater than about 20% of the total thickness of the composite material.

18. The composite material of claim 17, wherein the first thermoplastic polymer is a linear low density polyethylene or a low density polyethylene.

19. The composite material of claim 17, wherein the second sheet of metal is employed and is attached to the filled polymeric material composite mass so that the filled polymeric material composite mass is sandwiched between the first sheet of metal and the second sheet of metal: wherein the second thermoplastic polymer includes the elastomer, and the elastomer has a tensile modulus at 100% elongation of less than 3 MPa as measured according to ASTM D638-08.

20. The composite material of claim 19, wherein the composite material includes a thermoplastic polymer having a crystallinity from about 35 weight percent to about 68 weight percent.

21. The composite material of claim 19, wherein the volume of the filled polymeric material composite mass is present from 30 volume percent to 92 volume percent, based on the total volume of the composite material.

22. An automobile bumper fascia or vehicle bumper comprising the composite material of claim 21.

23. The composite material of claim 17, wherein the first thermoplastic polymer is a linear low density polyethylene having an ultimate tensile strength of at least about 50 MPa (per ASTM D882-10), and an ultimate elongation of at least about 500% (per ASTM D882-10).

24. A composite material comprising:
a first sheet of steel;
an optional second sheet of steel; and
an extrusion of a filled polymeric material composite mass attached to the first sheet of metal, that includes a mixture of:
a. a polymeric-based matrix that includes a blend of:
  i. a first thermoplastic polymer including a polyolefin selected from a polypropylene and a copolymer including at least 60 wt. % of an α-olefin and at least one additional monomer, wherein the first thermoplastic polymer has an ultimate tensile strength of at least about 50 MPa (per ASTM D882-10), and an ultimate elongation of at least about 500% (per ASTM D882-10); and
  ii. a second thermoplastic polymer that is different from the first thermoplastic polymer, and includes an elastomer, an ionomer, or both;
wherein the second thermoplastic polymer is a non-polar polymer having an ultimate tensile strength (per ASTM D638-08) of at least about 7.5 MPa, an ultimate tensile elongation (per ASTM D638-08) of at least about 700%, and a flexural modulus (per ASTM D790-10, 1% secant) of at least about 13 MPa; and when the second polymer includes the elastomer, the elastomer has a tensile modulus at 100% elongation of less than 3 MPa as measured according to ASTM D638-08; and
b. a mass of metallic fibers distributed in a random arrangement throughout the polymeric-based matrix to form the filled polymeric material composite mass with the polymeric-based matrix;
wherein the mass of metallic fibers is present from about 10 volume percent to about 25 volume percent based on the total volume of the filled polymeric material composite mass, the mass of metallic fibers generally spans the thickness of the filled polymeric material composite mass, and includes a plurality of fibers that:
  i. are carbon steel fibers;
  ii. have a weight average length from about 0.5 mm to about 7 mm;
  iii. are in the form of ribbon fibers having a generally rectangular cross-section; and
  iv. are entangled with one another; and
wherein the composite material has a total thickness of about 0.7 mm to about 10 mm and the filled polymeric material composite mass has a thickness greater than about 20% of the total thickness of the composite material;
wherein the composite material has a maximum draw ratio greater than about 1.2.

25. The composite material of claim 24, wherein the second thermoplastic polymer includes the elastomer, and wherein the polymer of the polymeric-based matrix has peak melting temperature that is less than about 150° C., and greater than about 50° C.

26. An automobile bumper fascia or vehicle bumper comprising the composite material of claim 24.

27. The composite material of claim 24, wherein the optional second sheet of steel is employed and is attached to the filled polymeric material composite mass so that the filled polymeric material composite mass is sandwiched between the first sheet of steel and the second sheet of steel;
any carbon steel fibers that contact a surface of one of the sheets of steel are essentially free of planar contact between a carbon steel fiber and the sheets of steel; and
wherein composite material has a static contact resistance ratio of about 0.01 or more, the static contact resistance ratio being the ratio of: (i) the static contact resistance of a first weld stack consisting of the composite material and a sheet of steel having approximately the same thickness as the composite material, to (ii) the static contact resistance of a second weld stack consisting of two sheets of the same steel as in the first weld stack, wherein the static contact resistance is measured using a compressive force of about 500 lbs applied by two axially aligned electrodes each having a face diameter of about 4.8 mm electrodes.

28. The composite material of claim 27, wherein the second thermoplastic polymer includes the elastomer.

29. The composite material of claim 28, wherein the blend of polymer of the polymeric-based matrix has peak melting temperature that is less than about 150° C., and greater than about 50° C.

* * * * *